(12) United States Patent
Oryoji et al.

(10) Patent No.: US 8,447,138 B2
(45) Date of Patent: May 21, 2013

(54) IMAGE PROCESSOR, IMAGE PROCESSING METHOD AND PROGRAM

(75) Inventors: Hiroshi Oryoji, Kanagawa (JP); Takefumi Nagumo, Kanagawa (JP); Hideyuki Ichihashi, Tokyo (JP)

(73) Assignee: Sony Corporation, Tokyo (JP)

( * ) Notice: Subject to any disclaimer, the term of this patent is extended or adjusted under 35 U.S.C. 154(b) by 676 days.

(21) Appl. No.: 12/691,652

(22) Filed: Jan. 21, 2010

(65) Prior Publication Data

US 2010/0183245 A1   Jul. 22, 2010

(30) Foreign Application Priority Data

Jan. 22, 2009   (JP) ................ P2009-012350

(51) Int. Cl.
*G06K 9/36* (2006.01)
(52) U.S. Cl.
USPC ...................................... 382/290
(58) Field of Classification Search
USPC ............. 345/3.3; 348/143, 152, 157–159, 348/208.13, 333.11, 448–452, 458, 459; 375/240.16, E7.076, E7.252, E13.017; 382/238, 382/276, 290, 299
See application file for complete search history.

(56) References Cited

U.S. PATENT DOCUMENTS

| 2009/0238535 A1* | 9/2009 | Robertson et al. ............... 386/37 |
| 2010/0149338 A1* | 6/2010 | Aggarwal et al. ............. 348/159 |

FOREIGN PATENT DOCUMENTS

JP   2008-140012   6/2008

OTHER PUBLICATIONS

U.S. Appl. No. 12/691,651, "Image Processor, Image Processing Method and Program ", filed Jan. 21, 2010, Oryoji et al.*

* cited by examiner

*Primary Examiner* — Gregory F Cunningham
(74) *Attorney, Agent, or Firm* — Finnegan, Henderson, Farabow, Garrett & Dunner, L.L.P.

(57) ABSTRACT

An image processor performing super-resolution of converting an input image with first resolution to an output image with second resolution higher than the first resolution on consecutive input images includes a prediction unit predicting the output image with the second resolution of a current frame using the input image of the current frame and the output image obtained by the super-resolution on an input image of a previous frame; a generation unit generating a reduced image with the first resolution composed of pixels at different phases of the prediction image using a prediction image obtained by the prediction of the prediction unit; a difference calculation unit calculating a difference between the input image of the current frame and the reduced image; and an addition unit adding the difference up-sampled to the second resolution to the prediction image, thus generating the output image with the second resolution of the current frame.

11 Claims, 31 Drawing Sheets

IMAGE PROCESSOR, IMAGE PROCESSING METHOD AND PROGRAM

BACKGROUND OF THE INVENTION

1. Field of the Invention

The present invention relates to an image processor, an image processing method, and a program. More particularly, the present invention relates to an image processor, an image processing method, and a program, which are suitable for use when converting an input image to an image with a higher resolution.

2. Description of the Related Art

In the related art, a method called super-resolution is known as a method of obtaining an image with a higher resolution from an input image (for example, see Japanese Unexamined Patent Application Publication No. 2008-140012)

For example, according to a technique called super-resolution back-projection, a consecutive frame image such as a moving image, which is input to an image processor 11, is converted to an image with a higher resolution and output, as illustrated in FIG. 1. In the following description, the image with a lower resolution being input to the image processor 11 will be referred to as an LR (low resolution) image, and the image with a higher resolution being output from the image processor 11 will be referred to as an SR (super resolution) image.

The input LR image is up-sampled to an image with the same resolution as the SR image by an up-sampler 21, and the up-sampled image is supplied to a motion vector detector 22, a mask generator 23, and a mixer 24. The image processor 11 includes a buffer 25 storing an SR image which is obtained from an LR image of a previous frame immediately before the current frame being processed at the current point of time. The SR image supplied to the buffer 25 is stored only for one frame period and is supplied to the motion vector detector 22 and a motion compensator 26.

The motion vector detector 22 detects a motion vector from the LR image supplied from the up-sampler 21 and the SR image supplied from the buffer 25. The motion compensator 26 performs motion compensation using the motion vector supplied from the motion vector detector 22 and the SR image supplied from the buffer 25. Specifically, the motion compensator 26 predicts an SR image obtained from the LR image of the current frame using the SR image of the previous frame immediately before the current frame being processed and supplies the image obtained thus to the mask generator 23 and the mixer 24 as a prediction image.

The mask generator 23 generates a motion mask using the LR image supplied from the up-sampler 21 and the prediction image supplied from the motion compensator 26. The motion mask is information used for specifying a region of the LR image in which a moving subject is displayed, and which is generated by calculating a difference between the LR image and the prediction image.

The mixer 24 combines the prediction image supplied from the motion compensator 26 and the LR image supplied from the up-sampler 21 using the motion mask supplied from the mask generator 23 and supplies a combined image obtained thus to a down-sampler 27 and an adder 28. Specifically, the LR image and the prediction image are subjected to weighted addition with weighting factors determined by the motion mask, thus obtaining the combined image. When generating the combined image, the weighting factors are determined such that the contribution ratio of the LR image becomes larger in the region where a motion occurs, whereby image quality deterioration of the SR image resulting from prediction errors occurring in the region with a motion is suppressed.

The combined image obtained thus is down-sampled by the down-sampler 27, and a reduced image obtained thus is supplied to a subtractor 29. The reduced image is an image with the same resolution as the LR image.

The subtractor 29 generates a differential image by calculating a difference between the LR image supplied to the image processor 11 and the reduced image. The up-sampler 30 up-samples the differential image to an image with the same resolution as the SR image, thus obtaining an enlarged image. Subsequently, an adder 28 adds the enlarged image and the combined image, outputs an image obtained thus as an SR image of the current frame, and supplies the SR image to the buffer 25 to be stored therein.

In the image processor 11, as illustrated in FIG. 2, a combined image P11 which is obtained by predicting the SR image of the current frame is down-sampled to obtain a reduced image P12, and a difference between the reduced image P12 and an LR image P13 is calculated to obtain a differential image P14. The differential image P14 is an image which is indicative of an error in the reduced image P12 used as the LR image of the current frame obtained by prediction with respect to the LR image P13 of the current frame. That is to say, the differential image P14 can be said to be an error in the combined image P11 used as the predicted SR image with respect to a correct SR image of the current frame which should have been obtained if there was no error.

Therefore, by up-sampling the reduced image P14 and adding a signal obtained thus to the combined image P11, an image which is further similar to the correct SR image which should be obtained. That is, the obtained SR image will become an image in which the LR image is more faithfully enlarged without any image quality deterioration.

As described above, according to the back-projection, an enlarged image which is indicative of the calculated error is added to the combined image obtained by prediction, thus obtaining the SR image.

SUMMARY OF THE INVENTION

However, when a reduced image is generated from a combined image using the back-projection, pixels at a predetermined phase (position) of the combined image are sampled, and an image composed of the sampled pixels is obtained as the reduced image.

According to sampling theorem, a signal at the Nyquist frequency is not properly preserved in terms of its amplitude and phase. Therefore, depending on the phase of the pixels of the combined image being sampled, there may be a case where the waveform of the combined image is not properly preserved at the time of generating the reduced image.

For example, it will be assumed that the waveform of the combined image, that is, the change in the pixel values of the pixels of the combined image in a predetermined direction, has a shape as illustrated in FIG. 3. In FIG. 3, the vertical direction represents the pixel values of pixels of an image, and the horizontal direction represents a predetermined direction of the image. In addition, each circle represents each pixel on the image.

Referring to FIG. 3, a waveform indicated by an arrow A11 represents the waveform of a combined image. That is, a curve that connects adjacent pixels (i.e., the pixel values thereof) of the combined image forms the waveform of the combined image.

In this figure, when a value between the maximum value and the minimum value of the pixel value of the combined image is referred to as an intermediate value, the combined image is composed of pixels which are repeatedly arranged in the horizontal direction in the figure in the order of a pixel having the intermediate value, a pixel having the maximum value, a pixel having the intermediate value, and a pixel having the minimum value. That is to say, in the example of FIG. 3, the waveform of the combined image has a sinusoidal shape.

Now, the pixels of the combined image are sampled every other pixel in the horizontal direction in the figure so as to generate a reduced image.

For example, when the pixels of the combined image are sampled every other pixel in the horizontal direction so as to generate a reduced image by starting with the second pixel from the left in the figure, the pixels of the combined image indicated by an arrow A12 are sampled. The pixels of the combined image indicated by the arrow A12 have pixel values of either the maximum value or the minimum value, and the waveform of the reduced image will have the same sinusoidal shape as the waveform of the combined image.

On the contrary, for example, when the pixels of the combined image indicated by the arrow A11 are sampled every other pixel in the horizontal direction so as to generate a reduced image by starting with the first pixel from the left in the figure, the pixels of the combined image indicated by an arrow A13 are sampled. The pixels of the combined image indicated by the arrow A13 have pixel values of the intermediate value, and the waveform of the reduced image will have a flat shape without amplitude differently from the waveform of the combined image.

As described above, when the pixels of the combined image are sampled at the Nyquist frequency of the combined image (i.e., the half-frequency of the combined image) so as to generate the reduced image, depending on a sampling position, there may be a case where the original waveform of the combined image is not properly preserved in the obtained reduced image.

When the waveform of the combined image obtained by prediction is not properly preserved in the reduced image, the error between the combined image and the LR image is not properly detected even when the difference between the reduced image and the LR image is calculated. As a result, errors which were not detected are accumulated in the SR image.

For example, as illustrated in FIG. 4, when the waveform of the combined image is properly preserved at the time of generating the reduced image, errors in the combined image are corrected, whereby an SR image can be obtained in which the waveform of the LR image is properly preserved. In FIG. 4, the vertical direction represents the pixel values of pixels of an image, and the horizontal direction represents a predetermined direction of the image. Moreover, arrows A21 to A27 represent a combined image, the pixels of the combined image being sampled, a reduced image, an LR image, a differential image, an enlarged image, and an SR image, respectively. In addition, each circle represents each pixel on the image.

It will be assumed that a combined image as indicated by the arrow A21 is obtained having the same waveform as the waveform illustrated in FIG. 3. Moreover, it will be assumed that among the pixels of the combined image, pixels as indicated by the arrow A22, having pixel values of the maximum value and the minimum value are sampled, whereby a reduced image is generated.

In this case, a reduced image as indicated by the arrow A23 is obtained having the same waveform as the original waveform of the combined image, in which the sinusoidal waveform of the combined image is preserved. Moreover, the waveform of the LR image has a flat shape without any change in the horizontal direction of the figure, as indicated by the arrow A24. The pixels of the LR image have pixel values of an intermediate value between the maximum value and the minimum value of the pixel values of the pixels of the reduced image.

When a difference between the reduced image and the LR image is calculated by the subtractor 29, a differential image having a waveform as indicated by the arrow A25 is obtained. The waveform of the differential image has a shape such that the waveform of the reduced image is reversed in the vertical direction of the figure with respect to the position of the intermediate value.

When the differential image is up-sampled, an enlarged image as indicated by the arrow A26 is obtained in which the original waveform of the differential image is preserved. When the enlarged image is added to the combined image indicated by the arrow A21 by the adder 28, the errors generated at the time of generating the combined image are corrected, whereby an SR image as indicated by the arrow A27 can be obtained having the same waveform as the waveform of the LR image.

As described above, according to the back-projection, when the original waveform of the combined image is properly preserved at the time of generating the reduced image, it is possible to increase the resolution of the LR image without any image quality deterioration.

On the contrary, for example, as illustrated in FIG. 5, when the waveform of the combined image is not properly preserved at the time of generating the reduced image, the errors in the combined image are not corrected, whereby errors are accumulated in the obtained SR image at a certain phase. In FIG. 5, the vertical direction represents the pixel values of pixels of an image, and the horizontal direction represents a predetermined direction of the image. Moreover, arrows A31 to A37 represent a combined image, the pixels of the combined image being sampled, a reduced image, an LR image, a differential image, an enlarged image, and an SR image, respectively. In addition, each circle in the figure represents each pixel on the image.

It will be assumed that a combined image as indicated by the arrow A31 is obtained having the same waveform as the waveform illustrated in FIG. 3. Moreover, it will be assumed that among the pixels of the combined image, pixels as indicated by the arrow A32, having pixel values of the maximum value and the minimum value are sampled, whereby a reduced image is generated.

In this case, a reduced image as indicated by the arrow A33 is obtained having a flat shape without any change in pixel values, in which the sinusoidal waveform of the combined image is not preserved. Moreover, the waveform of the LR image has a flat shape without any change in the horizontal direction of the figure, as indicated by the arrow A34. The pixels of the LR image have pixel values of an intermediate value.

When a difference between the reduced image and the LR image is calculated by the subtractor 29, a differential image having a waveform as indicated by the arrow A35 is obtained. The waveform of the differential image has a shape such that it is flat in the horizontal direction in the figure, and the pixel values of the pixels thereof have the same value. In an ideal case, at the phase of the pixels of the combined image having the maximum value and the minimum value, a difference between the maximum value or minimum value and the intermediate value should be detected as an error. However, in the example of FIG. 5, since the sampling position at the time of generating the reduced image is not proper, the above-mentioned error is not detected.

When the differential image is up-sampled, an enlarged image as indicated by the arrow A36 is obtained in which the original waveform of the differential image is preserved. When the enlarged image is added to the combined image indicated by the arrow A31 by the adder 28, the errors generated at the time of generating the combined image are not corrected, whereby an SR image as indicated by the arrow A37 can be obtained having a different waveform from that of the LR image. That is to say, in the SR image, the errors at the certain phase generated at the time of generating the combined image remain unremoved.

Furthermore, the obtained SR image is used for the prediction of an SR image of a subsequent frame as it is. As a result, at a certain phase of a certain frequency where errors are irremovable, errors generated in each frame, namely noise components generated by the prediction are accumulated in the SR image. According to the back-projection, since pixels at a predetermined phase of the combined image of each frame are sampled at the time of generating the reduced image, there is a concern that errors are accumulated at positions (phases) of the pixels of the combined image, which are not sampled.

When errors generated in each frame are accumulated in the SR image, the image quality of the SR image of each frame deteriorates. For example, in the example of FIG. 5, a straight line-shaped noise which is long in a direction perpendicular to the horizontal direction in the figure, namely, a comb-like noise appears in the SR image.

Furthermore, in the field of super-resolution, a technique called a Map method is known as a method of suppressing accumulation of noise in an SR image. The Map method utilizes characteristics of images having a strong spatial correlation to apply feedback to an image obtained by predicting an SR image with spatial constraints placed on the errors relative to an LR image. Therefore, accumulation of noise is prevented. However, although the Map method is able to suppress the accumulation of noise, since the edge portions are lost, the SR image will become blurred, resulting in image quality deterioration.

As described above, in super-resolution, when an SR image is obtained from an LR image, it is difficult to suppress image quality deterioration of the SR image.

It is therefore desirable to improve further the image quality of images when an input image is converted to an image with a higher resolution.

According to an embodiment of the present invention, there is provided an image processor performing a super-resolution process of converting an input image with a first resolution to an output image with a second resolution higher than the first resolution with respect to a plurality of input images which are consecutive in time, including: prediction means for predicting the output image with the second resolution of a time being processed using the input image of the time being processed and the output image obtained by performing the super-resolution process on an input image of a time earlier than the time being processed; generation means for generating a reduced image with the first resolution composed of pixels at different phases of the prediction image, the phases being different from time to time, using a prediction image obtained by the prediction of the prediction means; difference calculation means for calculating a difference between the input image of the time being processed and the reduced image; and addition means for adding the difference which is up-sampled to the second resolution to the prediction image, thus generating the output image with the second resolution of the time being processed.

The generation means may change a phase of each pixel of the prediction image to be used for generating the reduced image for each time in accordance with a predetermined pattern.

The generation means may include selection means for selecting a phase of each pixel of the prediction image, and sampling means for generating the reduced image by sampling pixels at the phase selected by the selection means from the prediction image.

The generation means may include selection means for selecting a phase of each pixel of the prediction image, and filtering means for generating pixels at the selected phase by a filtering process using several pixels around a pixel of the prediction image which is positioned at the phase selected by the selection means, thus generating the reduced image.

The generation means may include phase control means for generating the reduced image composed of pixels which are positioned at a phase separated by a predetermined distance in a predetermined direction from a predetermined reference phase of the prediction image, and shifting a phase of the difference up-sampled to the second resolution by the predetermined distance in the predetermined direction.

The input image may be an image of an interlaced format. The generation means may include: switching means for changing an output destination of the prediction image depending on whether the input image of the time being processed is a top-field image or a bottom-field image; first selection means for selecting a phase of each pixel of the prediction image obtained from the input image of a top field which is output from the switching means; first sampling means for generating the reduced image by sampling a pixel at the phase selected by the first selection means from the prediction image; second selection means for selecting a phase of each pixel of the prediction image obtained from the input image of a bottom field which is output from the switching means; and second sampling means for generating the reduced image by sampling pixels at the phase selected by the second selection means from the prediction image.

The first and second selection means may independently change the phase of each pixel of the prediction image used for generating the reduced image from field to field in accordance with a predetermined pattern.

The generation means may include phase control means for moving each pixel of the prediction image by a predetermined distance in a predetermined direction to shift a phase of each pixel of the prediction image; and reduced image generation means for generating the reduced image composed of pixels at a predetermined phase of the prediction image in which the phase is shifted by the phase control means. The phase control means may change a direction of shifting the phase of each pixel of the prediction image in each time in accordance with a predetermined pattern.

According to another embodiment of the present invention, there is provided an image processing method or program for performing a super-resolution process of converting an input image with a first resolution to an output image with a second resolution higher than the first resolution with respect to a plurality of input images which are consecutive in time, the method including the steps of: predicting the output image with the second resolution of a time being processed using the input image of the time being processed and the output image obtained by performing the super-resolution process on an input image of a time earlier than the time being processed;

generating a reduced image with the first resolution composed of pixels at different phases of the prediction image, the phases being different from time to time, using a prediction image obtained by the prediction of the prediction unit; calculating a difference between the input image of the time being processed and the reduced image; and adding the difference which is up-sampled to the second resolution to the prediction image, thus generating the output image with the second resolution of the time being processed.

According to the embodiment of the present invention, when performing a super-resolution process of converting an input image with a first resolution to an output image with a second resolution higher than the first resolution with respect to a plurality of input images which are consecutive in time, the output image with the second resolution of a time being processed is predicted using the input image of the time being processed and the output image obtained by performing the super-resolution process on an input image of a time earlier than the time being processed. Subsequently, a reduced image with the first resolution composed of pixels at different phases of the prediction image, the phases being different from time to time, is generated using a prediction image obtained by the prediction of the prediction unit. Subsequently, a difference between the input image of the time being processed and the reduced image is calculated. Lastly, the difference which is up-sampled to the second resolution is added to the prediction image, whereby the output image with the second resolution of the time being processed is generated.

According to the embodiment of the present invention, it is possible to improve further the image quality of images when an input image is converted to an image with a higher resolution.

DESCRIPTION OF THE PREFERRED EMBODIMENTS

Hereinafter, embodiments of the present invention will be described with reference to the drawings.
Outline of Processing of Image Processor
First, an outline of the processing performed by an image processor according to an embodiment of the present invention will be described.

In the image processor, a time-consecutive image (hereinafter referred to as an LR image), such as a moving image, is input. In the image processor, the LR image is converted to an image (hereinafter referred to as an SR image) with a higher resolution than the LR image by a super-resolution process and output. The SR image is an enlarged image of the LR image. The LR image may not be a moving image and may be a plurality of images which are time-consecutive and contain the same subject captured at different times.

Specifically, the image processor predicts an SR image of the current frame using an LR image of the current frame (time) being processed and an SR image obtained by the LR image of a previous frame (time) earlier than the current frame and outputs an image obtained by prediction as a combined image. Then, the image processor down-samples the combined image to obtain a reduced image, up-samples a differential image obtained by calculating a difference between the reduced image and the LR image, and adds the up-sampled differential image to the combined image, thus obtaining an SR image of the current frame.

Figure 1:
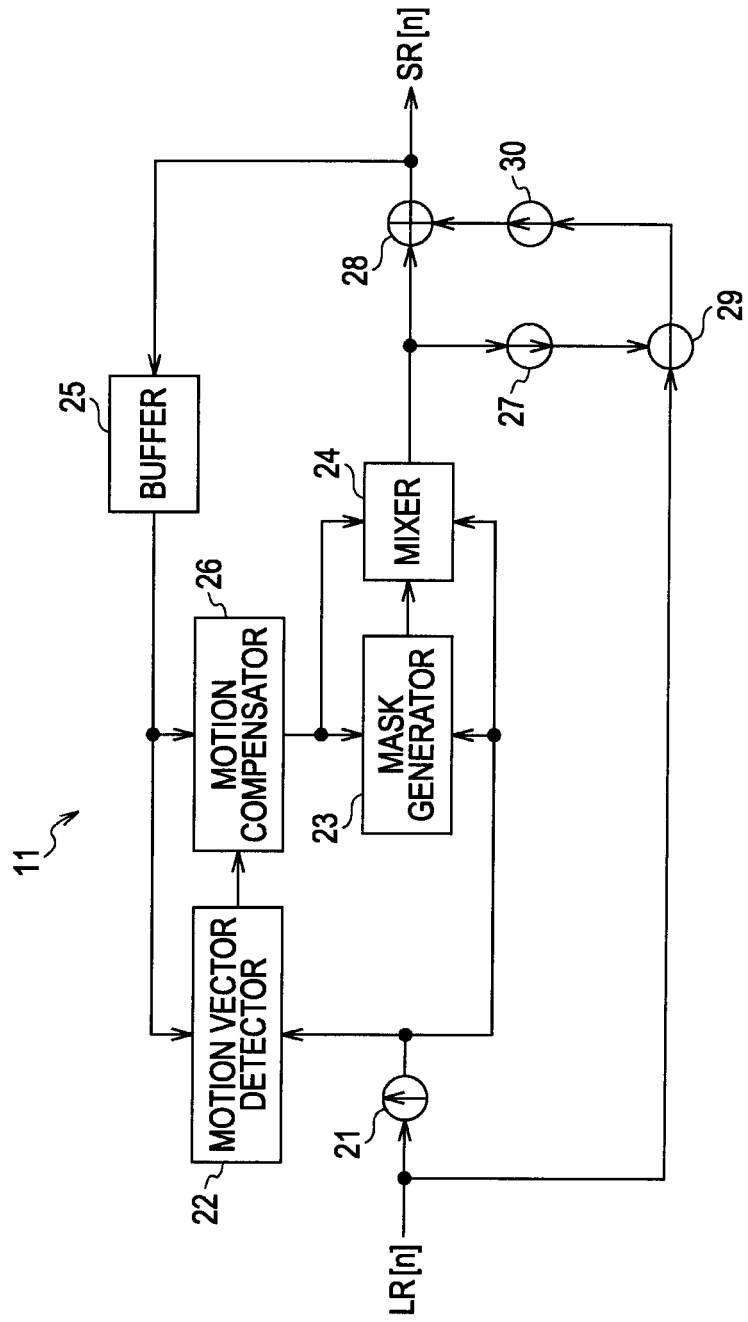
FIG. 1 is a diagram illustrating a configuration of an image processor according to related art.
Figure 2:
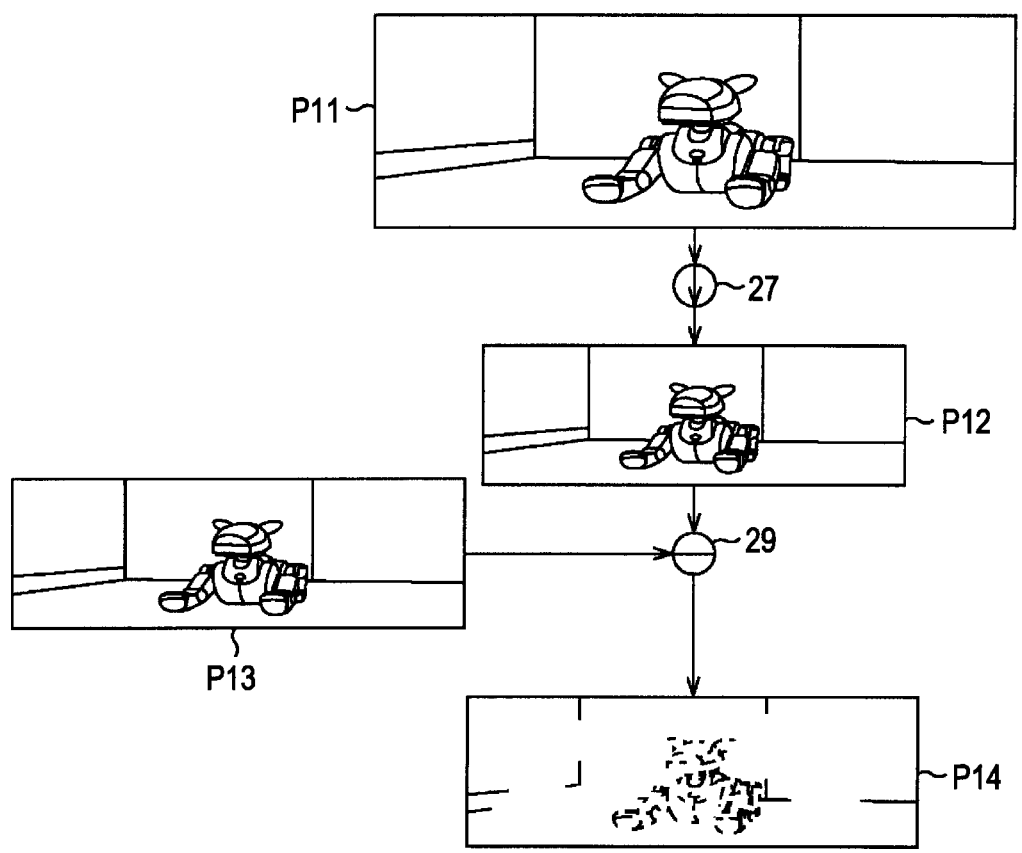
FIG. 2 is a diagram illustrating the generation of a differential image in the image processor of the related art.
Figure 3:
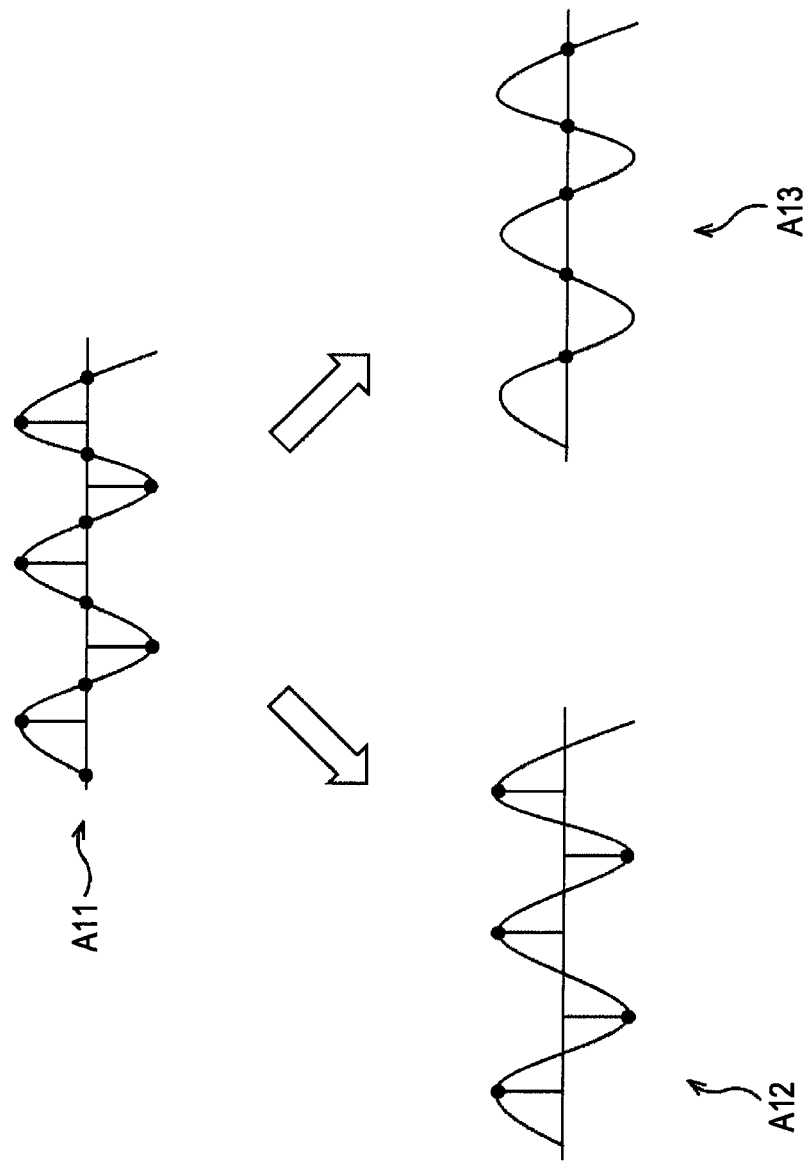
FIG. 3 is a diagram illustrating the generation of a reduced image according to the related art.
Figure 4:
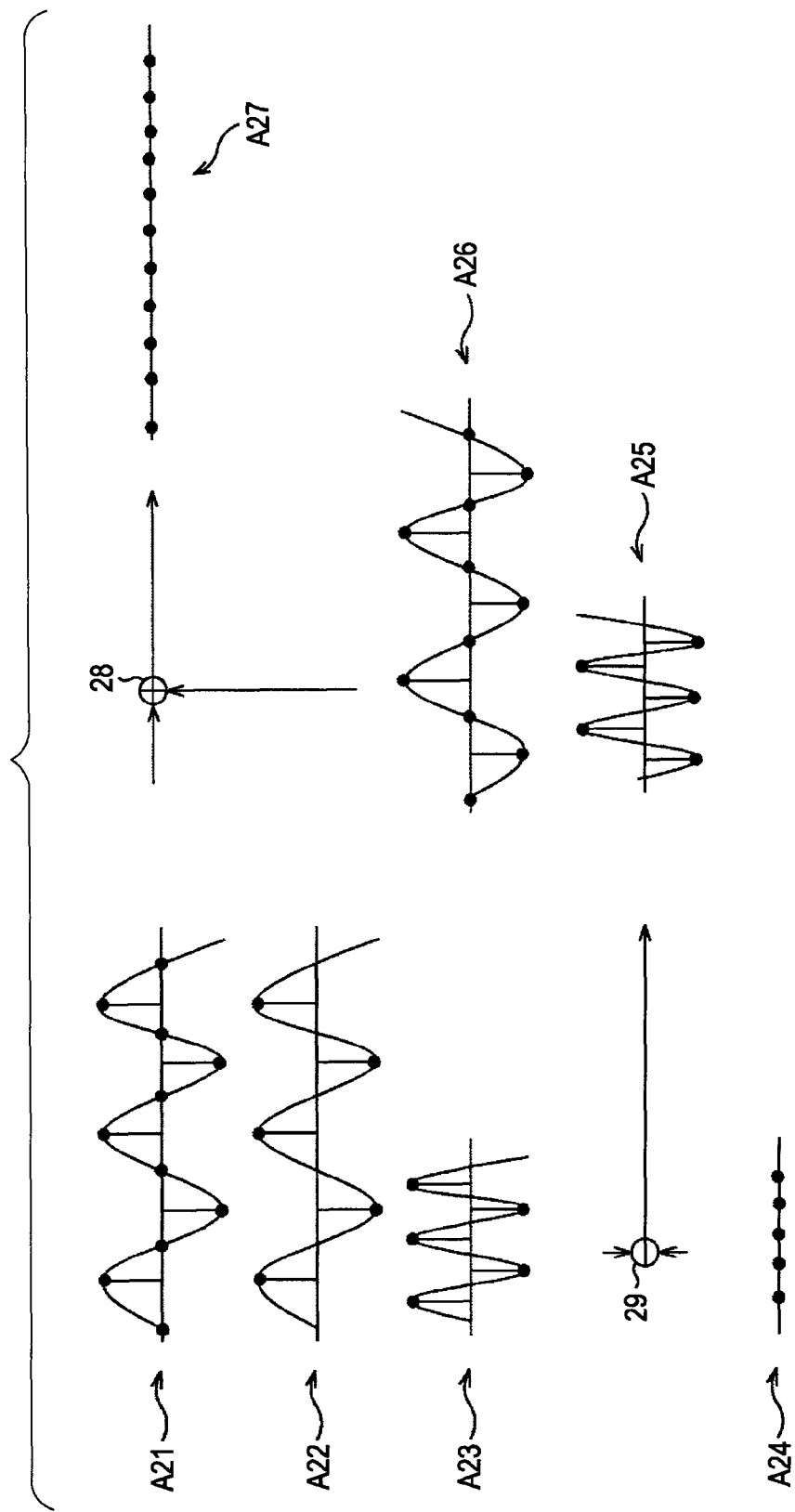
FIG. 4 is a diagram illustrating an example where the waveform of an image is preserved at the time of generating the reduced image according to the related art.
Figure 5:
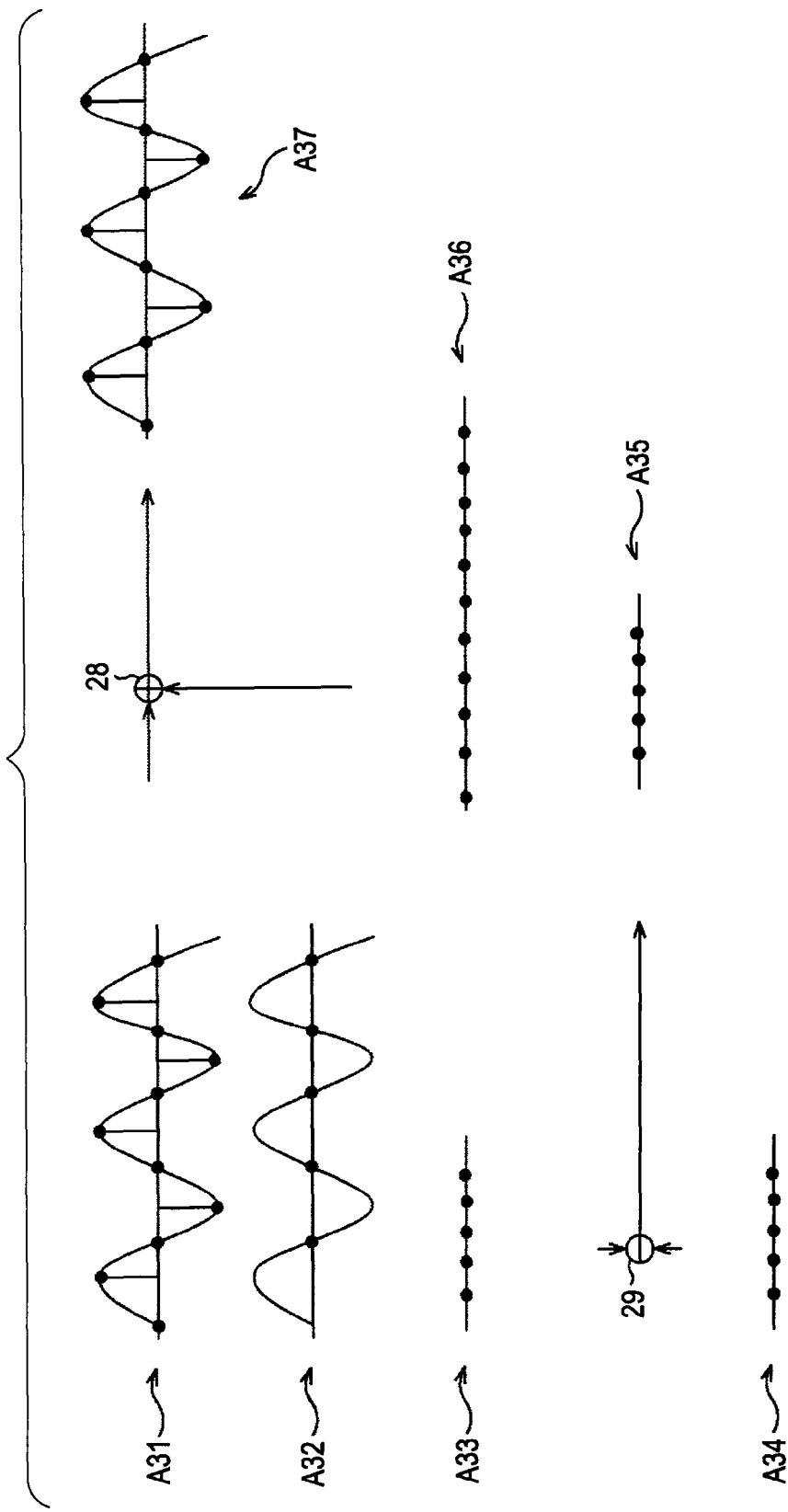
FIG. 5 is a diagram illustrating an example where the waveform of an image is not preserved at the time of generating the reduced image according to the related art.
Figure 6:
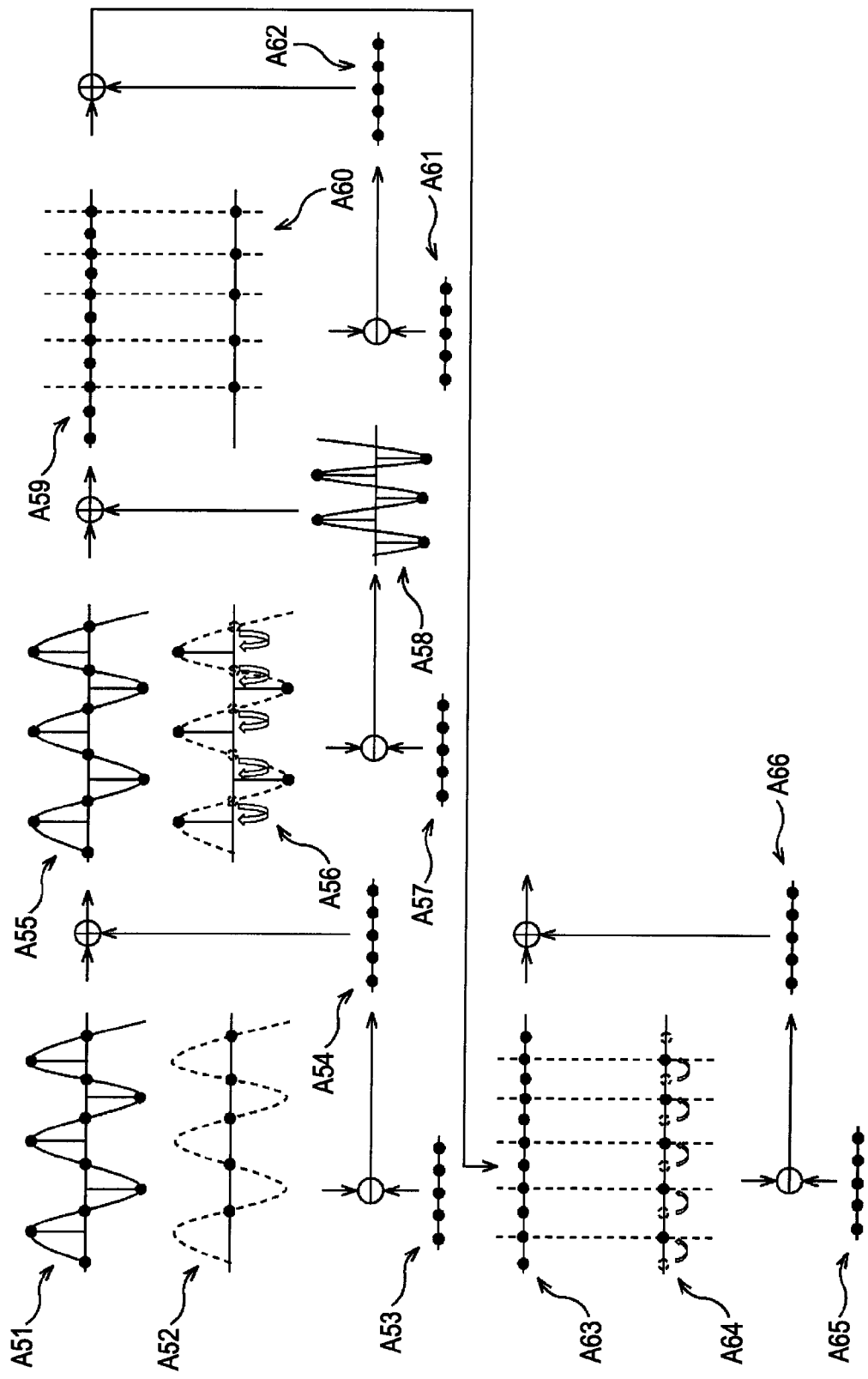
FIG. 6 is a diagram illustrating an outline of the processing of an image processor according to an embodiment of the present invention.

According to the image processor, as illustrated in FIG. 6, when the reduced image is generated, the pixels at different phases of the combined image are selected for each frame to be used for the generation of the reduced image, thus suppressing accumulation of noise in the SR image. In FIG. 6, the vertical direction represents the pixel values of pixels of an image, and the horizontal direction represents a predetermined direction of the image. In addition, each circle represents each pixel on the image.

Referring to FIG. 6, a waveform indicated by an arrow A51 represents the waveform of a combined image of the current frame. That is, a curve that connects adjacent pixels (i.e., the pixel values thereof) of the combined image forms the waveform of the combined image.

In this figure, when a value between the maximum value and the minimum value of the pixel value of the combined image is referred to as an intermediate value, the combined image is composed of pixels which are repeatedly arranged in the horizontal direction in the figure in the order of a pixel having the intermediate value, a pixel having the maximum value, a pixel having the intermediate value, and a pixel having the minimum value. That is to say, in the example of FIG. 6, the waveform of the combined image has a sinusoidal shape.

Now, the pixels of the combined image are sampled every other pixel in the horizontal direction so as to generate a reduced image.

For example, in the current frame, it will be assumed that the pixels of the combined image indicated by the arrow A51 are sampled every other pixel in the rightward direction by starting with the third pixel from the left in the figure, whereby the pixels of the combined image indicated by an arrow A52 are sampled and a reduced image is generated. In this case, the waveform of the obtained reduced image has a flat shape without any change in the horizontal direction of the figure, and the original waveform of the combined image is not properly preserved.

Moreover, when the waveform of the LR image of the current frame has a flat shape without any change in the horizontal direction of the figure as indicated by an arrow A53, a differential image having a waveform indicated by an arrow A54 is obtained by calculating a difference between the reduced image and the LR image. The waveform of the differential image has a shape such that it is flat in the horizontal direction of the figure, and errors generated in the combined image are not detected in the differential image.

Therefore, although the differential image is up-sampled and added to the combined image as a correction value of the errors of the combined image relative to the LR image, the errors, i.e., noise components are not removed from the SR image obtained by addition. In the following description, the direction in each image corresponding to the rightward direction of the figure will be also referred to as an x-direction.

The SR image obtained thus is used for generation of a combined image of a subsequent frame. For example, it will be assumed that a combined image of a subsequent frame is generated using the SR image obtained from the differential image indicated by the arrow A54, whereby a combined image having a waveform indicated by an arrow A55 is obtained. The combined image indicated by the arrow A55 has the same waveform as the waveform of the combined image indicated by the arrow A51.

In the image processor, using the combined image indicated by the arrow A55, a reduced image which is composed of the pixels at a predetermined phase of the combined image as indicated by an arrow A56 is generated. The dotted circles of the waveform of the combined image indicated by the arrow A56 represent the positions of the pixels which are sampled at the time of generating the reduced image in the previous frame. The dotted circles represent the pixels at the same phase as the pixels of the combined image indicated by the arrow A51, which are used for generating the reduced image.

In the example indicated by the arrow A56, the left adjacent pixels in the figure of the pixels of the combined image used at the time of generating the reduced image of the previous frame are used for generation of a reduced image of the current frame being processed. In the image processor, the reduced image composed of such pixels is generated, and the waveform of the reduced image has the same shape as the waveform of the combined image indicated by the arrow A55, namely, a sinusoidal shape. In other words, in the reduced image, the original waveform of the combined image is properly preserved.

When the waveform of an LR image of a new frame to be processed has a flat shape without any change in the x-direction as indicated by an arrow A57, a differential image having a waveform indicated by an arrow A58 is obtained by calculating a difference between the reduced image and the LR image. The waveform of the differential image has a shape such that the waveform of the combined image indicated by the arrow A55 is reversed in the vertical direction of the figure with respect to the central position in the pixel value direction (vertical direction) of the waveform.

Since the original waveform of the combined image is not properly preserved in the reduced image of this frame, the waveform of the differential image indicated by an arrow A58 has a shape which is indicative of an error between the combined image and the LR image. Therefore, when the differential image is added to the combined image indicated by the arrow A55, an SR image having higher image quality is obtained in which errors (noise components) are removed.

Furthermore, the SR image is used for generating a combined image of a subsequent frame. Since noise components have been removed from the SR image, the combined image obtained from the SR image will be a combined image having a waveform similar to the original waveform of the SR image as indicated by an arrow A59, for example.

The waveform of the combined image indicated by the arrow A59 has a flat shape without any change in the x-direction. In the image processor, as indicated by an arrow A60, the pixels at the same phase as the pixels of the combined image of the frame indicated by the arrow A52, which are used for generating the reduced image, are used and a reduced image composed of the pixels is generated. As a result, the obtained reduced image will be an image having a waveform in which the original waveform of the combined image is properly preserved.

When the waveform of an LR image of a new frame to be processed has a flat shape without any change in the x-direction as indicated by an arrow A61, a differential image having a waveform indicated by an arrow A62 is obtained by calculating a difference between the reduced image and the LR image. The waveform of the differential image has a flat shape without any change in the x-direction.

Since the original waveform of the combined image is properly preserved in the reduced image of this frame, when the differential image having the waveform indicated by the arrow A62 is added to the combined image indicated by the arrow A59, an SR image having higher image quality is obtained in which noise components are not contained.

Furthermore, it will be assumed that from the SR image obtained thus, a combined image having a waveform having a shape such that it is flat in the x-direction is obtained in a subsequent frame as indicated by an arrow A63. Then, as indicated by an arrow A64, a reduced image is generated which is composed of the pixels at a predetermined phase of the combined image indicated by the arrow A63. The dotted circles of the waveform of the combined image indicated by the arrow A64 represent the positions of the pixels of the combined image of the frame indicated by the arrow A52, which are sampled at the time of generating the reduced image.

In the combined image of the frame indicated by the arrow A64, the right adjacent pixels in the figure of the pixels of the combined image used for generating the reduced image from the combined image of the frame indicated by the arrow A52 are used for generation of a reduced image. In the image processor, the reduced image composed of such pixels is generated, and the waveform of the reduced image has the same shape as the waveform of the combined image indicated by the arrow A63.

When the waveform of an LR image of a new frame to be processed has a flat shape without any change in the x-direction as indicated by an arrow A65, a differential image having a waveform indicated by an arrow A66 is obtained by calculating a difference between the reduced image and the LR image. The waveform of the differential image has a flat shape without any change in the x-direction.

Since the original waveform of the combined image is properly preserved in the reduced image of this frame, when the differential image having the waveform indicated by the arrow A66 is added to the combined image indicated by the arrow A63, an SR image having higher image quality is obtained in which noise components are not contained.

In this way, by changing the phases of the pixels of the combined image to be used for generating the reduced image from frame to frame, it is possible to prevent accumulation of errors (noise components) generated at a certain phase, whereby the image quality of a final SR image can be improved.

Figure 7:
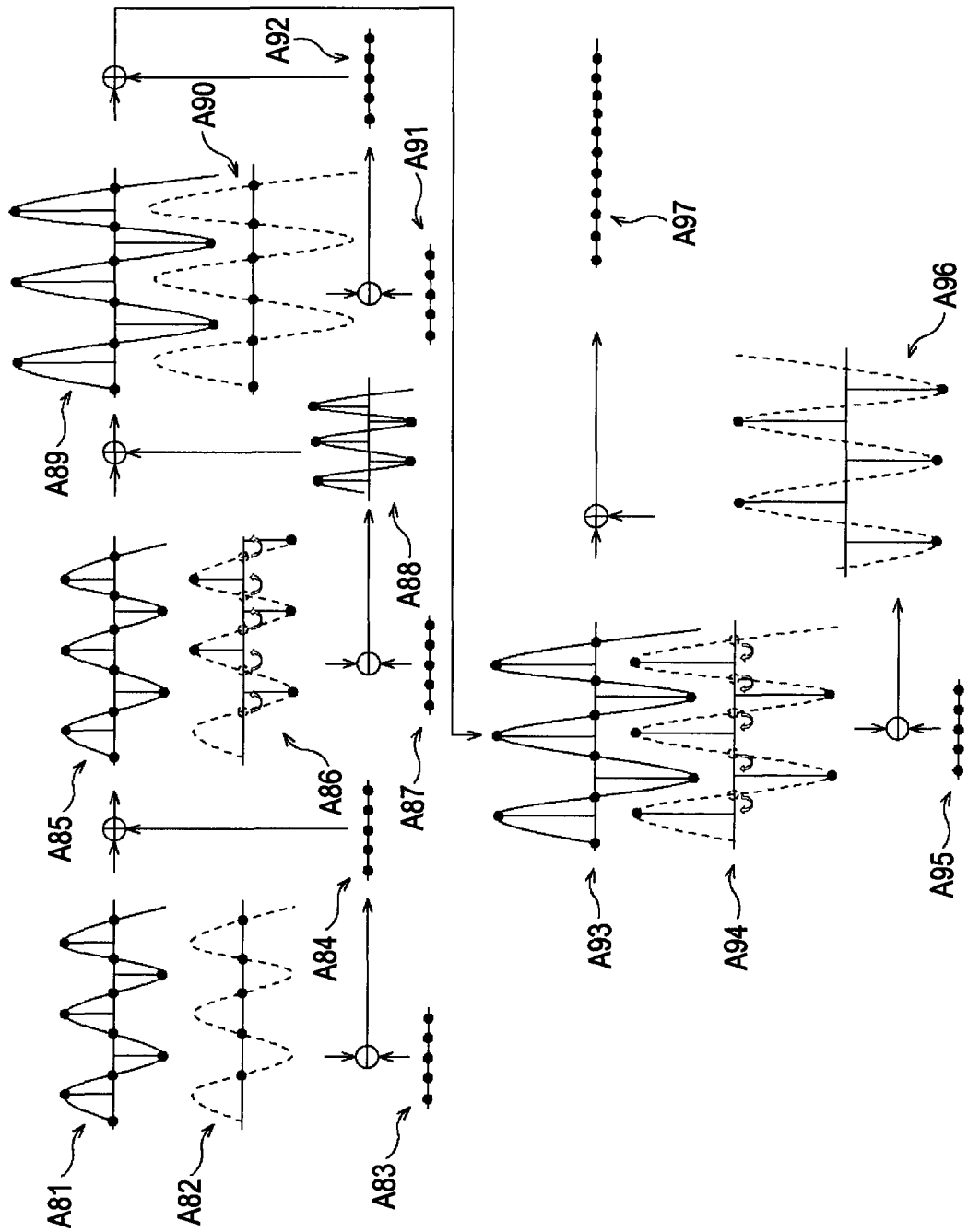
FIG. 7 is a diagram illustrating an outline of the processing of the image processor according to the embodiment of the present invention.

When the phases of the pixels used for generation of the reduced image are changed for each frame (time), there may occur a case, for example, where the noise in the combined image is temporarily amplified as illustrated in FIG. 7. In FIG. 7, the vertical direction represents the pixel values of pixels of an image, and the rightward direction represents the x-direction. In addition, each circle represents each pixel on the image.

Referring to FIG. 7, a waveform indicated by an arrow A81 represents the waveform of a combined image of the current frame. The waveform of the combined image indicated by the arrow A81 has the same shape as the waveform of the combined image indicated by the arrow A51 of FIG. 6.

Now, it will be assumed that the pixels of the combined image indicated by the arrow A81 are sampled every other pixel by starting with the third pixel from the left in the figure so as to generate a reduced image in the x-direction indicated by an arrow A82. In this case, the waveform of the obtained reduced image has a flat shape without any change in the x-direction, and the original waveform of the combined image is not properly preserved.

Moreover, when the waveform of the LR image of the current frame has a flat shape without any change in the x-direction of the figure as indicated by an arrow A83, a differential image having a waveform indicated by an arrow A84 is obtained by calculating a difference between the reduced image and the LR image. The waveform of the differential image has a shape such that it is flat in the x-direction, and errors generated in the combined image are not detected in the differential image. Therefore, the errors, i.e., noise components are not removed from the SR image obtained by addition of the differential image and the combined image.

The SR image obtained thus is used for generation of a combined image of a subsequent frame. For example, it will be assumed that a combined image of a subsequent frame is generated using the SR image obtained from the differential image indicated by the arrow A84, whereby a combined image having a waveform indicated by an arrow A85 is obtained. The combined image indicated by the arrow A85 has the same waveform as the waveform of the combined image indicated by the arrow A81.

In the image processor, using the combined image indicated by the arrow A85, a reduced image which is composed of the pixels at a predetermined phase of the combined image as indicated by an arrow A86 is generated. The dotted circles of the waveform of the combined image indicated by the arrow A86 represent the positions of the pixels which are sampled at the time of generating the reduced image in the previous frame. The dotted circles represent the pixels at the same phase as the pixels of the combined image indicated by the arrow A81, which are used for generating the reduced image.

In the example indicated by the arrow A86, the left adjacent pixels in the figure of the pixels of the combined image used at the time of generating the reduced image of the previous frame are used for generation of a reduced image of a current frame being processed. In the image processor, the reduced image composed of such pixels is generated, and the waveform of the reduced image has substantially the same shape as the waveform of the combined image indicated by the arrow A85, namely, a sinusoidal shape. However, in this reduced image, the subject on the combined image is shifted leftward in the figure by one pixel from the center of the reduced image.

When a difference between the reduced image obtained thus and an LR image having a waveform as indicated by an arrow A87 having a shape such that it is flat in the x-direction is calculated, a differential image having a waveform indicated by an arrow A88 is obtained. The waveform of the differential image has the same shape as the waveform of the combined image indicated by the arrow A85.

Therefore, when the differential image is added to the combined image indicated by the arrow A85, an SR image is obtained in which errors (noise components) are amplified. When a combined image of a subsequent frame is generated using such an SR image, a combined image having a waveform as indicated by an arrow A89 is obtained in which the noise components of the combined image indicated by the arrow A85 are amplified.

Furthermore, in the image processor, as indicated by the arrow A90, a reduced image is generated which is composed of the pixels at the same phase as the pixels of the combined image, which are used for generation of the reduced image in the frame indicated by the arrow A82. As a result, the obtained reduced image will be an image having a waveform in which the original waveform of the combined image is not properly preserved.

When a difference between the obtained reduced image and an LR image having a waveform as indicated by an arrow A91 having a shape such that it is flat in the x-direction is calculated, a differential image having a waveform indicated by an arrow A92 is obtained. The waveform of the differential image has a shape such that it is flat in the x-direction. The differential image is added to a combined image indicated by an arrow A89 to obtain an SR image; however, the SR image will be an image in which the amplified noise components are accumulated as they are.

Furthermore, it will be assumed that from this SR image, a combined image having a waveform having a sinusoidal shape as indicated by an arrow A93 is obtained in a subsequent frame. Then, as indicated by an arrow A94, a reduced image is generated which is composed of the pixels at a predetermined phase of the combined image indicated by the arrow A93. The dotted circles of the waveform of the combined image indicated by the arrow A94 represent the positions of the pixels of the combined image of the frame indicated by the arrow A82, which are sampled at the time of generating the reduced image.

In the example indicated by the arrow A94, the left adjacent pixels in the figure of the pixels of the combined image used for generating the reduced image from the combined image of the frame indicated by the arrow A82 are used for generation of a reduced image in the current frame being processed. In the image processor, the reduced image composed of such pixels is generated, and the waveform of the reduced image has the same shape as the waveform of the combined image indicated by the arrow A93.

When the waveform of an LR image of a new frame to be processed has a flat shape without any change in the x-direction as indicated by an arrow A95, a differential image having a waveform indicated by an arrow A96 is obtained by calculating a difference between the reduced image and the LR image. The waveform of the differential image has a shape such that the waveform of the combined image indicated by the arrow A93 is reversed in the vertical direction of the figure with respect to the central position in the pixel value direction of the waveform.

Since the original waveform of the combined image is properly preserved in the reduced image of this frame, the waveform of the differential image indicated by an arrow A96 has a shape which is indicative of an error between the combined image and the LR image. Therefore, when this differential image is added to the combined image indicated by the arrow A93, an SR image having higher image quality is obtained in which errors (noise components) are removed as indicated by an arrow A97. As seen from the waveform of the SR image indicated by the arrow A97, the waveform has the same shape as the waveform of the LR image indicated by the arrow A95, and the noise components which have been accumulated without being detected are removed.

In this way, by changing the phases of the pixels of the combined image to be used for generating the reduced image from frame to frame, the noise components are removed by a repeated super-resolution process even when errors are temporarily amplified and accumulated, whereby a final SR image having a high quality can be obtained.

First Embodiment

Configuration of Image Processor

Figure 8:
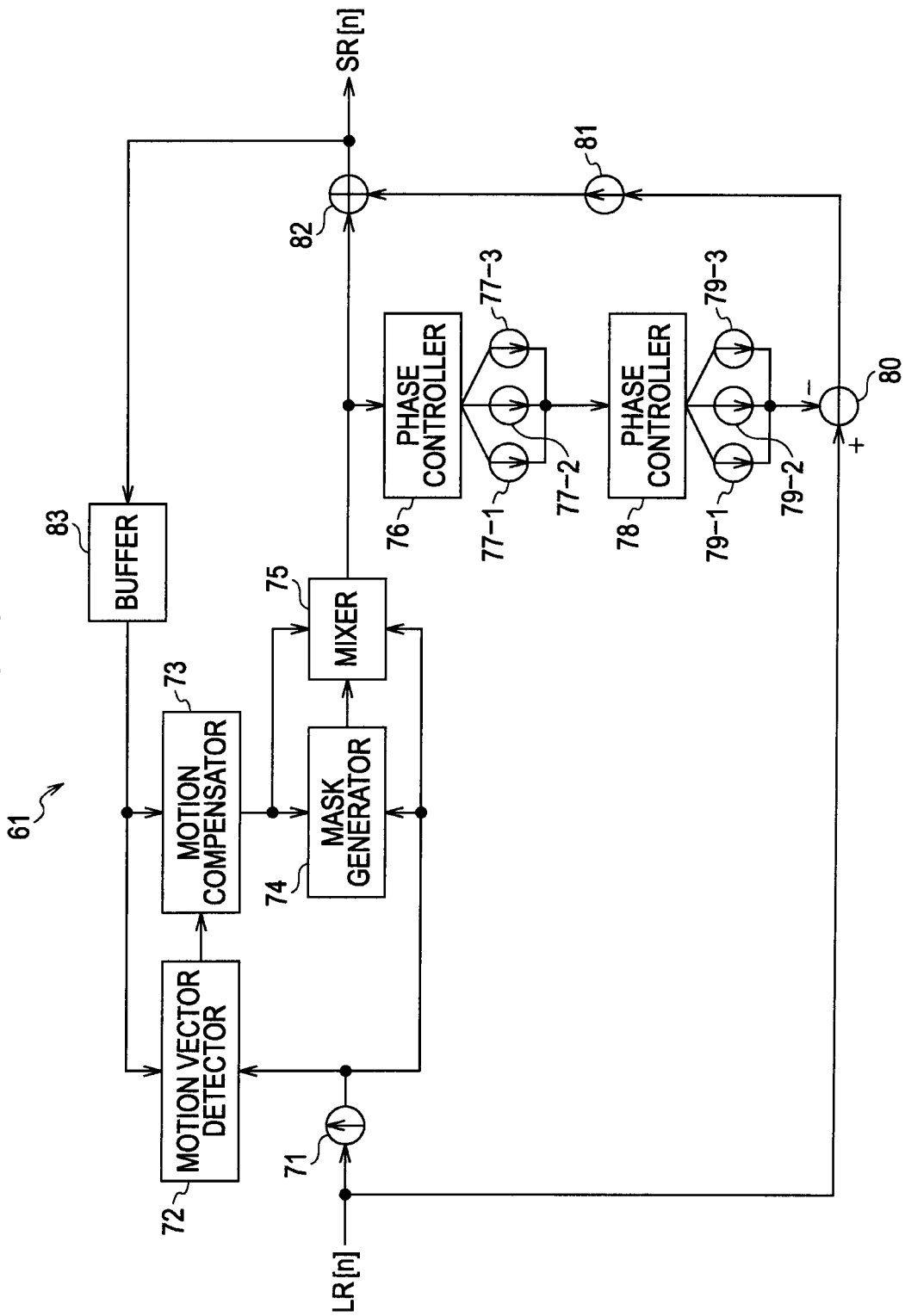
FIG. 8 is a diagram illustrating an exemplary configuration of the image processor according to the embodiment of the present invention.

Next, an embodiment of the image processor performing the above-described super-resolution process will be described. FIG. 8 is a diagram illustrating an exemplary configuration of an image processor according to an embodiment of the present invention.

The image processor 61 includes an up-sampler 71, a motion vector detector 72, a motion compensator 73, a mask generator 74, a mixer 75, a phase controller 76, down-samplers 77-1 to 77-3, a phase controller 78, down-samplers 79-1 to 79-3, a subtractor 80, an up-sampler 81, an adder 82, and a buffer 83.

The image processor 61 receives an LR image of one frame to be processed, and the input LR image is supplied to the up-sampler 71 and the subtractor 80.

The up-sampler 71 up-samples the supplied LR image to an image with the same resolution as an SR image, which will be generated from now on, and supplies the up-sampled image to the motion vector detector 72, the mask generator 74, and the mixer 75.

The motion vector detector 72 calculates a motion vector of the whole SR image from the LR image supplied from the up-sampler 71 and an SR image of a previous frame earlier than the current frame being processed, supplied from the buffer 83, and supplies the motion vector to the motion compensator 73.

The motion compensator 73 performs motion compensation using the motion vector supplied from the motion vector detector 72 and an SR image supplied from the buffer 83 to generate a prediction image. Specifically, the motion compensator 73 moves the whole SR image by a distance the same as the magnitude of the motion vector in a direction indicated by the motion vector, thus generating an image obtained thus as the prediction image. The prediction image is an image obtained by predicting an SR image of the current frame by motion compensation using the SR image of the previous frame to the current frame. The prediction image is supplied from the motion compensator 73 to the mask generator 74 and the mixer 75.

The mask generator 74 generates a motion mask using the LR image supplied from the up-sampler 71 and the prediction image supplied from the motion compensator 73 and supplies the motion mask to the mixer 75. The motion mask is information used for specifying a region of the LR image in which a moving subject is displayed, and which is generated by calculating a difference between the LR image and the prediction image.

The mixer 75 performs weighted addition of the prediction image supplied from the motion compensator 73 and the LR image supplied from the up-sampler 71 using the motion mask supplied from the mask generator 74 and supplies a combined image obtained thus to the phase controller 76 and the adder 82.

The phase controller 76 selects a phase of the combined image to be used for generating the reduced image and changes an output destination of the combined image supplied from the mixer 75 in accordance with the selected phase. That is to say, the phase controller 76 supplies the supplied combined image to any one of the down-samplers 77-1 to 77-3.

Each of the down-samplers 77-1 to 77-3 samples the pixels at a predetermined phase of the combined image supplied from the phase controller 76 and generates an image composed of such pixels, thus down-sampling the combined image in the x-direction. Each of the down-samplers 77-1 to 77-3 supplies the generated image to the phase controller 78. In the following description, when it is not necessary to distinguish particularly between the down-samplers 77-1 to 77-3, they will be simply referred to as a down-sampler 77.

The phase controller 78 selects a phase of the combined image to be used for generating the reduced image and changes an output destination of the image supplied from the down-sampler 77 in accordance with the selected phase. That is to say, the phase controller 78 supplies the supplied image to any one of the down-samplers 79-1 to 79-3.

Each of the down-samplers 79-1 to 79-3 samples the pixels at a predetermined phase of the image supplied from the phase controller 78 and generates a reduced image composed of such pixels. In this way, the combined image is down-sampled in a direction (hereinafter referred to as a y-direction) perpendicular to the x-direction, and thus, a reduced image with the same resolution as the LR image is obtained.

Each of the down-samplers 79-1 to 79-3 supplies the generated reduced image to the subtractor 80. In the following description, when it is not necessary to distinguish particularly between the down-samplers 79-1 to 79-3, they will be simply referred to as a down-sampler 79.

The subtractor 80 subtracts the reduced image supplied from the down-sampler 79 from the LR image supplied thereto to calculate a difference between the LR image and the reduced image and supplies a differential image obtained thus to the up-sampler 81. The up-sampler 81 up-samples the differential image supplied from the subtractor 80 to an image with the same resolution as the SR image and supplies an enlarged image obtained thus to the adder 82.

The adder 82 adds the combined image supplied from the mixer 75 and the enlarged image supplied from the up-sampler 81 to generate an SR image and supplies the SR image to a subsequent stage while supplying the SR image to the buffer 83 to be stored therein. The buffer 83 stores the SR image supplied from the adder 82 only for one frame period and supplies the SR image stored therein to the motion vector detector 72 and the motion compensator 73 when a subsequent frame is processed.

The down-sampler 77 and the down-sampler 79 are configured to down-sample the combined image by generating an image which is composed of the pixels at a predetermined phase (position) of the combined image.

Figure 9:
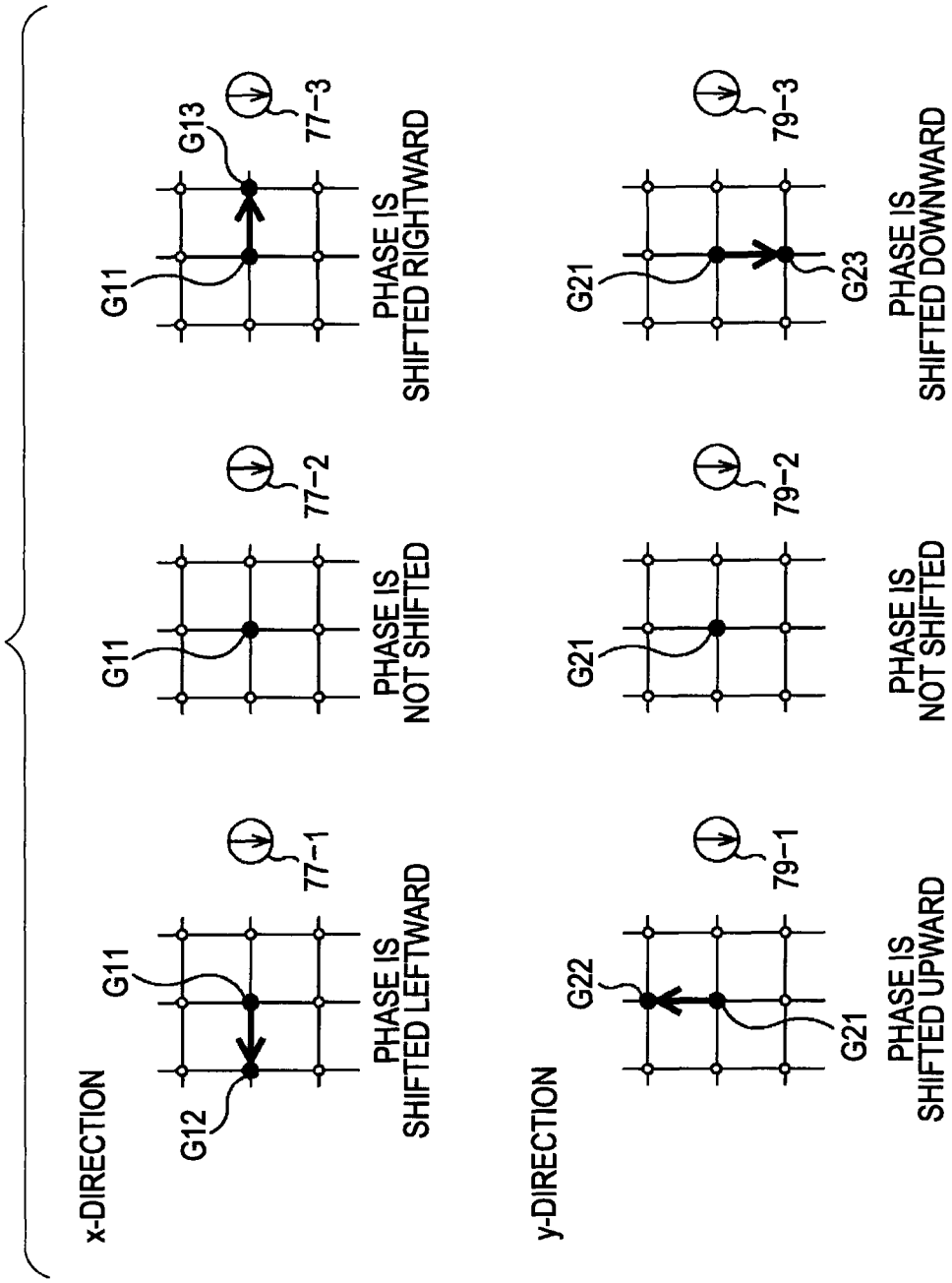
FIG. 9 is a diagram illustrating the phases of the pixels used for generation of a reduced image.

For example, as illustrated in FIG. 9, the down-samplers 77 and 79 sample pixels at different phases based on a predetermined reference phase. In FIG. 9, the rightward direction represents the x-direction, and the downward direction represents the y-direction. In addition, in the figure, each circle represents each pixel on the combined image.

The down-sampler 77-1 samples a left adjacent pixel G12 of a reference pixel G11 which serves as a reference pixel on the combined image, as depicted on the top left of the figure. Here, the reference pixel G11 will be assumed as being a plurality of pixels which are arranged at predetermined intervals on the combined image. For example, when the combined image is down-sampled in the x-direction to half its pixel count, a predetermined number of pixels on the combined image, which are arranged every other pixel in the x-direction, will be assumed as being the reference pixel G11.

The down-sampler 77-2 samples the reference pixel G11 on the combined image, as depicted on the top center of the figure. The down-sampler 77-3 samples a right adjacent pixel G13 of the reference pixel G11 on the combined image, as depicted on the top right of the figure.

The down-sampler 79-1 samples an upper adjacent pixel G22 of a reference pixel G21 which serves as a reference pixel on the combined image which is down-sampled in the x-direction, as depicted on the bottom left of the figure. Here, the reference pixel G21 will be assumed as being a plurality of pixels which are arranged at predetermined intervals on the combined image which is down-sampled in the x-direction. For example, when the combined image is down-sampled in the y-direction to half its pixel count, a predetermined number of pixels on the combined image, which are arranged every other pixel in the y-direction, will be assumed as being the reference pixel G21.

The down-sampler 79-2 samples the reference pixel G21 on the combined image, as depicted on the bottom center of the figure. The down-sampler 79-3 samples a lower adjacent pixel G23 of the reference pixel G21 on the combined image, as depicted on the bottom right of the figure.

Each of the phase controllers 76 and 78 selects for each frame as to which one of the down-samplers 77 and 79 will be used for down-sampling the combined image.

Figure 10:
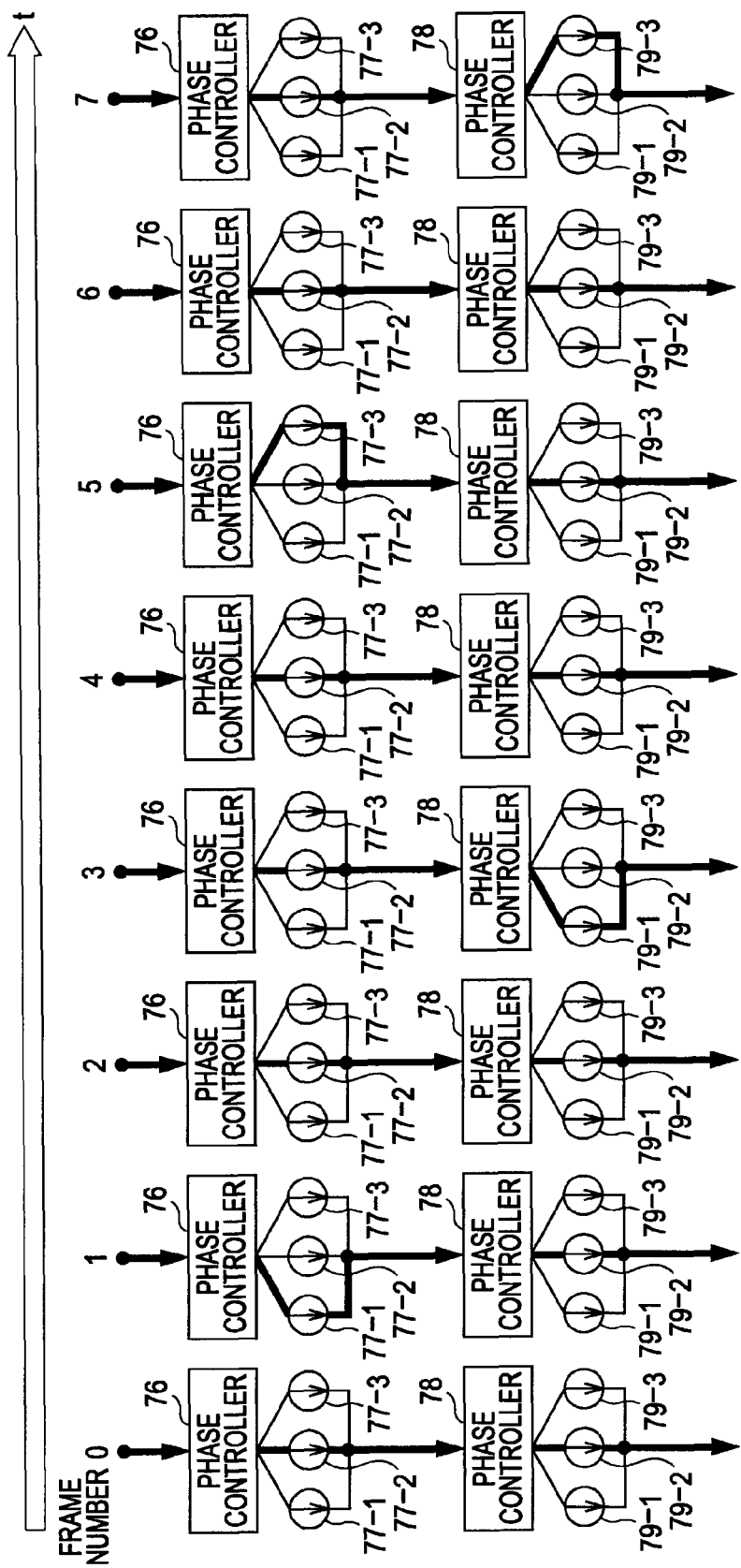
FIG. 10 is a diagram illustrating changes in the phases of the pixels used for the generation of the reduced image.

For example, as illustrated in FIG. 10, each of the phase controllers 76 and 78 selects the output destination of the combined image so that the phases of the pixels to be sampled are changed in a predetermined pattern.

In FIG. 10, the rightward direction represents time, and the number above each phase controller 76 represents a number that identifies the frame of the combined image to be processed. Specifically, the frames are processed in the order from the 0th frame indicated by "0" to the 7th frame indicated by "7". In addition, the bold line extending from the phase controller 76 to the down-sampler 79 represents a path along which the combined image is supplied.

In the 0th frame which is first processed, the combined image is supplied from the phase controller 76 to the down-sampler 77-2, and the combined image supplied from the down-sampler 77-2 to the phase controller 78 is then supplied to the down-sampler 79-2.

In the 1st frame subsequent to the 0th frame, the combined image is supplied from the phase controller 76 to the down-sampler 77-1, and the combined image supplied from the down-sampler 77-1 to the phase controller 78 is then supplied to the down-sampler 79-2.

In this way, in the 0th frame and the 1st frame which are consecutive in time, a reduced image is generated which is composed of the pixels at different phases (positions) of the combined image. Thus, accumulation of noise components (errors) is prevented.

Similarly, in the 2nd frame subsequent to the 1st frame, the combined image is supplied to the down-sampler 77-2 and the down-sampler 79-2. That is to say, the reference pixel G11 of the combined image is sampled by the down-sampler 77-2, and the reference pixel G21 of the combined image is sampled by the down-sampler 79-2, whereby a reduced image is generated.

In the 3rd frame, the combined image is supplied to the down-sampler 77-2 and the down-sampler 79-1. In the 4th frame, the combined image is supplied to the down-sampler 77-2 and the down-sampler 79-2.

In the 5th frame, the combined image is supplied to the down-sampler 77-3 and the down-sampler 79-2. In the 6th frame, the combined image is supplied to the down-sampler 77-2 and the down-sampler 79-2. In the 7th frame, the combined image is supplied to the down-sampler 77-2 and the down-sampler 79-3.

In the 8th and later frames, the same pattern as the 0th to 7th frames is repeated, whereby the combined image is supplied to each down-sampler 77 and each down-sampler 79. Therefore, in the (1+8i)th frame (where i is a natural number), the combined image is supplied to the down-sampler 77-1 and the down-sampler 79-2.

When the amount of shifting in the phase of the pixels of the combined image used for generation of the reduced image is increased, the amount of a positional shift between the position of the subject in the reduced image and the position of the subject in the combined image will increase, whereby new errors (noise components) different from the errors generated at the time of generating the combined image will be generated in the SR image. Therefore, it is preferable that the amount of shifting in the phase of the pixels of the combined image is set as small as possible.

The phases of the pixels of the combined image to be used for generating the reduced image may be changed in a predetermined pattern and may be randomly selected for each frame.

Operation of Image Processor

Figure 11:
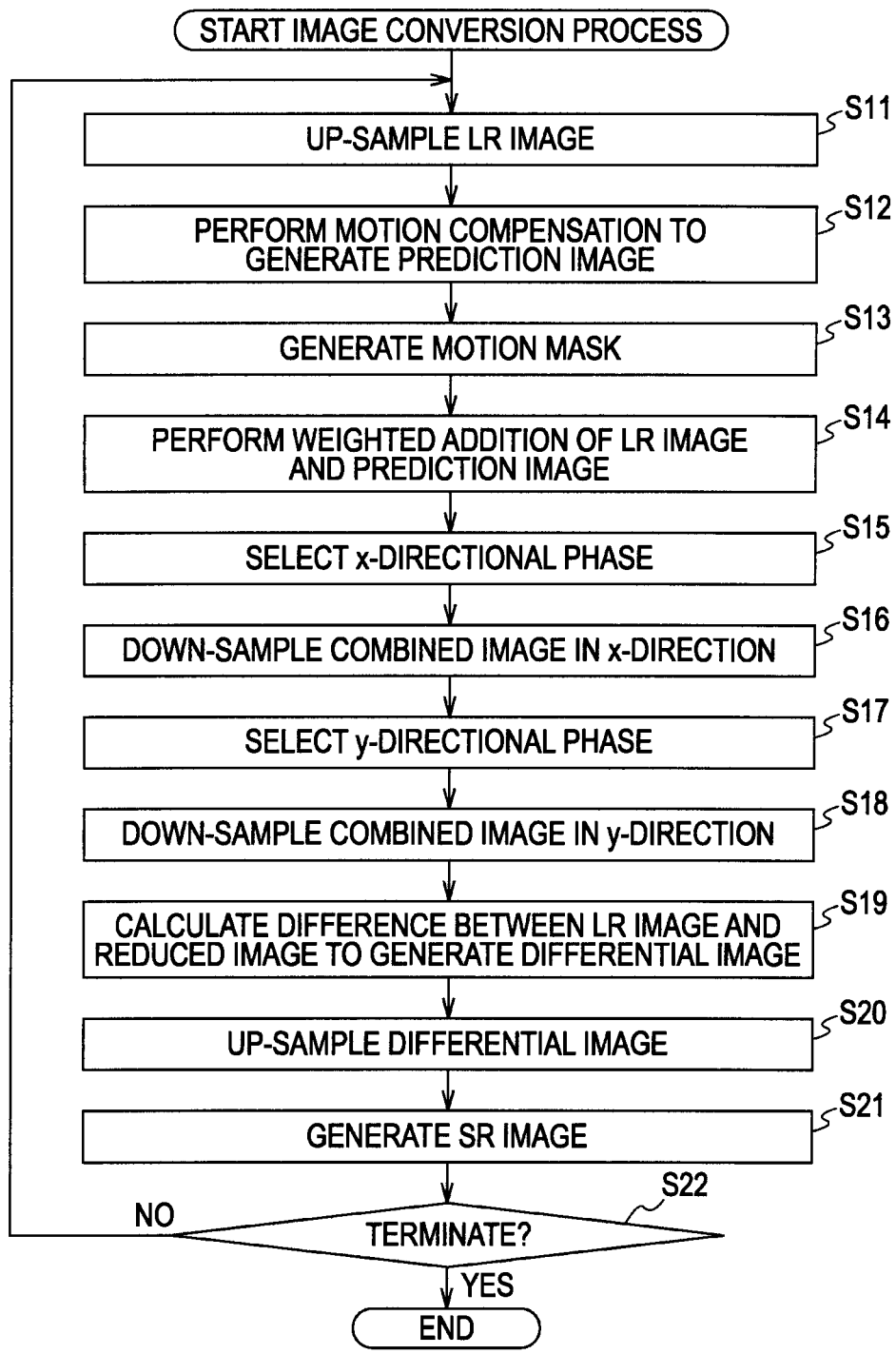
FIG. 11 is a flowchart illustrating an image conversion process.

Next, the operation of the image processor 61 described above will be described. When an LR image is supplied to the image processor 61, the image processor 61 starts an image conversion process which is a process of converting the LR image of each frame to an SR image by a super-resolution process. Hereinafter, by referring to the flowchart of FIG. 11, the image conversion process by the image processor 61 will be described.

At step S11, the up-sampler 71 up-samples an LR image supplied thereto to an image with the same resolution as an SR image, which will be generated from now on, and supplies the up-sampled image to the motion vector detector 72, the mask generator 74, and the mixer 75.

At step S12, the motion compensator 73 performs motion compensation to generate a prediction image.

Specifically, the motion vector detector 72 calculates one motion vector of the whole SR image from the LR image supplied from the up-sampler 71 and an SR image supplied from the buffer 83 and supplies the motion vector to the motion compensator 73. Moreover, the motion compensator 73 moves the whole SR image by a distance the same as the magnitude of the motion vector in a direction indicated by the motion vector supplied from the motion vector detector 72 to generate a prediction image and supplies the generated prediction image to the mask generator 74 and the mixer 75.

At step S13, the mask generator 74 generates a motion mask using the LR image supplied from the up-sampler 71 and the prediction image supplied from the motion compensator 73 and supplies the motion mask to the mixer 75.

For example, the mask generator 74 sequentially uses each pixel of a motion mask, which will be obtained from now on, as a target pixel, and calculates a difference between the pixel value of a pixel of the LR image and the pixel value of a pixel of the prediction image, the pixels being located at the same position as the target pixel. The mask generator 74 uses the pixel value of the target pixel to a value which is determined with respect to the absolute value of the calculated difference. For example, the pixel value of the target pixel has a larger value as the absolute value of the difference decreases.

Therefore, in a region of the motion mask where the pixel value of a pixel is small, the difference between the LR image and the prediction image becomes larger, and the errors in the prediction based on the motion compensation become larger. In other words, a region of the motion mask where the pixel value of a pixel is large can be said to be a region of the LR image where the subject shows a motion different from the motion of the whole LR image; that is, a region where the subject is moving relative to the whole LR image.

At step S14, the mixer 75 performs weighted addition of the prediction image supplied from the motion compensator 73 and the LR image supplied from the up-sampler 71 using the motion mask supplied from the mask generator 74 to generate a combined image and supplies the combined image to the phase controller 76 and the adder 82.

For example, the mixer 75 sequentially uses each pixel of a combined image, which will be obtained from now on, as a target pixel. Then, based on the pixel value of the pixel of the motion mask at the same position as the target pixel, the mixer 75 calculates a weighting factor Wi ($0 \leq Wi \leq 1$) of the pixel of the LR image at the same position as the target pixel and a weighting factor Wj ($=1-Wi$) of the pixel of the prediction image at the same position as the target pixel.

The mixer 75 uses, as the pixel value of the target pixel, a value obtained by the addition of the pixel value of the pixel of the LR image at the same position as the target pixel, multiplied by the weighting factor Wi, and the pixel value of the pixel of the prediction image at the same position as the target pixel, multiplied by the weighting factor Wj. In this way, the mixer 75 uses each pixel of the combined image as the target pixel and calculates the pixel values of such pixels, thus generating a combined image.

When performing weighted addition of the LR image and the prediction image, the weighting factor Wi is set to be larger as the pixel value of the pixel of the motion mask decreases. This is to increase the contribution ratio of the LR image to the generation of the combined image in the region where the pixel value of the pixel of the motion mask is small, namely a region where the accuracy of the prediction based on the motion compensation is low, thus preventing image quality deterioration of the combined image.

At step S15, the phase controller 76 selects the x-directional phase of the combined image to be used for generating a reduced image. For example, when the x-directional phase is changed in the pattern described with reference to FIG. 10, the phase controller 76 selects the phase based on the frame number in FIG. 10 of the current frame being processed.

The phase controller 76 supplies the combined image supplied from the mixer 75 to the down-sampler 77 corresponding to the selected phase and causes x-directional down-sampling to be performed. For example, when the current frame corresponds to the 5th frame in FIG. 10, the combined image is supplied to the down-sampler 77-3.

At step S16, the down-sampler 77 performs x-directional down-sampling on the combined image supplied from the phase controller 76 and supplies an image obtained thus to the phase controller 78. Specifically, the down-sampler 77 samples the pixels at a predetermined phase of the supplied combined image to generate an image composed of the sampled pixels.

At step S17, the phase controller 78 selects the y-directional phase of the combined image to be used for generating a reduced image. For example, when the y-directional phase is changed in the pattern described with reference to FIG. 10, the phase controller 78 selects the phase based on the frame number in FIG. 10 of the current frame being processed.

The phase controller 78 supplies the combined image supplied from the down-sampler 77 to the down-sampler 79 corresponding to the selected phase and causes y-directional down-sampling to be performed.

At step S18, the down-sampler 79 performs y-directional down-sampling on the combined image supplied from the phase controller 78 and supplies an image obtained thus to the subtractor 80. Specifically, the down-sampler 79 samples the pixels at a predetermined phase of the supplied combined image to generate a reduced image composed of the sampled pixels.

In this way, by down-sampling the combined image in the x and y-directions, a reduced image with the same resolution as the LR image is generated, and the generated reduced image is supplied to the subtractor 80.

At step S19, the subtractor 80 calculates a difference between the LR image supplied thereto and the reduced image supplied from the down-sampler 79 to generate a differential image. Specifically, the pixel values of the pixels of the differential image are used as the values of the difference between the pixel values of the pixels of the LR image and the pixel values of the pixels of the reduced image at the same positions as the pixels.

The pixel values of the pixels of the differential image generated thus represent the difference between the reduced image obtained by predicting the LR image (SR image) and the real LR image. Therefore, when the combined image is corrected by the amount of the difference, an SR image will be obtained in which the LR image is more faithfully enlarged; that is to say, an SR image will be obtained in which the waveform of the LR image is preserved as it is. The subtractor 80 supplies the generated differential image to the up-sampler 81.

At step S20, the up-sampler 81 up-samples the differential image supplied from the subtractor 80 to an image with the same resolution as the SR image and supplies an enlarged image obtained thus to the adder 82.

At step S21, the adder 82 adds the combined image supplied from the mixer 75 and the enlarged image supplied from the up-sampler 81 to generate an SR image of the current frame and supplies the SR image to a subsequent stage while supplying the SR image to the buffer 83 to be stored therein.

At step S22, the image processor 61 determines whether or not the process should be terminated. For example, the process is determined to be terminated when the supply of the LR image to the image processor 61 stops and a process termination command is received.

When it is determined at step S22 that the process should not be terminated, the process returns to step S11 and the above-described processes are repeated. That is to say, the LR image of a subsequent frame is used as the LR image of the current frame being processed and converted to an SR image by a super-resolution process.

When it is determined at step S22 that the process should be terminated, each part of the image processor 61 terminates its pending processes, and the image conversion process ends.

In this way, the image processor 61 performs a super-resolution process on the input LR image and converts the LR image to the SR image. In particular, when generating the reduced image by down-sampling the combined image obtained by prediction, the image processor 61 changes the phases of the pixels to be used for generating the reduced image from frame to frame.

As described above, since the phases of the pixels of the combined image to be used for generating the reduced image are changed slightly from frame to frame, it is possible to prevent accumulation of errors (noise components) generated at a certain phase in the SR image, whereby the image quality of the SR image can be improved.

Furthermore, since the phases of the pixels to be used for generating the reduced image are shifted slightly for each frame in accordance with a predetermined pattern, it is not necessary to specify the phase of the pixels of the combined image so that the original waveform of the combined image is preserved in the reduced image. Therefore, it is possible to obtain the SR image more quickly.

Second Embodiment

Configuration of Image Processor

Although it has been described that the reduced image is generated by sampling the pixels of the combined image, the reduced image may be generated by performing a filtering process on the combined image.

Figure 12:
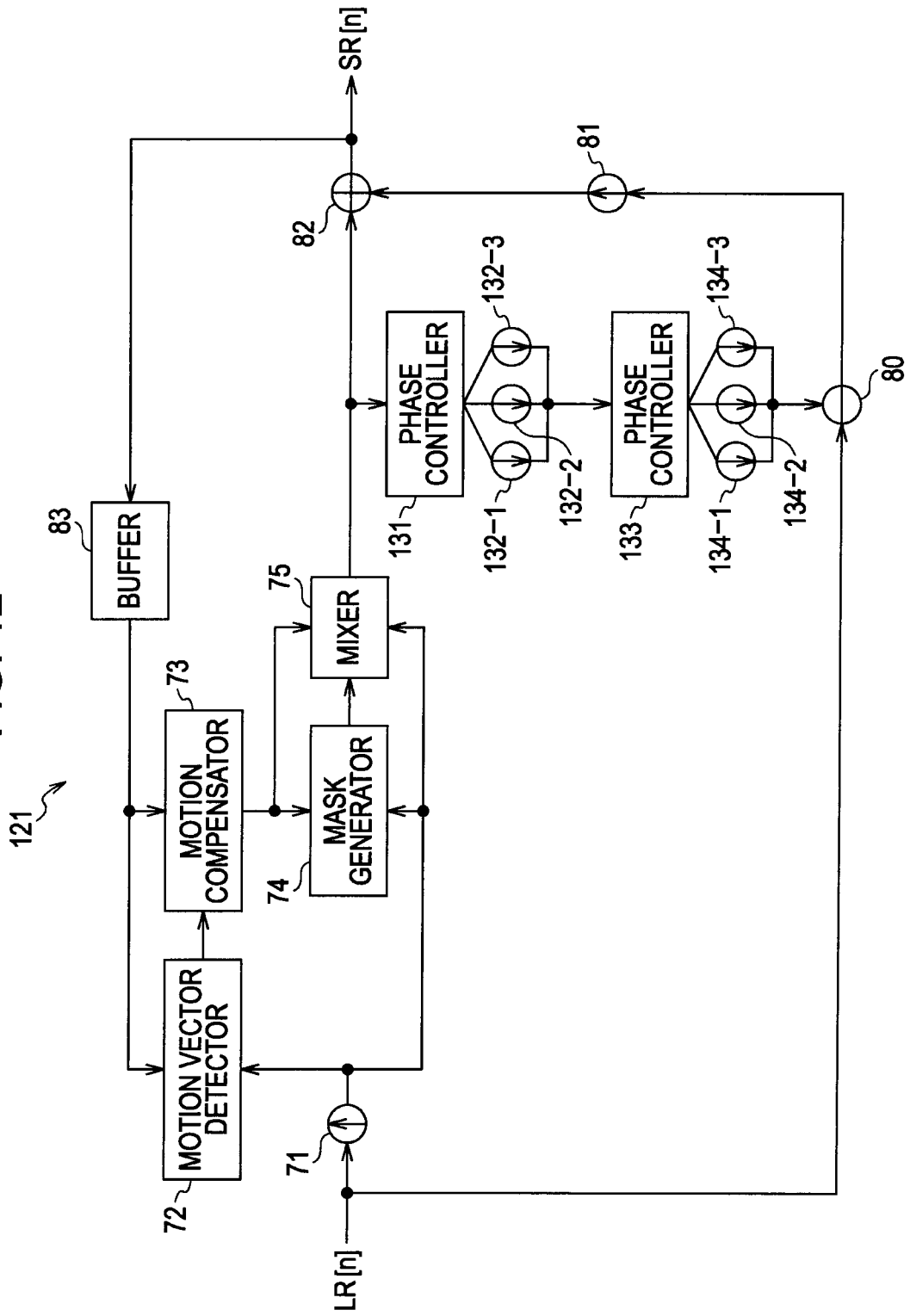
FIG. 12 is a diagram illustrating another exemplary configuration of an image processor according to an embodiment of the present invention.

In such a case, the image processor may be configured as illustrated in FIG. 12, for example. In FIG. 12, the same or corresponding portions as those in FIG. 8 will be denoted by the same reference numerals, and description thereof will be appropriately omitted.

The image processor 121 of FIG. 12 includes a phase controller 131, filtering processors 132-1 to 132-3, a phase controller 133, and filtering processors 134-1 to 134-3, in lieu of the phase controller 76, the down-samplers 77-1 to 77-3, the phase controller 78, and the down-samplers 79-1 to 79-3 of the image processor 61.

The phase controller 131 selects the phase of the combined image to be used for generating the reduced image and changes an output destination of the combined image supplied from the mixer 75 in accordance with the selected phase. That is to say, the phase controller 131 supplies the supplied combined image to any one of the filtering processors 132-1 to 132-3.

Each of the filtering processors 132-1 to 132-3 calculates the pixels at a predetermined phase of the combined image supplied from the phase controller 131 by a filtering process and generates an image composed of the calculated pixels, thus down-sampling the combined image in the x-direction. Each of the filtering processors 132-1 to 132-3 supplies the generated image to the phase controller 133. In the following description, when it is not necessary to distinguish particularly between the filtering processors 132-1 to 132-3, they will be simply referred to as a filtering processor 132.

The phase controller 133 selects a phase of the combined image to be used for generating the reduced image and changes an output destination of the combined image supplied from the filtering processor 132 in accordance with the selected phase. That is to say, the phase controller 133 supplies the supplied combined image to any one of the filtering processors 134-1 to 134-3.

Each of the filtering processors 134-1 to 134-3 calculates the pixels at a predetermined phase of the combined image supplied from the phase controller 133 by a filtering process and generates a reduced image composed of the calculated pixels, thus down-sampling the combined image in the y-direction. Each of the filtering processors 134-1 to 134-3 supplies the generated reduced image to the subtractor 80. In the following description, when it is not necessary to distinguish particularly between the filtering processors 134-1 to 134-3, they will be simply referred to as a filtering processor 134.

As described above, in the filtering processor 132 or 134, the pixel values of the pixels are calculated by a filtering process. Therefore, the phase of the combined image selected by the phase controller 131 or 133 is not necessarily the position of the pixel on the combined image, but the phase may be shifted with an accuracy of a pixel or lower.

For example, it will be assumed that the filtering processor 132-2 calculates pixels at the phase of the reference pixel of the combined image, and the filtering processors 132-1 and 132-3 calculate pixels at a phase shifted by ½ pixel from the reference pixel of the combined image. More specifically, although no pixel exists at positions of the combined image separated by a distance of a pixel of smaller from the reference pixel, it is assumed that pixels exist at such positions, and the pixel values of the pixels are calculated.

Figure 13:
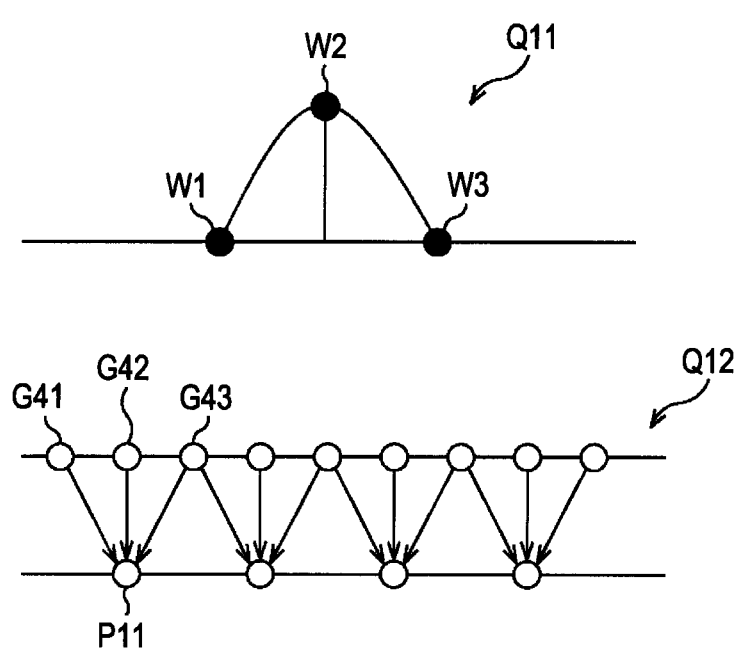
FIG. 13 is a diagram illustrating a filtering process performed at the time of generating a reduced image.

In such a case, the filtering processor 132-2 calculates pixels at the phase of the reference pixel by a 3-tap filtering process as illustrated in FIG. 13. In FIG. 13, the rightward direction represents the x-direction.

The filtering processor 132-2 multiplies three coefficients W1 to W3 as indicated by an arrow Q11 with the pixel values of three pixels around the reference pixel arranged in the x-direction on the combined image, respectively, thus calculating the sum of the pixel values. Among the coefficients indicated by the arrow Q11, the coefficient W2 represents a coefficient multiplied with the reference pixel, and the coefficients W1 and W3 represent coefficients multiplied with the adjacent pixels of the reference pixel, respectively.

In FIG. 13, the vertical direction represents the magnitude of each coefficient, and the coefficient has a larger value as it is located at the higher position. Specifically, the coefficients W1 and W3 have the same value, and the coefficients W1 and W3 have the smaller value than the coefficient W2.

The filtering processor 132-2 multiplies the coefficients W1 to W3 with the pixel values of the three pixels arranged in the x-direction to calculate a pixel value as indicated by an arrow Q12. In the example indicated by the arrow Q12, each circle represents each pixel. In addition, in the figure, the upper line of circles arranged in the horizontal direction (x-direction) in the figure represents a combined image, and the lower line of circles arranged in the horizontal direction in the figure represents an image obtained by performing x-directional down-sampling.

For example, when it is assumed that a pixel G42 positioned at the center of the pixels G41 to G43 on the combined image, which are arranged adjacent to each other in the x-direction, is a reference pixel, the pixel value of a pixel P11 is calculated using the pixels G41 to G43. This pixel P11 is a pixel of the combined image which will be calculated from now on, the combined image being down-sampled in the x-direction, and the pixel P11 is positioned at the same phase as the pixel G42 which is the reference pixel.

The filtering processor 132-2 multiplies the coefficients W1 to W3, respectively, with the pixel values of the pixels G41 to G43, calculates the sum of the pixel values multiplied with the coefficients W1 to W3, and uses a value obtained thus as the pixel value of the pixel P11.

Figure 14:
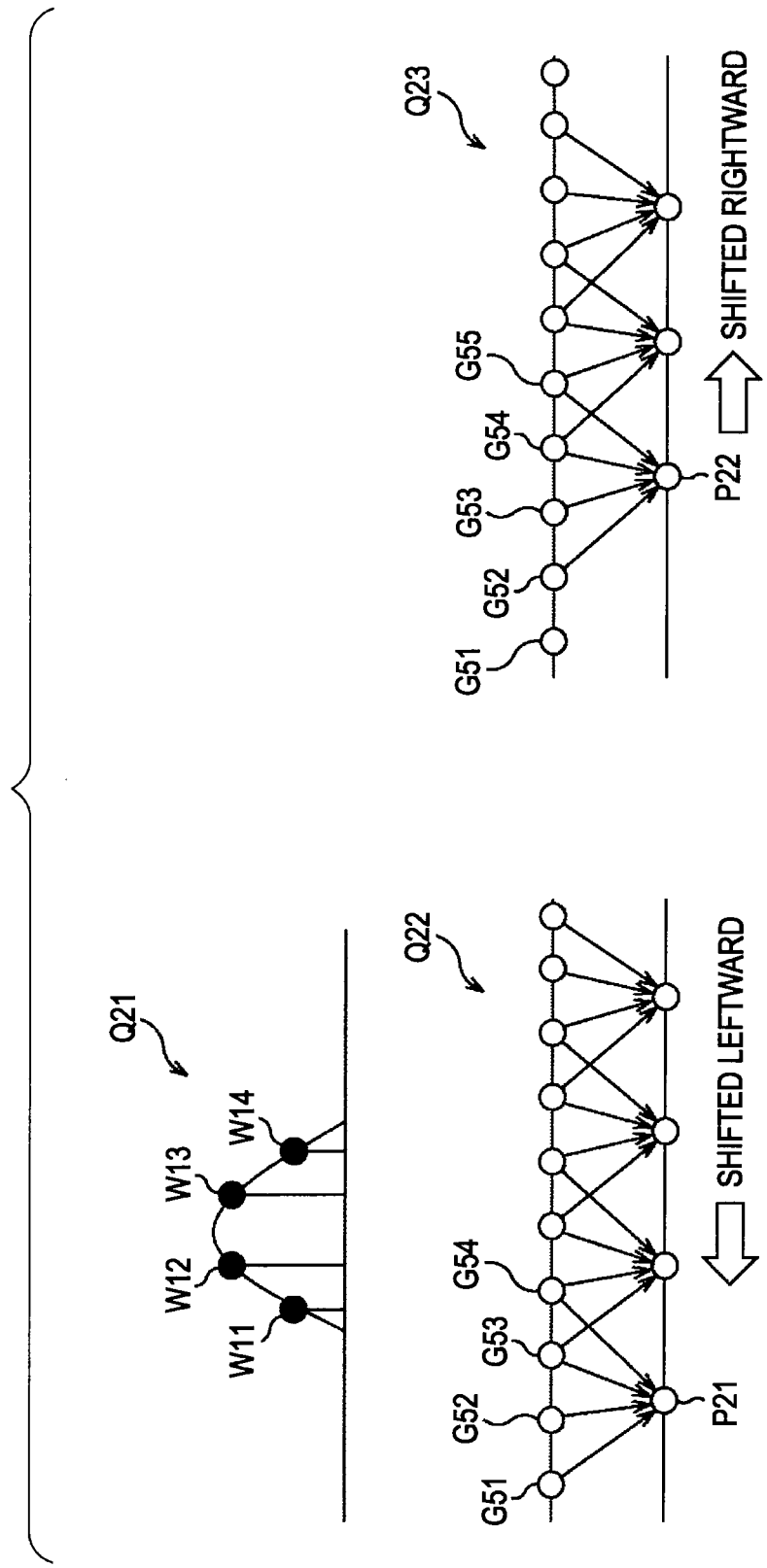
FIG. 14 is a diagram illustrating a filtering process performed at the time of generating a reduced image.

Each of the filtering processors 132-1 and 132-3 calculates the pixel at a phase shifted by ½ phase from the reference pixel by a 4-tap filtering process as illustrated in FIG. 14. In FIG. 14, the rightward direction represents the x-direction.

Each of the filtering processors 132-1 and 132-3 multiplies four coefficients W11 to W14 as indicated by an arrow Q21 with the pixel values of four pixels including the reference pixel arranged in the x-direction on the combined image, respectively, thus calculating the sum of the pixel values.

In FIG. 14, the vertical direction represents the magnitude of each coefficient, and the coefficient has a larger value as it is located at the higher position.

The coefficients W12 and W13 which are multiplied with adjacent pixels have the same value. The coefficients W11 and W14 which are multiplied with pixels located so as to surround the pixels multiplied with the coefficients W12 and W13 have the same value, and the coefficients W11 and W14 have the smaller value than the coefficients W12 and W13.

The filtering processor 132-1 multiplies the coefficients W11 to W14 with the pixel values of the four pixels arranged in the x-direction to calculate a pixel value as indicated by an arrow Q22. In the example indicated by the arrow Q22 and an arrow Q23 to be described, each circle represents each pixel. In addition, the upper line of circles arranged in the horizontal direction (x-direction) in the figure represents a combined image, and the lower line of circles arranged in the horizontal direction in the figure represents an image obtained by performing x-directional down-sampling.

For example, in the example indicated by the arrow Q22, when it is assumed that a pixel G53 positioned approximately at the center of the pixels G51 to G54 on the combined image, which are arranged adjacent to each other in the x-direction, is a reference pixel, the pixel value of a pixel P21 is calculated using the pixels G51 to G54. This pixel P21 is a pixel of the combined image which will be calculated from now on, the combined image being down-sampled in the x-direction, and the pixel P21 is positioned at a position (phase) separated leftward (in the opposite direction of the x-direction) in the figure by a distance of ½ pixel from the pixel G53 which is the reference pixel.

The filtering processor 132-1 multiplies the coefficients W11 to W14, respectively, with the pixel values of the pixels G51 to G54, calculates the sum of the pixel values multiplied with the coefficients W11 to W14, and uses a value obtained thus as the pixel value of the pixel P21.

The filtering processor 132-3 multiplies the coefficients W11 to W14 with the pixel values of the four pixels arranged in the x-direction to calculate a pixel value as indicated by an arrow Q23.

For example, when it is assumed that a pixel G53 positioned approximately at the center of the pixels G52 to G55 on the combined image, which are arranged adjacent to each other in the x-direction, is a reference pixel, the pixel value of a pixel P22 is calculated using the pixels G52 to G55. This pixel P22 is a pixel of the combined image which will be calculated from now on, the combined image being down-sampled in the x-direction, and the pixel P22 is positioned at a position (phase) separated rightward (in the x-direction) in the figure by a distance of ½ pixel from the pixel G53 which is the reference pixel.

The filtering processor 132-3 multiplies the coefficients W11 to W14, respectively, with the pixel values of the pixels G52 to G55, calculates the sum of the pixel values multiplied with the coefficients W11 to W14, and uses a value obtained thus as the pixel value of the pixel P22.

As described above, the filtering processor 132 performs the filtering process by using different pixels depending on whether it calculates a pixel at a phase shifted leftward or rightward from the reference pixel.

Specifically, when a pixel at a phase shifted leftward from the reference pixel is calculated, a pixel at a desired phase is calculated using the reference pixel, two left adjacent pixels of the reference pixel, and one right adjacent pixel of the reference pixel in the figure. When a pixel at a phase shifted leftward from the reference pixel is calculated, a pixel at a desired phase is calculated using the reference pixel, one left adjacent pixel of the reference pixel, and two right adjacent pixels of the reference pixel in the figure.

Similar to the case of the filtering processor 132 described with reference to FIGS. 13 and 14, the filtering processor 134 calculates a pixel at a desired phase using pixels arranged consecutively in the y-direction.

For example, the filtering processor 134-2 calculates the pixel value of a pixel at the same phase as the reference pixel of the combined image by a filtering process. The filtering processor 134-1 calculates the pixel value of a pixel at a phase (position) separated by a predetermined distance in the opposite direction of the y-direction from the reference pixel of the combined image by a filtering process. The filtering processor 134-3 calculates the pixel value of a pixel at a phase (position) separated by a predetermined distance in the y-direction from the reference pixel of the combined image by a filtering process.

Figure 15:
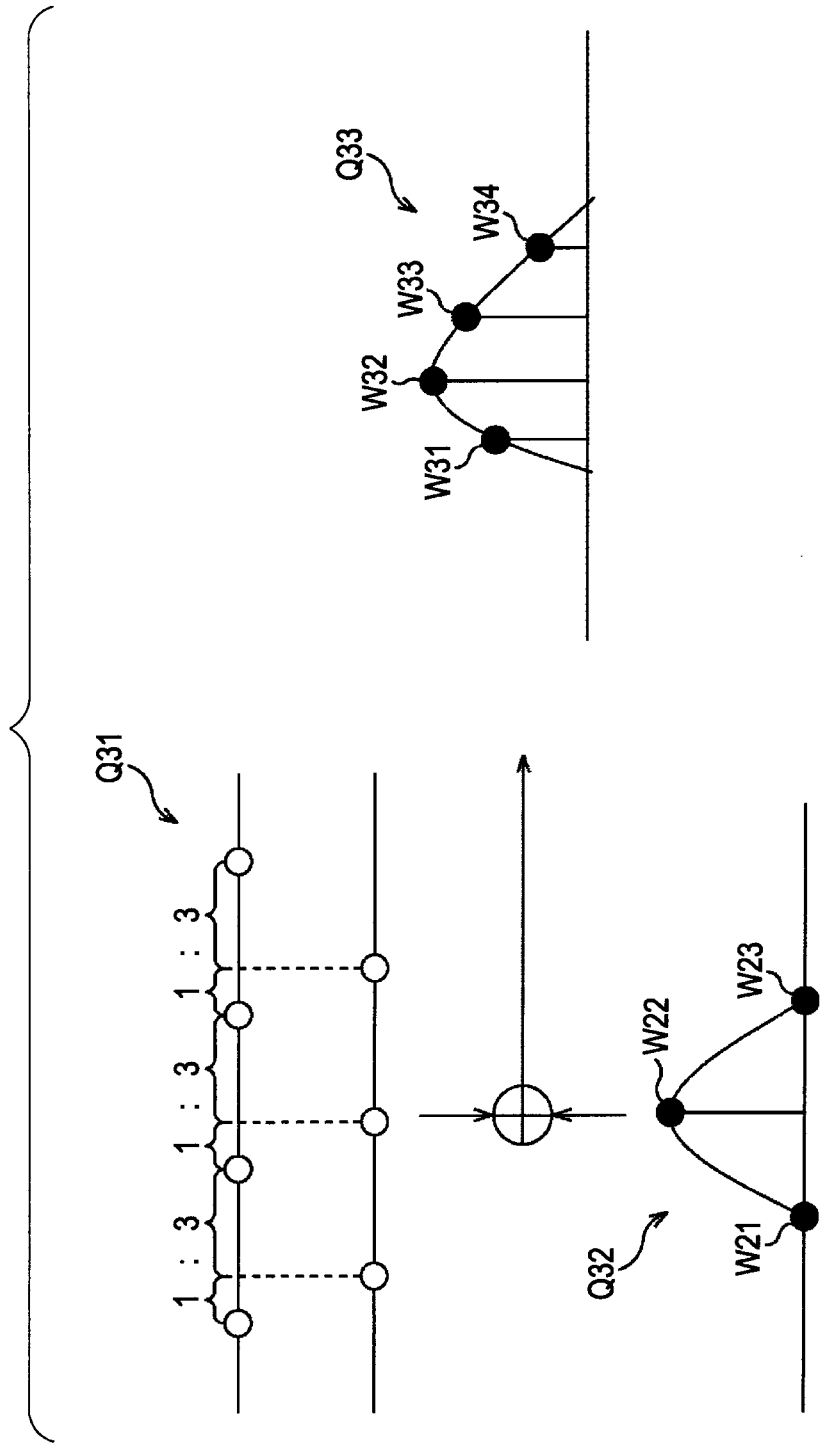
FIG. 15 is a diagram illustrating a filtering process performed at the time of generating a reduced image.

The phase of the pixel calculated by the filtering processor 132-1 or 132-3 is not limited to a position shifted by ½ pixel from the reference pixel but may be any position. For example, as illustrated in FIG. 15, a pixel at a position shifted by ¼ pixel from the reference pixel may be generated. In FIG. 15, the rightward direction represents the x-direction.

In general, when a pixel at a phase shifted rightward in the figure by ¼ phase from the reference pixel is calculated, each pixel of the combined image is first shifted rightward in the figure by ¼ pixel as indicated by an arrow Q31, and then, a filtering process is performed. In the example indicated by the arrow Q31, each circle in the figure represents one pixel. In addition, the upper line of circles represents a combined image, and the lower line of circles represents an image obtained by shifting the phase of each pixel of the combined image rightward in the figure by ¼ pixel.

When the phase of each pixel of the combined image is shifted in this manner, the pixel values of the three pixels of the phase-shifted combined image which are arranged in the x-direction are multiplied with coefficients W21 to W23 indicated by an arrow Q32, and the sum of the pixel values multiplied with the coefficients is calculated. The value of the calculated sum is used as the pixel value of the pixel at the position shifted rightward in the figure by ¼ pixel from the reference pixel.

In the example indicated by the arrow Q32 and an arrow Q33 to be described, the vertical direction in the figure represents the magnitude of each coefficient, and the coefficient has a larger value as it is located at the higher position.

In the example indicated by the arrow Q32, the coefficient W22 represents a coefficient multiplied with the phase-shifted reference pixel, and the coefficients W21 and W23 represent coefficients multiplied with the horizontally adjacent pixels of the phase-shifted reference pixel.

As described above, it is generally necessary to perform the filtering process after shifting the phase of the combined image. However, by using a 4-tap filtering process as indicated by an arrow Q33 with increased number of taps used in the filtering process, it is possible to calculate a pixel at a desired phase with simpler processing. That is to say, by just adjusting the coefficient of each tap appropriately, it is not necessary to generate an image obtained by shifting the phases of the combined image before the filtering process.

In the example indicated by the arrow Q33, the pixel values of four pixels, which include the reference pixel of the combined image and are arranged in the x-direction, are multiplied with coefficients W31 to W34, and the sum of the pixel values multiplied with the coefficients is used as the pixel value of a pixel which is to be calculated. That is to say, the sum is used as the pixel value of the pixel at a position shifted by ¼ pixel in the x-direction from the reference pixel.

The coefficients have different values which can be arranged in the descending order of W32, W33, W31, and W34. When the distance or the direction of the pixel to be calculated, from the reference pixel is changed, the values of the coefficients W31 to W34 may be changed.

As described above, according to the filtering processors 132 and 134, it is possible to calculate the pixel value of a pixel at a phase separated by a certain distance in a certain direction from the reference pixel of the combined image by a filtering process without shifting the phase of each pixel of the combined image.

Operation of Image Processor

Figure 16:
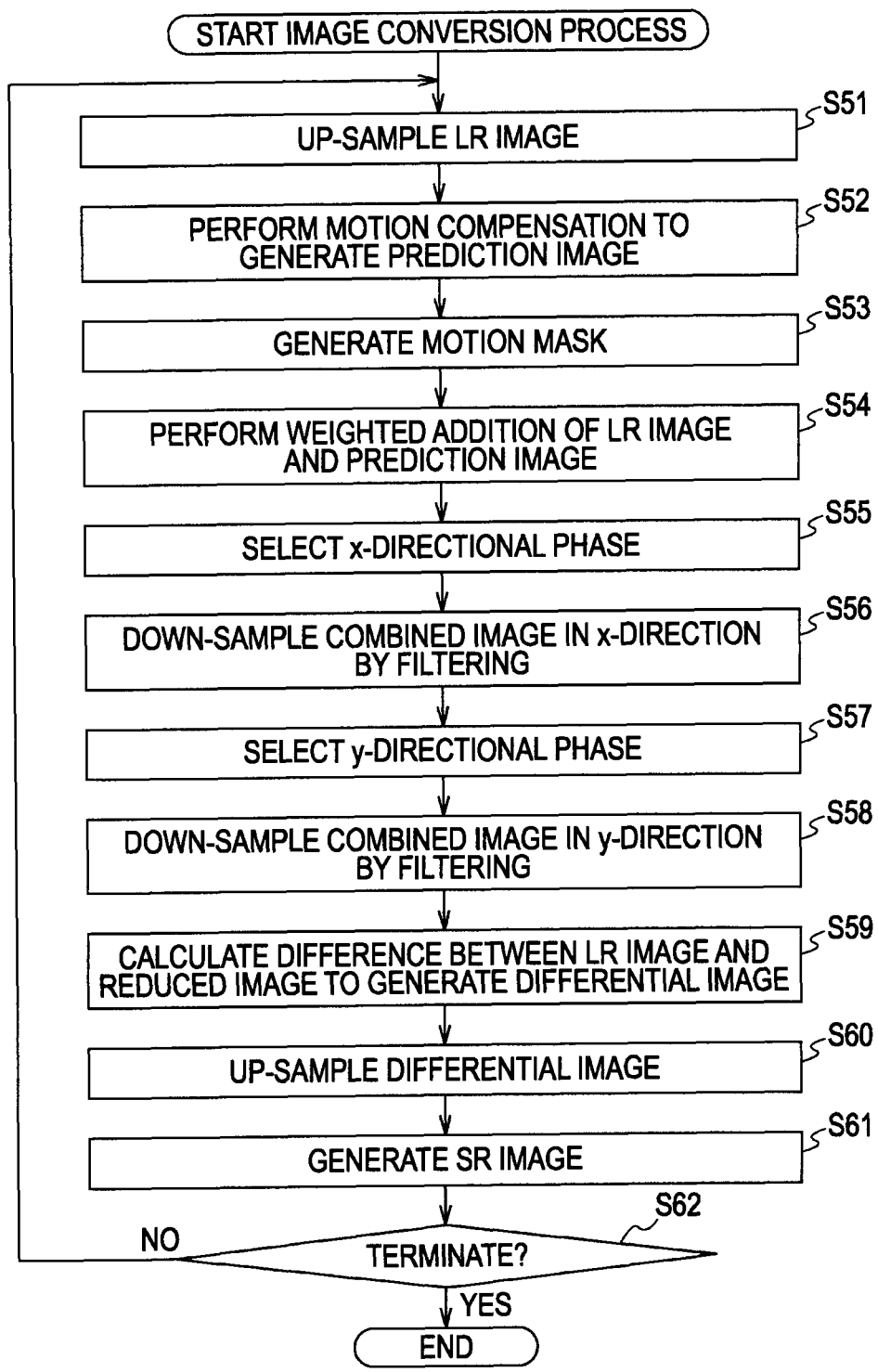
FIG. 16 is a flowchart illustrating an image conversion process.

Next, with reference to the flowchart of FIG. 16, the image conversion process by the image processor 121 will be described. In FIG. 16, the processes of steps S51 to S54 are the same as the processes of steps S11 to S14 in FIG. 11, and description thereof will be omitted.

At step S55, the phase controller 131 selects the x-directional phase of the combined image to be used for generating a reduced image. For example, when the x-directional phase is changed in a predetermined pattern for each frame, the phase controller 131 selects a phase specified by the pattern and the current frame being processed.

The phase controller 131 supplies the combined image supplied from the mixer 75 to the filtering processor 132 corresponding to the selected phase and causes x-directional down-sampling to be performed.

At step S56, the filtering processor 132 performs x-directional down-sampling on the combined image supplied from the phase controller 131 by a filtering process and supplies an image obtained thus to the phase controller 133.

For example, the filtering processor 132 multiplies the pixel value of three or four pixels, which include the reference pixel on the combined image and are arranged consecutively in the x-direction, with predetermined coefficients and calculates the sum of the pixel values multiplied with the coefficients. Then, the filtering processor 132 uses the value of the calculated sum as the value of the pixel value of the pixel at the selected phase of the combined image and generates an image composed of the pixels at the selected phase of the combined image, thus down-sampling the combined image.

At step S57, the phase controller 133 selects the y-directional phase of the combined image to be used for generating a reduced image. For example, when the y-directional phase is changed in a predetermined pattern for each frame, the phase controller 133 selects a phase specified by the pattern and the current frame being processed.

The phase controller 133 supplies the combined image supplied from the filtering processor 132 to the filtering processor 134 corresponding to the selected phase and causes y-directional down-sampling to be performed.

At step S58, the filtering processor 134 performs y-directional down-sampling on the combined image supplied from the phase controller 133 by a filtering process and supplies an image obtained thus to the subtractor 80.

For example, the filtering processor 134 multiplies the pixel value of three or four pixels, which include the reference pixel on the combined image and are arranged consecutively in the y-direction, with predetermined coefficients and calculates the sum of the pixel values multiplied with the coefficients. Then, the filtering processor 134 uses the value of the calculated sum as the value of the pixel value of the pixel at the selected phase of the combined image and generates a reduced image composed of the pixels at the selected phase of the combined image, thus down-sampling the combined image.

In this way, by down-sampling the combined image in the x and y-directions, a reduced image with the same resolution as the LR image is generated, and the generated reduced image is supplied to the subtractor 80. Subsequently, the processes of steps S59 to S62 are performed, and the image conversion process ends. Since such processes are the same as the processes of steps S19 to S22 of FIG. 11, description thereof will be omitted.

In this way, the image processor 121 performs a super-resolution process on the input LR image and converts the LR image to the SR image. In particular, when generating the reduced image from the combined image obtained by prediction by the filtering process, the image processor 121 generates the reduced image so that the reduced image is composed of pixels at different phases of the combined image for each frame.

As described above, since the reduced image is generated by the filtering process, it is not only possible to shift the phases of the pixels of the combined image used for generating the reduced image with an accuracy of a pixel or lower, but also to decrease further the amount of a phase shift in the subject between the reduced image and the combined image. In this way, it is possible to decrease further the errors caused by the phase shift in the subject generated at the time of generating the SR image. That is to say, it is possible to detect more accurately the errors between the combined image and the LR image and improve the image quality of the SR image. Moreover, it is possible to obtain the reduced image more simply and quickly by the filtering process.

Furthermore, since the phases of the pixels to be used for generating the reduced image are changed from frame to frame, it is possible to prevent accumulation of errors (noise components) generated at the time of generating the combined image, whereby the image quality of the SR image can be improved.

Third Embodiment

Configuration of Image Processor

Figure 17:
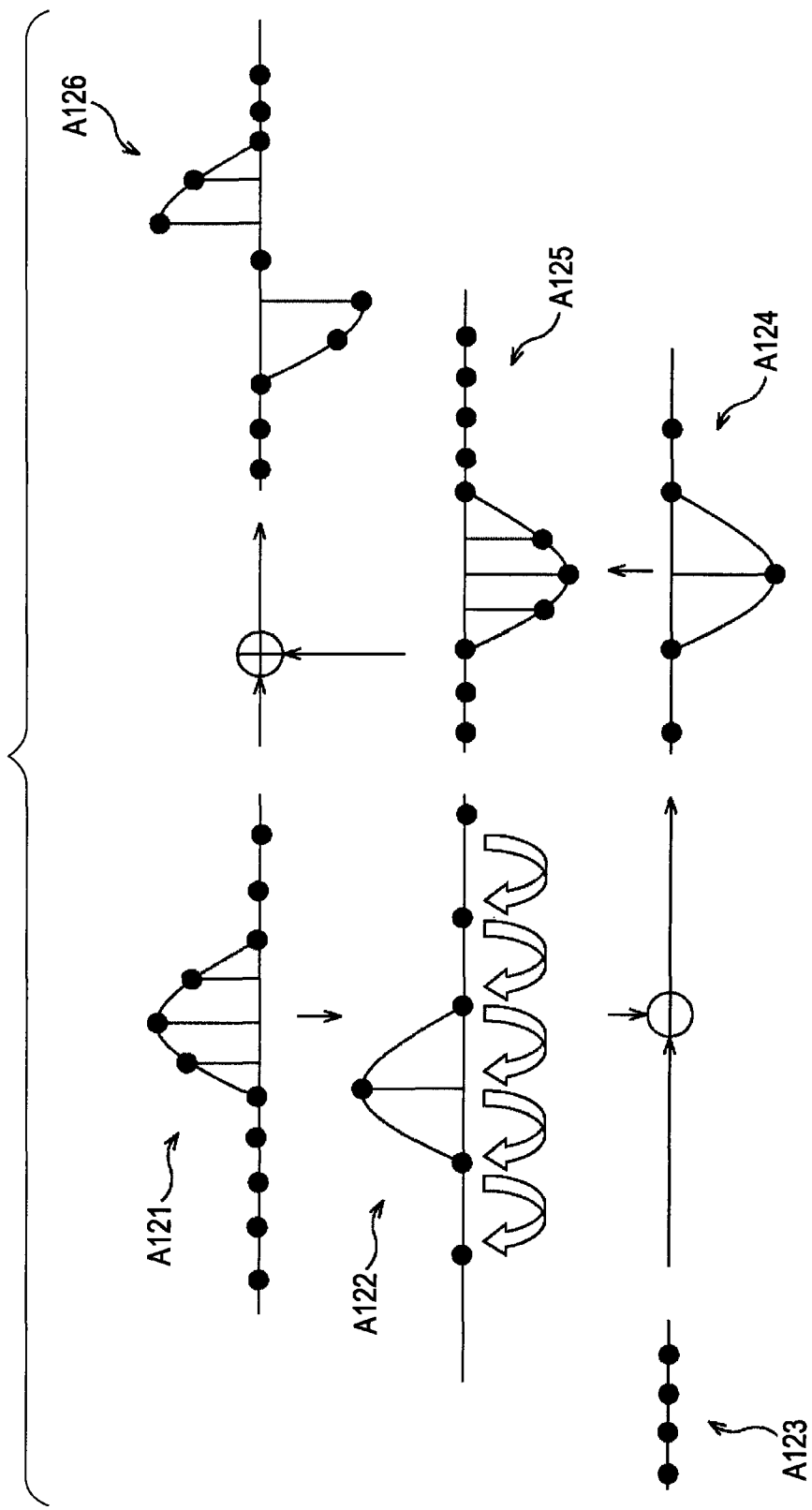
FIG. 17 is a diagram illustrating new errors generated at the time of generating an SR image.

When the amount of shifting in the phase of the pixels of the combined image used for generation of the reduced image is increased, the amount of a positional shift between the position of the subject in the reduced image and the position of the subject in the combined image will increase, whereby new errors (noise components) will be generated in the differential image as illustrated in FIG. 17. In FIG. 17, the vertical direction represents the pixel values of pixels of an image, and the rightward direction represents the x-direction in the image. In addition, each circle in the figure represents one pixel on the image.

Referring to FIG. 17, a waveform indicated by an arrow A121 represents the waveform of a combined image of the current frame. That is, a curve that connects adjacent pixels of the combined image indicated by the arrow A121 forms the waveform of the combined image. In the combined image, the pixel values of the pixels located slightly close to the right side from the center of the combined image are larger than the pixel values of other pixels and are protruding upward in the figure.

Now, the pixels of the combined image are sampled every other pixel in the x-direction in the figure so as to generate a reduced image. For example, when the sampling positions of the pixels used for generating the reduced image are shifted by 2 pixels rightward in the figure from a reference pixel, the position of a subject in the reduced image will be shifted by 2 pixels leftward in the figure from the center of the image as indicated by an arrow A122, when compared with the position of the subject on the combined image.

Moreover, when the waveform of the LR image of the current frame has a flat shape without any change in the x-direction as indicated by an arrow A123, a differential image having a waveform indicated by an arrow A124 is obtained by calculating a difference between the reduced image and the LR image. When the differential image is up-sampled to an image with the same resolution as the SR image, an enlarged image having a waveform indicated by an arrow A125 is obtained. The waveform of the enlarged image has a shape such that the pixel values of the pixels located slightly close to the left side from the center of the enlarged image are smaller than the pixel values of other pixels and are protruding downward in the figure.

When the enlarged image is added to the combined image indicated by the arrow A121, a SR image having a waveform indicated by an arrow A126 is obtained. In the SR image, some errors remain unremoved from the combined image and new errors generated by the addition of the enlarged image are included.

That is to say, although errors are corrected at the center of the SR image in the figure, the errors (noise components) included in the combined image are not removed in a portion of the SR image which is located slightly close to the right side from the center of the SR image, but remain as they are. That is to say, in an ideal case, the waveform of the SR image should have a shape such that it is flat in the x-direction like the LR image indicated by the arrow A123. However, the portion of the SR image which in the figure is located slightly close to the right side from the center protrude upward in the figure like the combined image indicated by the arrow A121.

Furthermore, in a portion of the SR image which in the figure is located slightly close to the left side from the center, new errors (noise components) generated by the addition of the enlarged image to the combined image are generated. That is to say, the portion of the SR image, which in the figure is located slightly close to the left side from the center, protrudes downward in the figure.

As described above, when the phases of the pixels of the combined image used for generating the reduced image are shifted too much, new noises are generated in the SR image.

Figure 18:
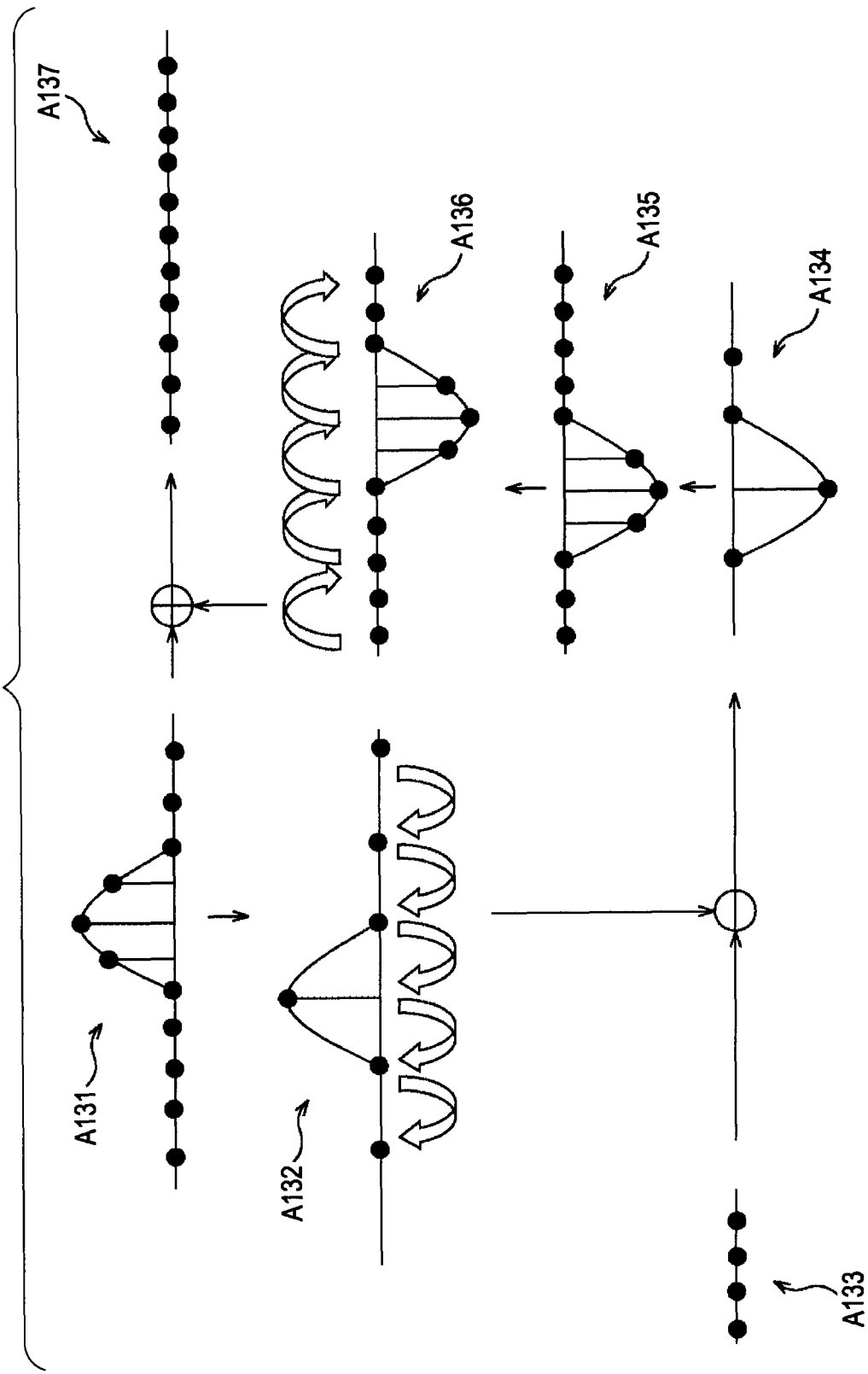
FIG. 18 is a diagram illustrating the suppression of the generation of new errors at the time of generation of the SR image.

Therefore, as illustrated in FIG. 18, by shifting each pixel of the enlarged image in the opposite direction of the direction of shifting the subject in the reduced image by the same shift amount, it is possible to remove more certainly the errors included in the combined image and suppress generation of new errors.

In FIG. 18, the vertical direction represents the pixel values of pixels of an image, and the rightward direction represents the x-direction in the image. Moreover, in the figure, each circle represents each pixel on the image. Furthermore, arrows A131 to A135 represent the waveforms of a combined image, a reduced image, an LR image, a differential image, and an enlarged image, respectively, and these waveforms are the same as the case indicated by the arrows A121 to A125 in FIG. 17, and description thereof will be omitted.

In the example of FIG. 18, a reduced image having a waveform indicated by the arrow A132 is obtained from a combined image having a waveform indicated by the arrow A131. A difference between the reduced image and an LR image having a waveform indicated by the arrow A133 is calculated, whereby a differential image having a waveform indicated by the arrow A134 is obtained. When the differential image is up-sampled, an enlarged image having a waveform indicated by the arrow A135 is obtained.

As indicated by the arrow A136, the pixels of the enlarged image are shifted rightward in the figure, whereby a final enlarged image is obtained.

That is to say, in the example of FIG. 18, as described above with reference to FIG. 17, when the reduced image is generated, since the positions of the pixels sampled from the combined image are shifted rightward in the figure by 2 pixels from the reference pixel, a phase shift of 2 pixels is generated leftward in the enlarged image. Therefore, when the phase of each pixel of the enlarged image is shifted by 2 pixels rightward in the figure, it is possible to correct a phase shift in each pixel and cancel the generated phase shift.

In this way, when the phases of the pixels of the enlarged image are shifted in the direction of shifting the phases of the pixels of the combined image used for generating the reduced image by the same shift distance and the phase-adjusted enlarged image is added to the combined image, it is possible to obtain a SR image with fewer errors as indicated by the arrow A137.

That is to say, by adding the enlarged image indicated by the arrow A136 to the combined image indicated by the arrow A131, it is possible to obtain a SR image in which the noises included in the combined image are removed and new noises are not included as indicated by the arrow A137. The waveform of the SR image indicated by the arrow A137 has a shape such that it is the same shape as the waveform of the LR image indicated by the arrow A133 and it is flat in the x-direction.

Figure 19:
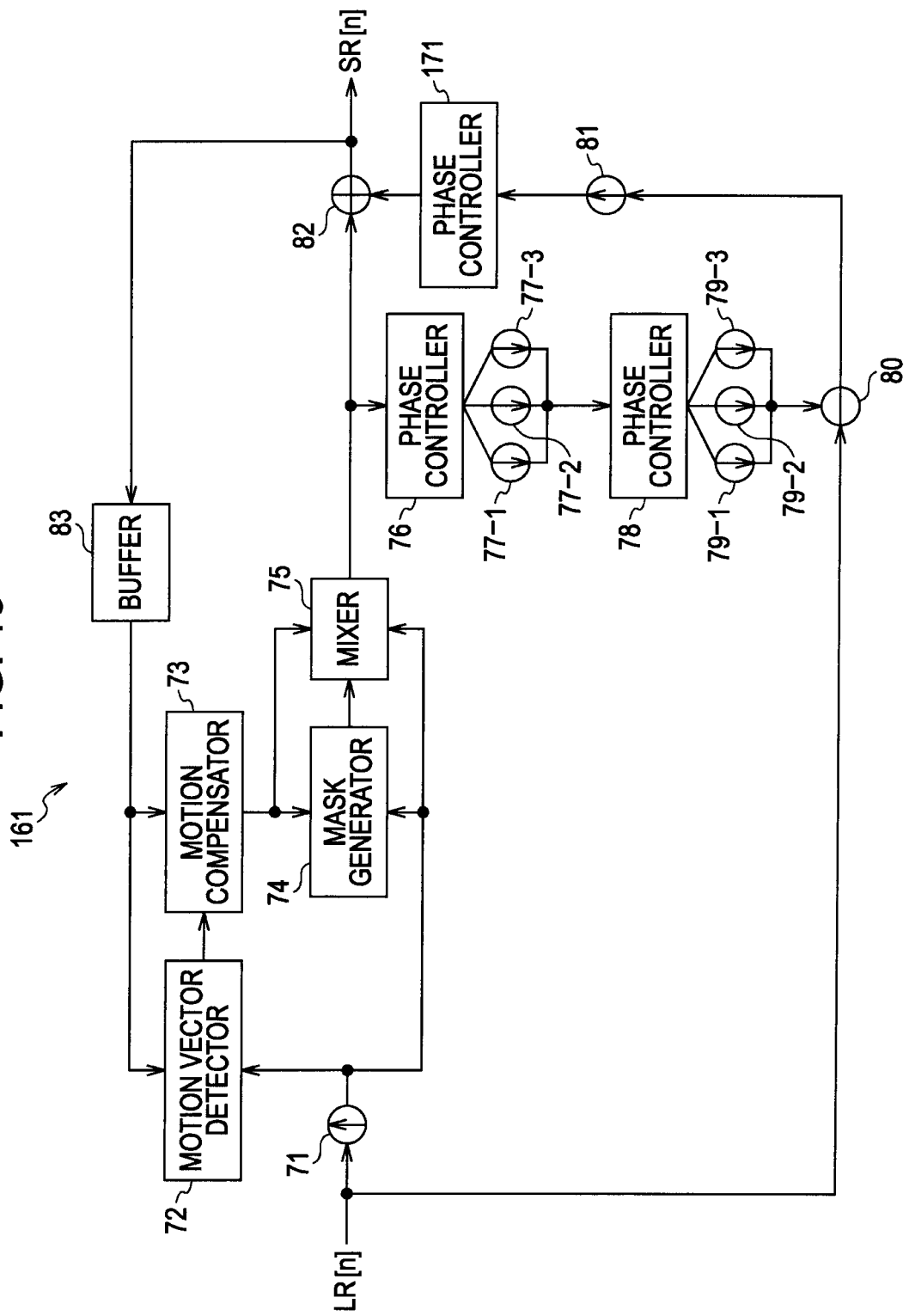
FIG. 19 is a diagram illustrating another exemplary configuration of an image processor of an embodiment of the present invention.

As described above, the image processor adjusting the phases of the pixels of the enlarged image is configured as illustrated in FIG. 19, for example. In FIG. 19, the same or corresponding portions as those in FIG. 8 will be denoted by the same reference numerals, and description thereof will be appropriately omitted.

The image processor 161 of FIG. 19 further includes a phase controller 171 in the image processor 61 of FIG. 8. The phase controller 171 shifts the phase of each pixel of the enlarged image supplied from the up-sampler 81 in the direction of shifting the phase by the down-sampler 77 or 79 by the same shift distance and supplies an image obtained thus to the adder 82.

Operation of Image Processor

Figure 20:
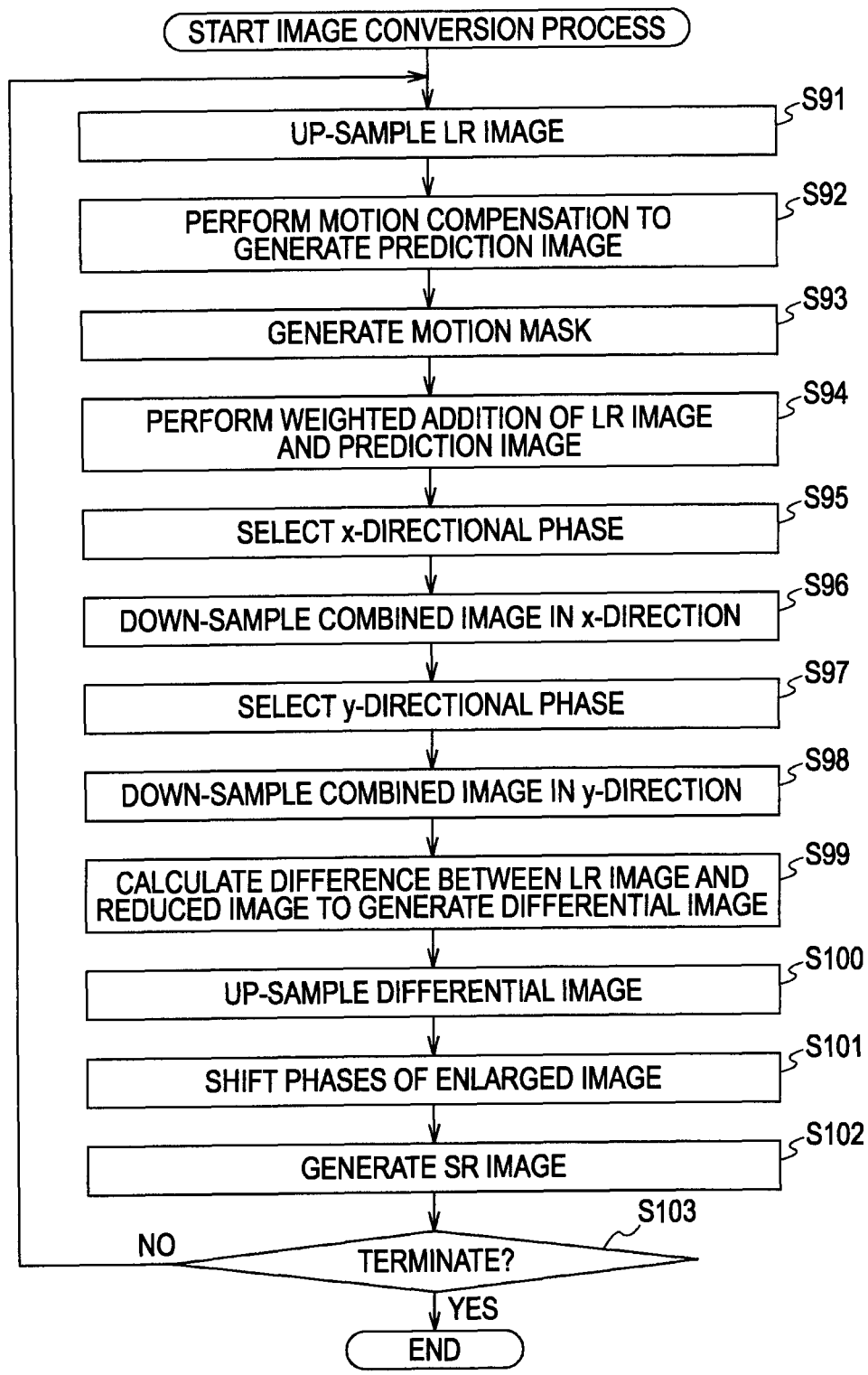
FIG. 20 is a flowchart illustrating an image conversion process.

Next, with reference to the flowchart of FIG. 20, the image conversion process by the image processor 161 will be described. The processes of steps S91 to S100 are the same as the processes of steps S11 to S20 of FIG. 11, and description thereof will be omitted.

At step S101, the phase controller 171 shifts the phase of each pixel of the enlarged image supplied from the up-sampler 81 and supplies an image obtained thus to the adder 82.

For example, it will be assumed that when the reduced image is generated, the down-sampler 77-3 generates an image composed of pixels on the combined image which are located at positions separated by 2 pixels in the x-direction from the reference pixel. Moreover, it will be assumed that the down-sampler 79-3 generates a reduced image composed of pixels on the image generated by the down-sampler 77-3, which are located at positions separated by 2 pixels in the y-direction from the reference pixel.

In such a case, the phase controller 171 moves each pixel of the enlarged image by a distance of 2 pixels in the x and y-directions and uses an image obtained thus as a final enlarged image. That is to say, the pixel values of the pixels of the final enlarged image obtained after the phase adjustment will have the pixel values of pixels which are located at positions separated by 2 pixels in the opposite direction of the x-direction and by 2 pixels in the opposite direction of the y-direction from the pixels of the enlarged image before the phase adjustment, which are located at the same position.

At step S102, the adder 82 adds the enlarged image supplied from the phase controller 171 to the combined image supplied from the mixer 75 to generate a SR image. Subsequently, the process of step S103 is performed, and the image conversion process ends. Since the process of step S103 is the same as the process of step S22 of FIG. 11, description thereof will be omitted.

In this way, the image processor 161 shifts the phase of the enlarged image obtained by up-sampling the differential image and then adds the phase-shifted enlarged image to the combined image, thus generating a SR image. As described above, since the phase of the enlarged image is first shifted so as to cancel the phase shift generated at the time of generating the reduced image and the phase-shifted enlarged image is added to the combined image, it is not only possible to remove more certainly the errors included in the combined image but also to suppress generation of new errors, whereby the image quality of the SR image can be improved.

Fourth Embodiment

Configuration of Image Processor

When the LR image is in an interlaced format, an LR image of a top field and an LR image of a bottom field are alternately input to the image processor. Thus, an LR image of one frame is obtained from two LR images which are consecutive in time, that is, an LR image of a top field and an LR image of a bottom field which are consecutive.

Therefore, depending on a phase change pattern of the pixels on the combined image which are sampled at the time of generating the reduced image, there may occur a case where the phase of the pixels being sampled is biased in the top field or the bottom field.

For example, when the phases of the pixels of the combined image which are sampled every other field are shifted from the position of the reference pixel, the reference pixel will be sampled in any one of the top field and the bottom field which appear every other field. In such a case, there is a concern that errors (noise components) are not detected at a certain phase of the combined image but are accumulated.

Therefore, a phase change pattern for the top field and a phase change pattern for the bottom field may be prepared independently. In this way, it is possible to suppress accumulation of errors in the SR image of a particular kind of field, namely the top field or the bottom field.

Figure 21:
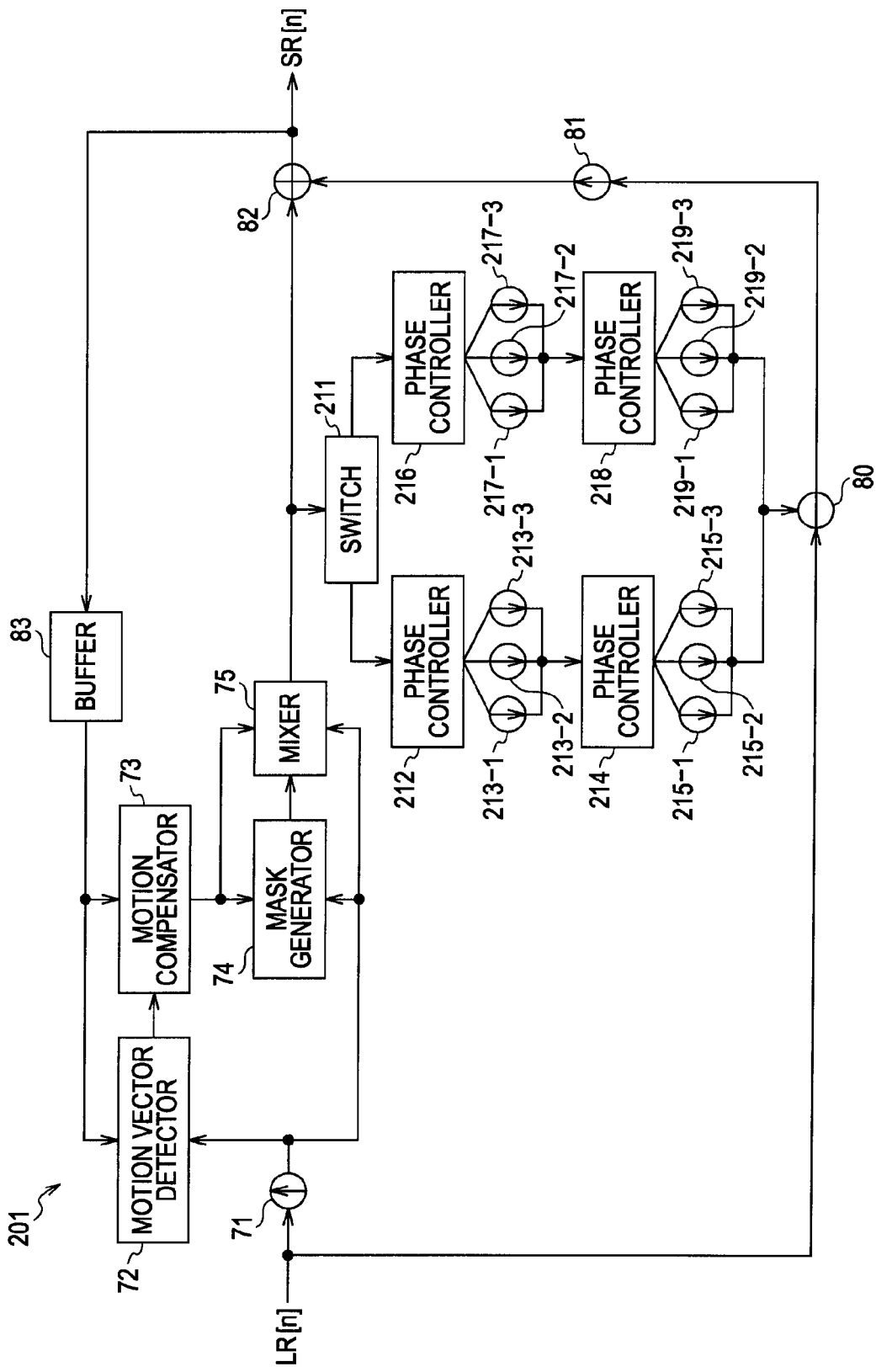
FIG. 21 is a diagram illustrating another exemplary configuration of an image processor according to an embodiment of the present invention.

When the phases of the combined image at the time of generating the reduced image are changed independently for each kind of field, the image processor may be configured as illustrated in FIG. 21, for example. In FIG. 21, the same or corresponding portions as those in FIG. 8 will be denoted by the same reference numerals, and description thereof will be appropriately omitted.

The image processor 201 of FIG. 21 includes a switch 211, a phase controller 212, down-samplers 213-1 to 213-3, a phase controller 214, down-samplers 215-1 to 215-3, a phase controller 216, down-samplers 217-1 to 217-3, a phase controller 218, and down-samplers 219-1 to 219-3, in lieu of the phase controller 76, the down-samplers 77-1 to 77-3, the phase controller 78, and the down-samplers 79-1 to 79-3 of the image processor 61.

The switch 211 changes the output destination of the combined image supplied from the mixer 75 in accordance with the kind of the field (frame) of the LR image to be processed. That is to say, when the current field being processed is a top field, the switch 211 supplies the supplied combined image to the phase controller 212. When the current field is a bottom field, the switch 212 supplies the supplied combined image to the phase controller 216.

The phase controller 212 selects the phase of the combined image to be used for generating the reduced image and changes the output destination of the combined image supplied from the switch 211 in accordance with the selected phase. That is to say, the phase controller 212 supplies the supplied combined image to any one of the down-samplers 213-1 to 213-3.

Each of the down-samplers 213-1 to 213-3 samples the pixels at a predetermined phase of the combined image supplied from the phase controller 212 and generates an image composed of such pixels, thus down-sampling the combined image in the x-direction. Each of the down-samplers 213-1 to 213-3 supplies the generated image to the phase controller 214. In the following description, when it is not necessary to distinguish particularly between the down-samplers 213-1 to 213-3, they will be simply referred to as a down-sampler 213.

The phase controller 214 selects a phase of the combined image to be used for generating the reduced image and changes an output destination of the image supplied from the down-sampler 213 in accordance with the selected phase. That is to say, the phase controller 214 supplies the supplied image to any one of the down-samplers 215-1 to 215-3.

Each of the down-samplers 215-1 to 215-3 samples the pixels at a predetermined phase of the image supplied from the phase controller 214 and generates a reduced image composed of such pixels. In this way, the combined image is down-sampled in the y-direction.

Each of the down-samplers 215-1 to 215-3 supplies the generated reduced image to the subtractor 80. In the following description, when it is not necessary to distinguish particularly between the down-samplers 215-1 to 215-3, they will be simply referred to as a down-sampler 215.

The phase controller 216 selects the phase of the combined image to be used for generating the reduced image and changes an output destination of the image supplied from the switch 211 in accordance with the selected phase. That is to say, the phase controller 216 supplies the supplied combined image to any one of the down-samplers 217-1 to 217-3.

Each of the down-samplers 217-1 to 217-3 samples the pixels at a predetermined phase of the combined image supplied from the phase controller 216 and generates an image composed of such pixels, thus down-sampling the combined image in the x-direction. Each of the down-samplers 217-1 to 217-3 supplies the generated image to the phase controller 218. In the following description, when it is not necessary to distinguish particularly between the down-samplers 217-1 to 217-3, they will be simply referred to as a down-sampler 217.

The phase controller 218 selects a phase of the combined image to be used for generating the reduced image and changes an output destination of the image supplied from the down-sampler 217 in accordance with the selected phase. That is to say, the phase controller 218 supplies the supplied image to any one of the down-samplers 219-1 to 219-3.

Each of the down-samplers 219-1 to 219-3 samples the pixels at a predetermined phase of the image supplied from the phase controller 218 and generates a reduced image composed of such pixels. In this way, the combined image is down-sampled in the y-direction.

Each of the down-samplers 219-1 to 219-3 supplies the generated reduced image to the subtractor 80. In the following description, when it is not necessary to distinguish particularly between the down-samplers 219-1 to 219-3, they will be simply referred to as a down-sampler 219.

The buffer 83 may be configured to store the SR image of the previous two fields so that an SR image which is two fields earlier than the current field being processed is supplied to the motion vector detector 72 and the motion compensator 73 by the buffer 83. In such a case, a prediction image is generated from the LR image of the top field and the SR image or from the LR image of the bottom field and the SR image.

However, the down-samplers 213, 215, 217, and 219 are configured to down-sample the combined image by generating an image composed of pixels at a predetermined phase (position) of the combined image.

Figure 22:
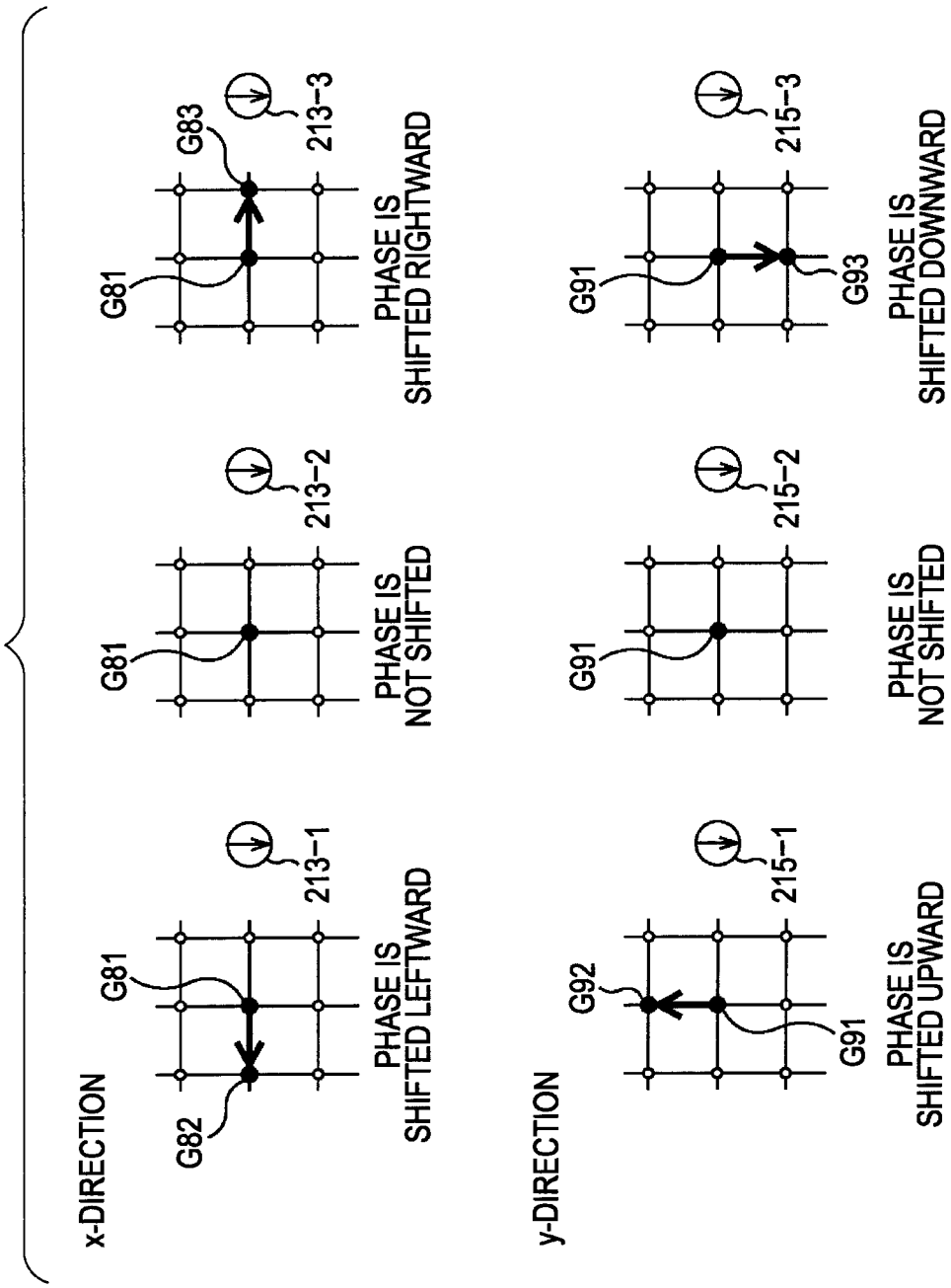
FIG. 22 is a diagram illustrating the phases of the pixels used for generation of a reduced image.

For example, as illustrated in FIG. 22, the down-samplers 213 and 215 sample pixels at different phases based on a predetermined reference pixel. In FIG. 22, the rightward direction represents the x-direction, and the downward direction represents the y-direction. In addition, in the figure, each circle represents each pixel on the combined image.

The down-sampler 213-1 samples a left adjacent pixel G82 of a reference pixel G81 which serves as a reference pixel on the combined image, as depicted on the top left of the figure. The down-sampler 213-2 samples the reference pixel G81 on the combined image, as depicted on the top center of the figure. The down-sampler 213-3 samples a right adjacent pixel G83 of the reference pixel G81 on the combined image, as depicted on the top right of the figure.

The down-sampler 215-1 samples an upper adjacent pixel G92 of a reference pixel G91 which serves as a reference pixel on the combined image which is down-sampled in the x-direction, as depicted on the bottom left of the figure.

The down-sampler 215-2 samples the reference pixel G91 on the combined image, as depicted on the bottom center of the figure. The down-sampler 215-3 samples a lower adjacent pixel G93 of the reference pixel G91 on the combined image, as depicted on the bottom right of the figure.

Moreover, the down-samplers 217-1 to 217-3 are configured to down-sample the combined image by sampling the same pixels as the pixels which are sampled from the combined image by the down-samplers 213-1 to 213-3.

Similarly, the down-samplers 219-1 to 219-3 are configured to down-sample the combined image by sampling the same pixels as the pixels which are sampled from the combined image by the down-samplers 215-1 to 215-3.

Figure 23:
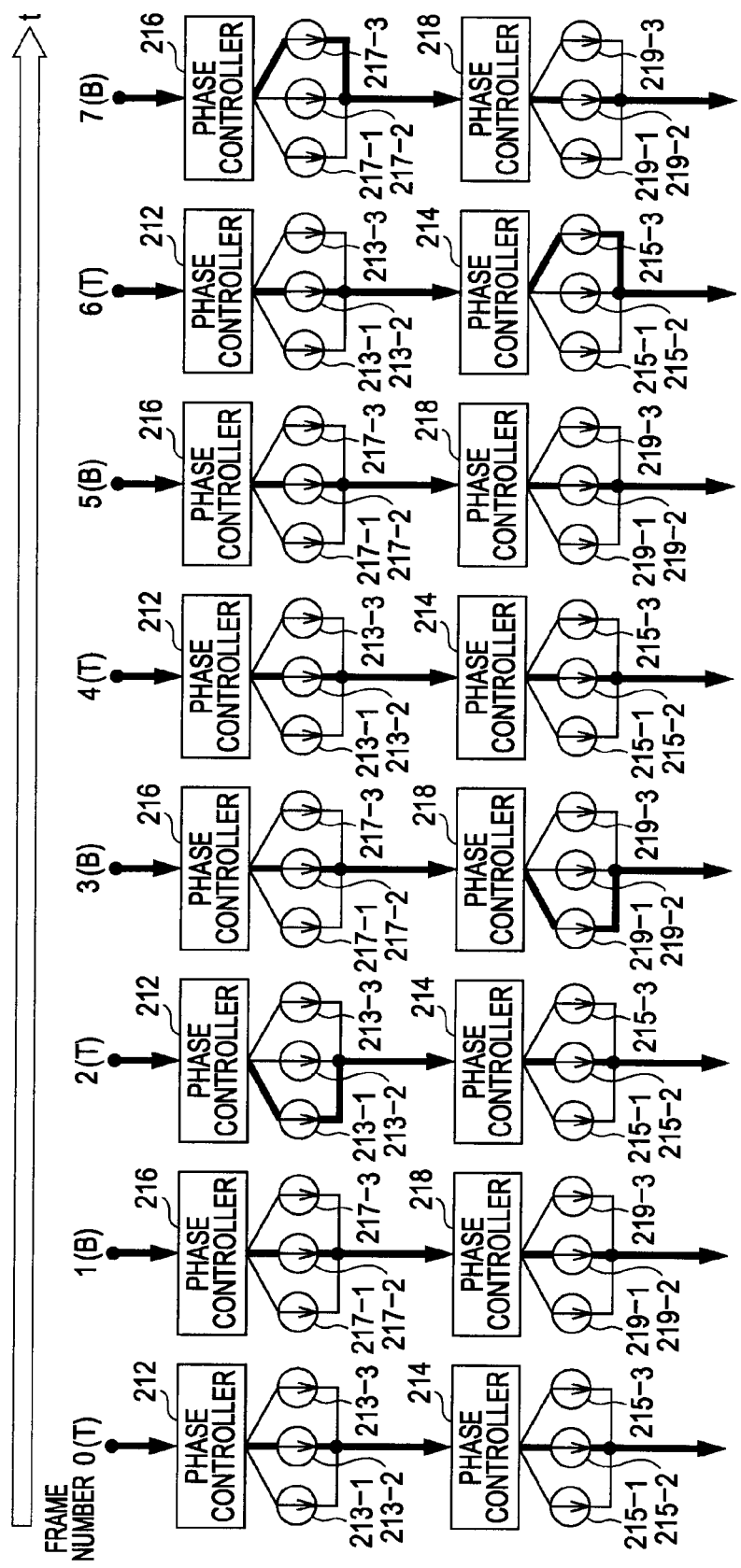
FIG. 23 is a diagram illustrating changes in the phases of the pixels used for the generation of the reduced image.

Furthermore, as illustrated in FIG. 23, for example, each of the phase controllers 212, 214, 216, and 218 selects the output destination of the combined image so that the phases of the pixels to be sampled are changed in a predetermined pattern.

In FIG. 23, the rightward direction represents time, and the number above each phase controller 212 or 216 represents a number that identifies the field (frame) of the combined image to be processed. Specifically, the frames are processed in the order from the 0th frame indicated by "0" to the 7th frame indicated by "7". Moreover, the characters "T" or "B" to the right of the field number stands for the top field and the bottom field, respectively, representing the kind of the field.

In addition, the bold line extending from the phase controller 212 to the down-sampler 215 and the bold line extending from the phase controller 216 to the down-sampler 219 represent paths along which the combined images are supplied.

In the example of FIG. 23, since the 0th field which is first processed is the top field, the combined image of the 0th field is supplied to the phase controller 212. Subsequently, the combined image is supplied from the phase controller 212 to the down-sampler 213-2, and the combined image supplied from the down-sampler 213-2 to the phase controller 214 is then supplied to the down-sampler 215-2.

Since the 1st field subsequent to the 0th field is the bottom field, the combined image of the 1st field is supplied from the switch 211 to the phase controller 216 Subsequently, the combined image of the 1st field is supplied from the phase controller 216 to the down-sampler 217-2, and the combined image supplied from the down-sampler 217-2 to the phase controller 218 is then supplied to the down-sampler 219-2.

Similarly, since the 2nd field is the top field, the combined image of the 2nd field is supplied to the down-samplers 213-1 and 215-2. Moreover, since the 3rd field is the bottom field, the combined image of the 3rd field is supplied to the down-samplers 217-2 and 219-1.

Since the 4th field is the top field, the combined image of the 4th field is supplied to the down-samplers 213-2 and 215-2. Since the 5th field is the bottom field, the combined image of the 5th field is supplied to the down-samplers 217-2 and 219-2.

Since the 6th field is the top field, the combined image of the 6th field is supplied to the down-samplers 213-2 and 215-3. Since the 7th field is the bottom field, the combined image of the 7th field is supplied to the down-samplers 217-3 and 219-2.

In the 8th and later fields, the output destination of the combined image is changed in accordance with a predetermined pattern for each kind of the field depending on whether a field being processed is the top field or the bottom field.

As described above, in the top fields, a reduced image composed of the reference pixels of the combined image is generated every other field (frame). That is to say, the phases of the pixels sampled from the combined image are shifted from the reference pixel every other field. Moreover, on the bottom fields, a reduced image composed of the reference pixels of the combined image is generated every other field (frame).

Operation of Image Processor

Figure 24:
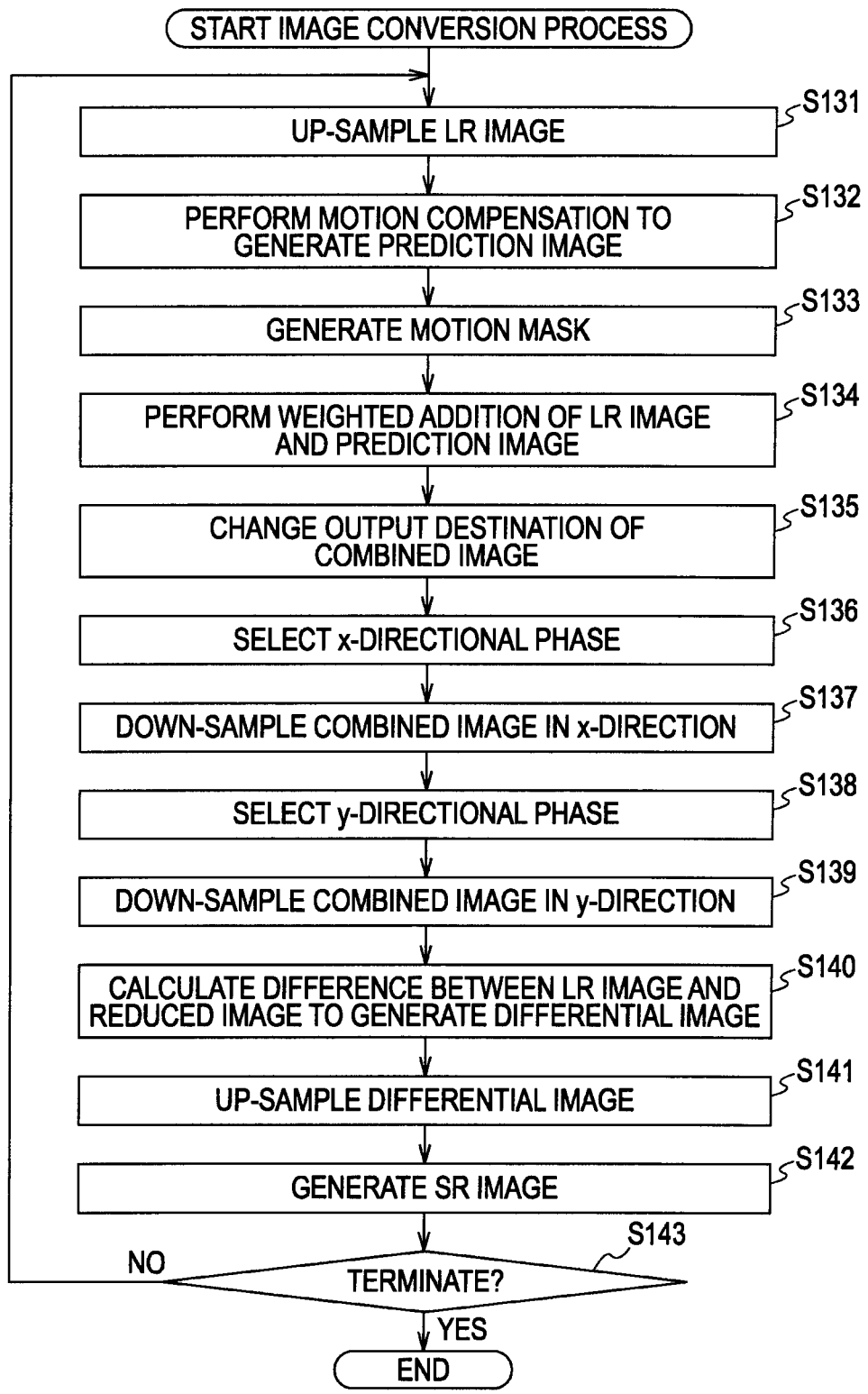
FIG. 24 is a flowchart illustrating an image conversion process.

Next, with reference to the flowchart of FIG. 24, the image conversion process by the image processor 201 will be described. In FIG. 24, the processes of steps S131 to S134 are the same as the processes of steps S11 to S14 in FIG. 11, and description thereof will be omitted.

At step S135, the switch 211 changes the output destination of the combined image supplied from the mixer 75 depending on whether a field being processed is the top field or the bottom field. Specifically, when the field being processed is the top field, the switch 211 supplies the combined image to the phase controller 212. When the field being processed is the bottom field, the switch 211 supplies the combined image to the phase controller 216.

At step S136, the phase controller 212 or 216 selects the x-directional phase of the combined image to be used for generating the reduced image in accordance with a predetermined pattern, for example, the pattern described with reference to FIG. 23. The phase controller 212 or 216 supplies the combined image supplied from the switch 211 to the down-sampler 213 or 217 corresponding to the selected phase and causes x-directional down-sampling to be performed.

At step S137, the down-sampler 213 or 217 performs x-directional down-sampling on the combined image supplied from the phase controller 212 or 216 and supplies an image obtained thus to the phase controller 214 or 218.

At step S138, the phase controller 214 or 218 selects the y-directional phase of the combined image to be used for generating the reduced image in accordance with a predetermined pattern, for example, the pattern described with reference to FIG. 23. The phase controller 214 or 218 supplies the combined image supplied from the down-sampler 213 or 217 to the down-sampler 215 or 219 corresponding to the selected phase and causes y-directional down-sampling to be performed.

At step S139, the down-sampler 215 or 219 performs y-directional down-sampling on the combined image supplied from the phase controller 214 or 218 and supplies an image obtained thus to the subtractor 80. In this way, by down-sampling the combined image in the x and y-directions, a reduced image with the same resolution as the LR image is generated, and the generated reduced image is supplied to the subtractor 80.

Subsequently, the processes of steps S140 to S143 are performed, and the image conversion process ends. Since the processes of steps S140 to S143 are the same as the processes of steps S19 to S22 of FIG. 11, description thereof will be omitted.

In this way, the image processor 201 changes the output destination of the combined image in accordance with the kind of a field to be processed and changes the phases of the pixels to be used for generating the reduced image in accordance with a pattern prepared for each kind of the field.

As described above, the output destination of the combined image is changed depending on the kind of the field, and the phases of the pixels to be used for generating the reduced image are changed in accordance with a pattern for each kind of the field. Therefore, it is possible to prevent the phases of the pixels used for generating the reduced image from being biased to a certain phase in a certain kind of field. Accordingly, it is possible to suppress accumulation of errors in the SR image of a certain kind of field and improve the image quality of the SR image.

Although it has been described that the down-samplers 213, 215, 217, and 219 down-sample the combined image by sampling certain pixels, the combined image may be down-sampled by a filtering process.

Fifth Embodiment

Configuration of Image Processor

Although it has been described that when the reduced image is generated, the combined image is first subjected to the x-directional down-sampling and then to the y-directional down-sampling, the x-directional down-sampling and the y-directional down-sampling may be performed simultaneously.

Figure 25:
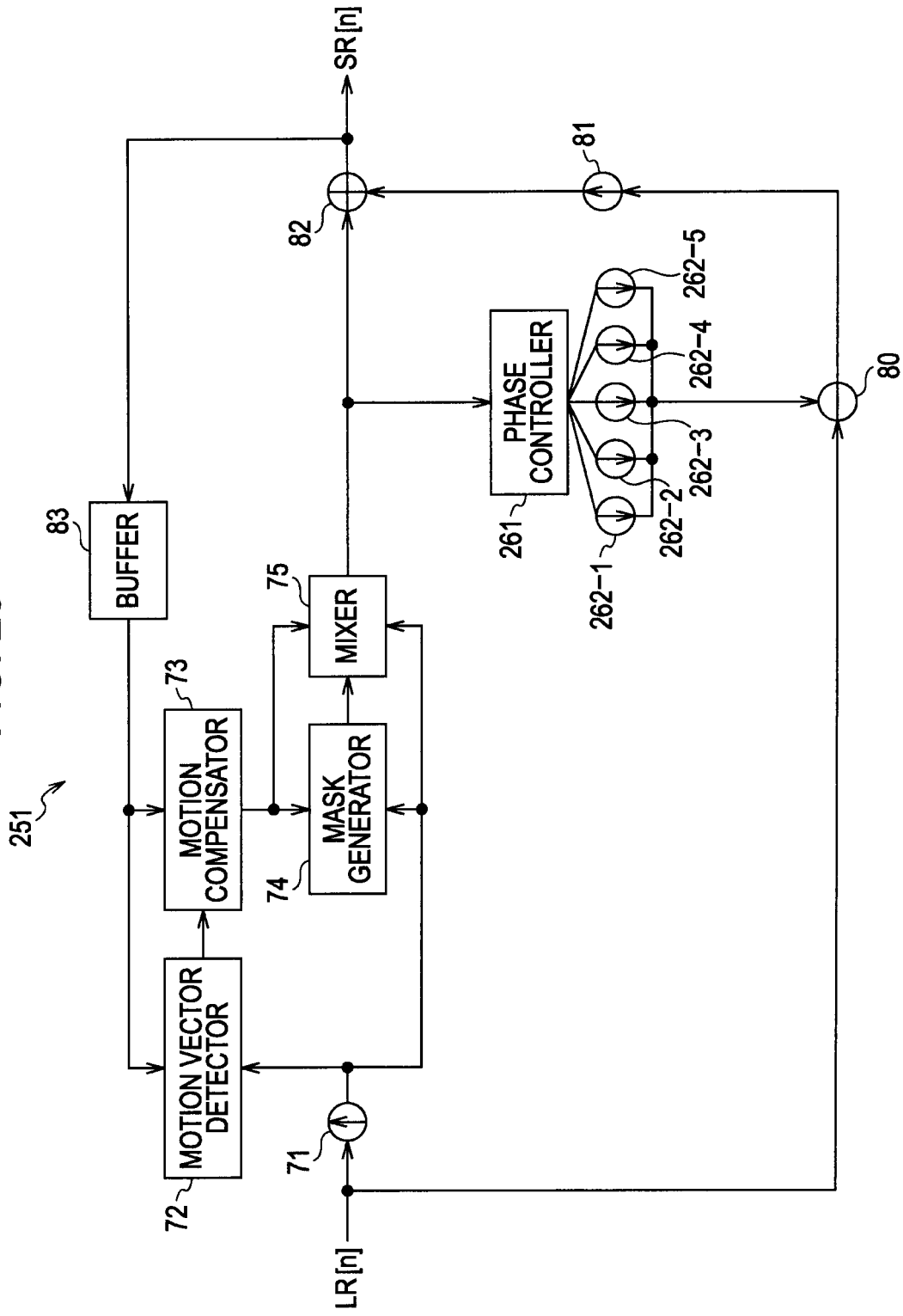
FIG. 25 is a diagram illustrating another exemplary configuration of an image processor of an embodiment of the present invention.

In such a case, the image processor may be configured as illustrated in FIG. 25, for example. In FIG. 25, the same or corresponding portions as those in FIG. 8 will be denoted by the same reference numerals, and description thereof will be appropriately omitted.

The image processor 251 of FIG. 25 includes a phase controller 261 and filtering processors 262-1 to 262-5, in lieu of the phase controller 76, the down-samplers 77-1 to 77-3, the phase controller 78, and the down-samplers 79-1 to 79-3 of the image processor 61.

The phase controller 261 selects the phase of the combined image to be used for generating the reduced image and changes an output destination of the combined image supplied from the mixer 75 in accordance with the selected phase. That is to say, the phase controller 261 supplies the supplied combined image to any one of the filtering processors 262-1 to 262-5.

Each of the filtering processors 262-1 to 262-5 uses the combined image supplied from the phase controller 261 to calculate the pixels at a predetermined phase of the combined image supplied from the phase controller 261 by a 2-dimensional filtering process and generates a reduced image composed of the calculated pixels. By this filtering process, the combined image is down-sampled in the x and y-directions.

Each of the filtering processors 262-1 to 262-5 supplies the generated reduced image to the subtractor 80. In the following description, when it is not necessary to distinguish particularly between the filtering processors 262-1 to 262-5, they will be simply referred to as a filtering processor 262.

Figure 26:
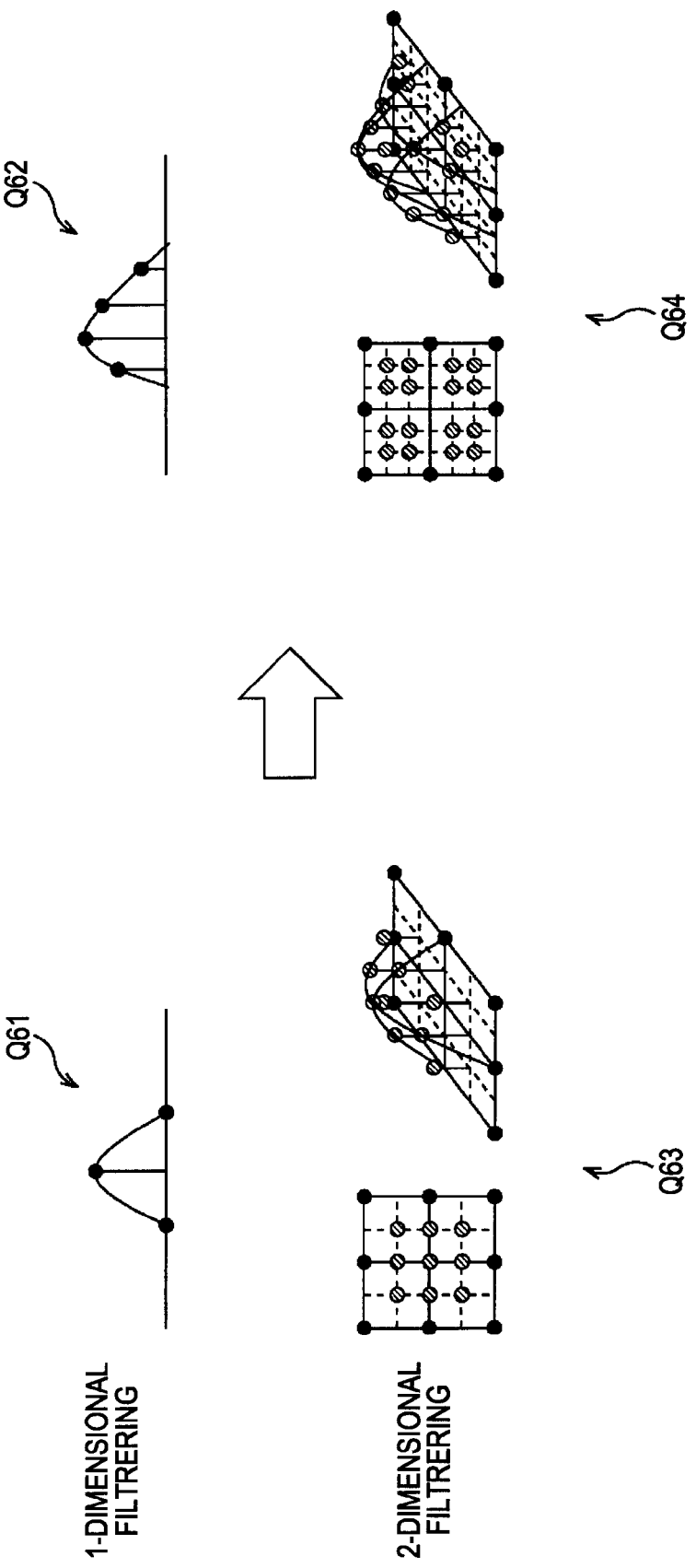
FIG. 26 is a diagram illustrating a 2-dimensional filtering process.

The filtering process of the filtering processor 262 uses a plurality of pixels on the combined image which are arranged in the x and y-directions as illustrated in FIG. 26, for example. The rightward direction in FIG. 26 represents the x-direction.

In the example of the image processor 121 described with reference to FIG. 13, it has been described that when the pixels at the phase of the reference pixel are calculated by the filtering process, the pixels which are arranged in the x-direction (or the y-direction) are multiplied respectively with coefficients corresponding to the distance from the reference pixel, as indicated by an arrow Q61 in FIG. 26.

Moreover, in the example of the image processor 121, it has been described that when pixels at a phase separated by a distance of a pixel or smaller from the reference pixel are calculated by the filtering process, the pixels which are arranged in the x-direction (or the y-direction) are multiplied respectively with coefficients having different values for each pixel, as indicated by an arrow Q62.

In the example indicated by the arrows Q61 and Q62, each circle represents the coefficient multiplied with one pixel, and the vertical direction represents the magnitude of the coefficients. That is to say, the coefficients indicated by the arrows Q61 and Q62 are the same as the coefficients indicated by the arrow Q11 in FIG. 13 and the arrow Q33 in FIG. 15, respectively.

When the 1-dimensional filtering process using the coefficients indicated by the arrows Q61 and Q62 is applied to a 2-dimensional filtering process, the pixels which are arranged in the x and y-directions are multiplied with coefficients as indicated by arrows Q63 and Q64, whereby the pixel values of the pixels of the reduced image are calculated.

In the example indicated by the arrows Q63 and Q64, each shadowed circle represents one coefficient multiplied with the pixel on the combined image, and circles representing such coefficients are arranged with the same positional relationship as the pixels on the combined image.

In the example indicated by the arrows Q63 and Q64, the rightward direction and the downward direction in the left figure of the drawing represent the x-direction and the y-direction, respectively. Moreover, in the example indicated by the arrows Q63 and Q64, the rightward direction and the frontward direction in the right figure of the drawing represent the x-direction and the y-direction, respectively, and the vertical direction represents the magnitude of the coefficients.

The example indicated by the arrow Q63 represents the coefficients used for calculating the pixels at the phase of the reference pixel of the combined image, and the three pixels by three pixels, which are arranged in the x and y-directions, respectively, are multiplied with the coefficients, whereby pixel values are calculated. In this example, among the 9 coefficients in total, the coefficient at the center represents the coefficient multiplied with the reference pixel of the combined image and has the largest value among the 9 coefficients. Moreover, the coefficients have values corresponding to the distance of the pixels being multiplied from the reference pixel, and the coefficients multiplied with the pixels have the larger values as the pixels are located closer to the reference pixel.

The example indicated by the arrow Q64 represents the coefficients used for calculating the pixels at phases separated by a distance of a pixel or smaller from the reference pixel of the combined image, and the four pixels by four pixels, which are arranged in the x and y-directions, respectively, are multiplied with the coefficients, whereby pixel values are calculated.

In this example, the central position of the 16 coefficients in total is the phase of the pixels of a reduced image to be calculated, and the pixel multiplied with the coefficient which is located the closest to the phase of the pixels of the reduced image is the reference pixel of the combined image. Moreover, the coefficients multiplied with the pixels of the combined image have the larger values as the pixels are located closer to the phase of the pixels of the reduced image which is to be calculated.

As described above, the filtering processor 262 multiplies a plurality of pixels, which are located near the reference pixel and arranged in the x and y-direction, with coefficients, whereby the pixel value of each pixel of the reduced image is calculated by a 2-dimensional filtering process. In this way, a reduced image composed of pixels at phases which are separated by a distance of a pixel or smaller from the reference pixel in the x and y-direction can be obtained more simply and quickly by one filtering process.

For example, the filtering processor 262-1 generates a reduced image composed of pixels at phases which are shifted by ½ pixel in the opposite direction of the x-direction from the reference pixel of the combined image. The filtering processor 262-2 generates a reduced image composed of pixels at phases which are shifted by ½ pixel in the x-direction from the reference pixel of the combined image.

The filtering processor 262-3 generates a reduced image composed of pixels at the phase of the reference pixel of the combined image. The filtering processor 262-4 generates a reduced image composed of pixels at phases which are shifted by ½ pixel in the y-direction from the reference pixel of the combined image. The filtering processor 262-5 generates a reduced image composed of pixels at phases which are shifted by ½ pixel in the opposite direction of the y-direction from the reference pixel of the combined image.

Operation of Image Processor

Figure 27:
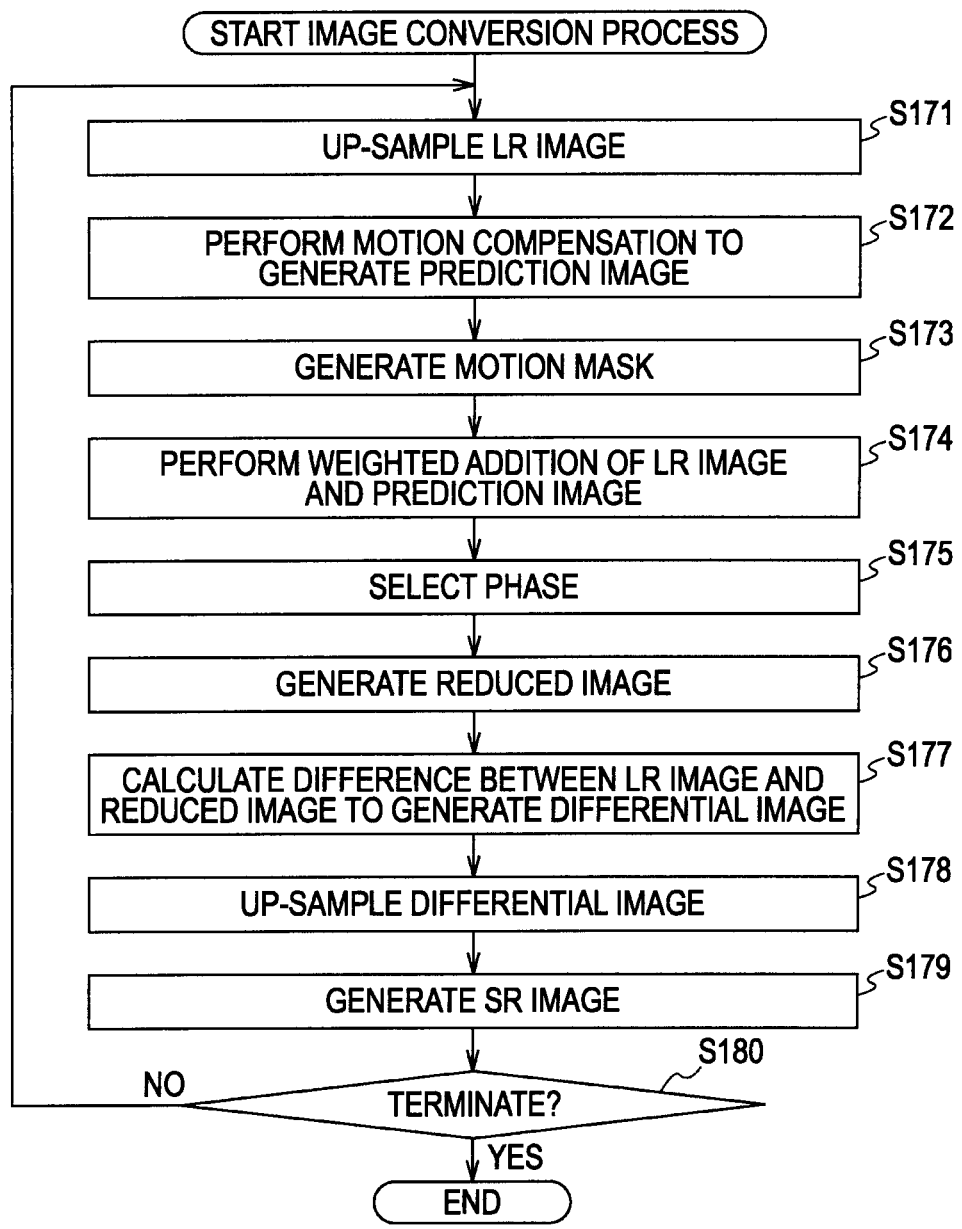
FIG. 27 is a flowchart illustrating an image conversion process.

Next, with reference to the flowchart of FIG. 27, the image conversion process by the image processor 251 will be described. In FIG. 27, the processes of steps S171 to S174 are the same as the processes of steps S11 to S14 in FIG. 11, and description thereof will be omitted.

At step S175, the phase controller 261 selects the phase of the combined image to be used for generating a reduced image. For example, when the phase is changed in at least one of the x and y-directions in a predetermined pattern, the phase controller 261 selects a phase which is determined for the current frame being processed in accordance with the pattern.

The phase controller 261 supplies the combined image supplied from the mixer 75 to the filtering processor 262 corresponding to the selected phase and causes a reduced image to be generated.

At step S176, the filtering processor 262 performs a 2-dimensional filtering process on the combined image supplied from the phase controller 261 to generate a reduced image. Specifically, the filtering processor 262 multiplies the pixel values of several pixels around the reference pixel of the combined image supplied from the phase controller 261 with coefficients stored in advance and calculates the sum of the pixel values multiplied with the coefficients, thus calculating the pixel value of each pixel of the reduced image.

When the reduced image is generated, the filtering processor 262 supplies the generated reduced image to the subtractor 80. Subsequently, the processes of steps S177 to S180 are performed, and the image conversion process ends. Since such processes are the same as the processes of steps S19 to S22 of FIG. 11, description thereof will be omitted.

In this way, the image processor 251 performs a super-resolution process on the input LR image and converts the LR image to the SR image. When generating the SR image, the image processor 251 performs the 2-dimensional filtering process on the combined image to generate the reduced image while changing the phases of the pixels of the combined image to be used for generating the reduced image from frame to frame.

As described above, since the combined image is generated by the 2-dimensional filtering process, it is not only possible to shift the phases with an accuracy of a pixel or lower, but also to decrease further the amount of a phase shift in the subject between the reduced image and the combined image. In this way, it is possible to decrease further the errors generated at the time of generating the SR image and improve the image quality of the SR image. Moreover, it is possible to obtain the reduced image more simply and quickly by the 2-dimensional filtering process.

Furthermore, since the phases of the pixels of the combined image to be used for generating the reduced image are changed from frame to frame, it is possible to prevent accumulation of errors (noise components) generated at the time of generating the combined image, whereby the image quality of the SR image can be improved.

Sixth Embodiment

Configuration of Image Processor

When a reduced image having pixels corresponding to half the pixel count of the combined image is generated from the combined image, the phases of the pixels of the combined image to be used for generating the reduced image are shifted for each frame by a distance of smaller than 2 pixels, such as 1 pixel, ½ pixel, or ¼ pixel.

When a reduced image having pixels smaller than the half the pixel count of the combined image is generated from the combined image, since more pixels are thinned out, the phases of the pixels of the combined image used for generating the reduced image may be shifted for each frame by a distance in units of pixels. For example, when a reduced image having pixels corresponding to ⅛ of the pixel count of the combined image is generated, the phases may be shifted by a distance of smaller than 8 pixels. Therefore, when the phases are shifted by a distance in units of pixels such as 4 pixels, 2 pixels, or 1 pixel, the reduced image can be generated by simpler processing.

Figure 28:
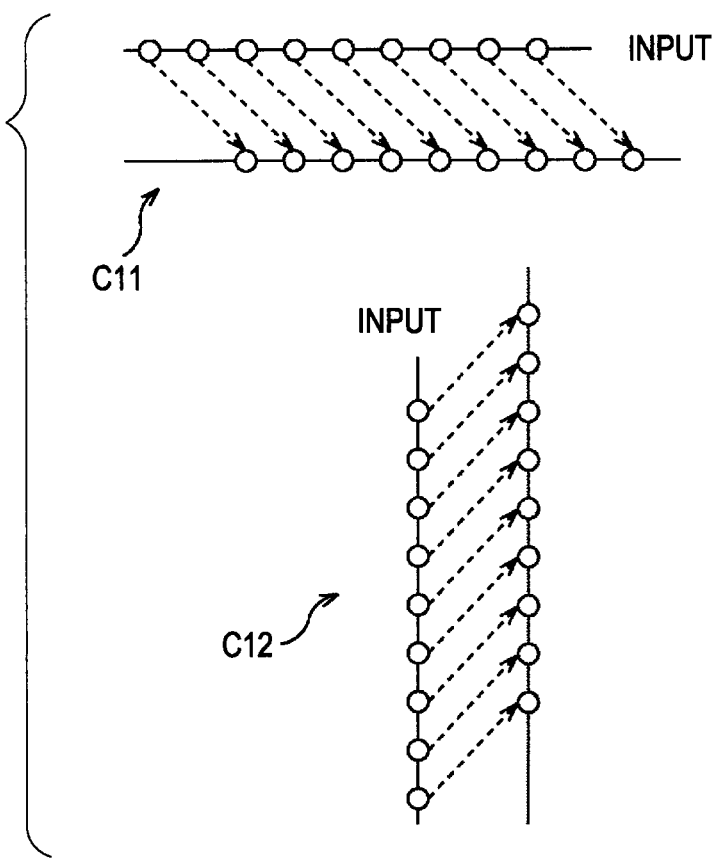
FIG. 28 is a diagram illustrating a shift in the phases of each pixel of a combined image.

Specifically, as illustrated in FIG. 28, when the phases of the pixels to be used for generating the reduced image are shifted by a predetermined number of pixels in a predetermined direction from the reference pixel, the reduced image can be obtained more simply by shifting the phase (position) of each pixel of the combined image by the predetermined number of pixels in the opposite direction of the predetermined direction. In FIG. 28, each circle represents each pixel on the combined image.

For example, when the phases of the pixels of the combined image to be used for generating the reduced image are shifted by 2 pixels in the opposite direction of the x-direction, the phase of each pixel can be shifted by moving each pixel of the combined image in the x-direction by 2 pixels as indicated by an arrow C11. In the example indicated by the arrow C11, in the figure, the upper line of plural circles represents the combined image before the phases are shifted, and the lower line of plural circles represents the combined image after the phases are shifted. In addition, in the figure, the rightward direction represents the x-direction.

In the example indicated by the arrow C11, the phase of each pixel of the combined image is shifted by a distance of 2 pixels in the x-direction. Therefore, by generating an image composed of pixels of the phase-shifted combined image which are located at the same positions as the reference pixel of the combined image before the phase shift, it is possible to obtain an image composed of pixels which are located at positions separated by 2 pixels in the opposite direction of the x-direction from the reference pixel of the combined image.

Similarly, when the phases of the pixels of the combined image to be used for generating the reduced image are shifted by 2 pixels in the opposite direction of the y-direction, the phase of each pixel can be shifted by moving each pixel of the combined image in the y-direction by 2 pixels as indicated by an arrow C12. In the example indicated by the arrow C12, in the figure, the left line of plural circles represents the combined image before the phases are shifted, and the right line of plural circles represents the combined image after the phases are shifted. In addition, in the figure, the downward direction represents the y-direction.

In the example indicated by the arrow C12, the phase of each pixel of the combined image is shifted by a distance of 2 pixels in the opposite direction of the y-direction. Therefore, by generating an image composed of pixels of the phase-shifted combined image which are located at the same positions as the reference pixel of the combined image before the phase shift, it is possible to obtain an image composed of pixels which are located at positions separated by 2 pixels in the opposite direction of the y-direction from the reference pixel of the combined image.

In this way, when a reduced image composed of pixels at phases shifted by a distance of a predetermined number of pixels from the reference pixel of the combined image is generated, the reduced image can be obtained more simply by shifting first the phase of each pixel of the combined image in accordance with the phase and sampling the pixels at the same positions as the original reference pixel.

Figure 29:
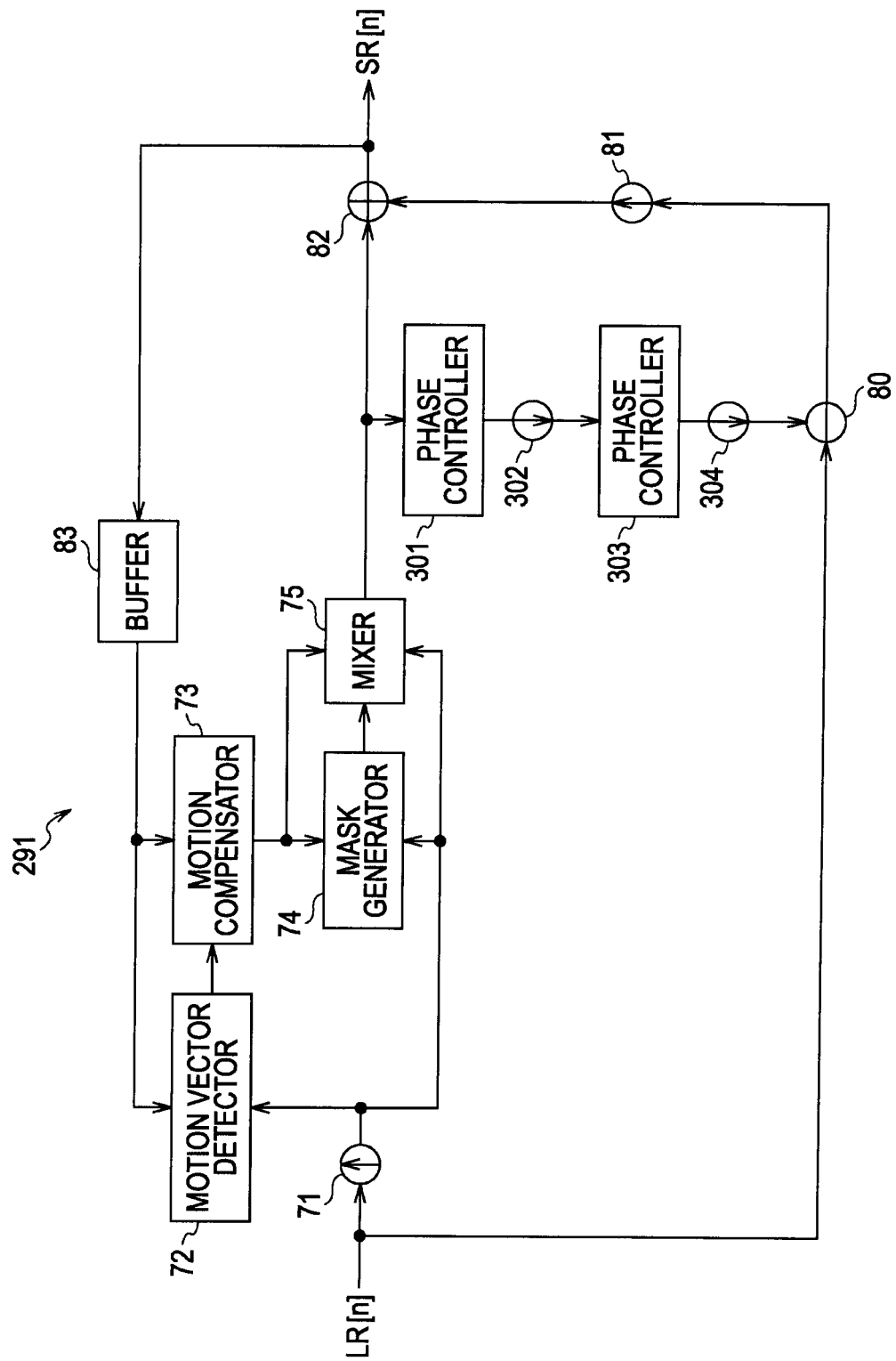
FIG. 29 is a diagram illustrating another exemplary configuration of an image processor according to an embodiment of the present invention.

In such a case, the image processor may be configured as illustrated in FIG. 29. In FIG. 29, the same or corresponding portions as those in FIG. 8 will be denoted by the same reference numerals, and description thereof will be appropriately omitted.

The image processor 291 of FIG. 29 includes a phase controller 301, a down-sampler 302, a phase controller 303, and a down-sampler 304, in lieu of the phase controller 76, the down-samplers 77-1 to 77-3, the phase controller 78, and the down-samplers 79-1 to 79-3 of the image processor 61.

The phase controller 301 selects the phase of the combined image to be used for generating the reduced image and shifts appropriately the phase of each pixel of the combined image supplied from the mixer 75 in the x-direction (more specifically, the direction parallel to the x-direction) in accordance with the selected phase. The phase controller 301 supplies the phase-shifted combined image to the down-sampler 302 as necessary.

The down-sampler 302 samples the pixels at a predetermined phase of the combined image supplied from the phase controller 301, that is, the pixels at the same positions as the reference pixel of the original combined image, thus generating an image composed of such pixels. In this way, the combined image is down-sampled in the x-direction. The down-sampler 302 supplies the image (combined image) generated by the down-sampling to the phase controller 303.

The phase controller 303 selects the phase of the image to be used for generating the reduced image and shifts appropriately the phase of each pixel of the image supplied from the down-sampler 302 in the y-direction (more specifically, the direction parallel to the y-direction) in accordance with the selected phase. The phase controller 303 supplies the phase-shifted image to the down-sampler 304 as necessary.

The down-sampler 304 samples the pixels at a predetermined phase of the combined image supplied from the phase controller 303, that is, the pixels at the same positions as the reference pixel of the original image before the phase shift, thus generating a reduced image composed of such pixels. In this way, the combined image is down-sampled in the y-direction. The down-sampler 304 supplies the reduced image generated by the down-sampling to the subtractor 80.

Operation of Image Processor

Figure 30:
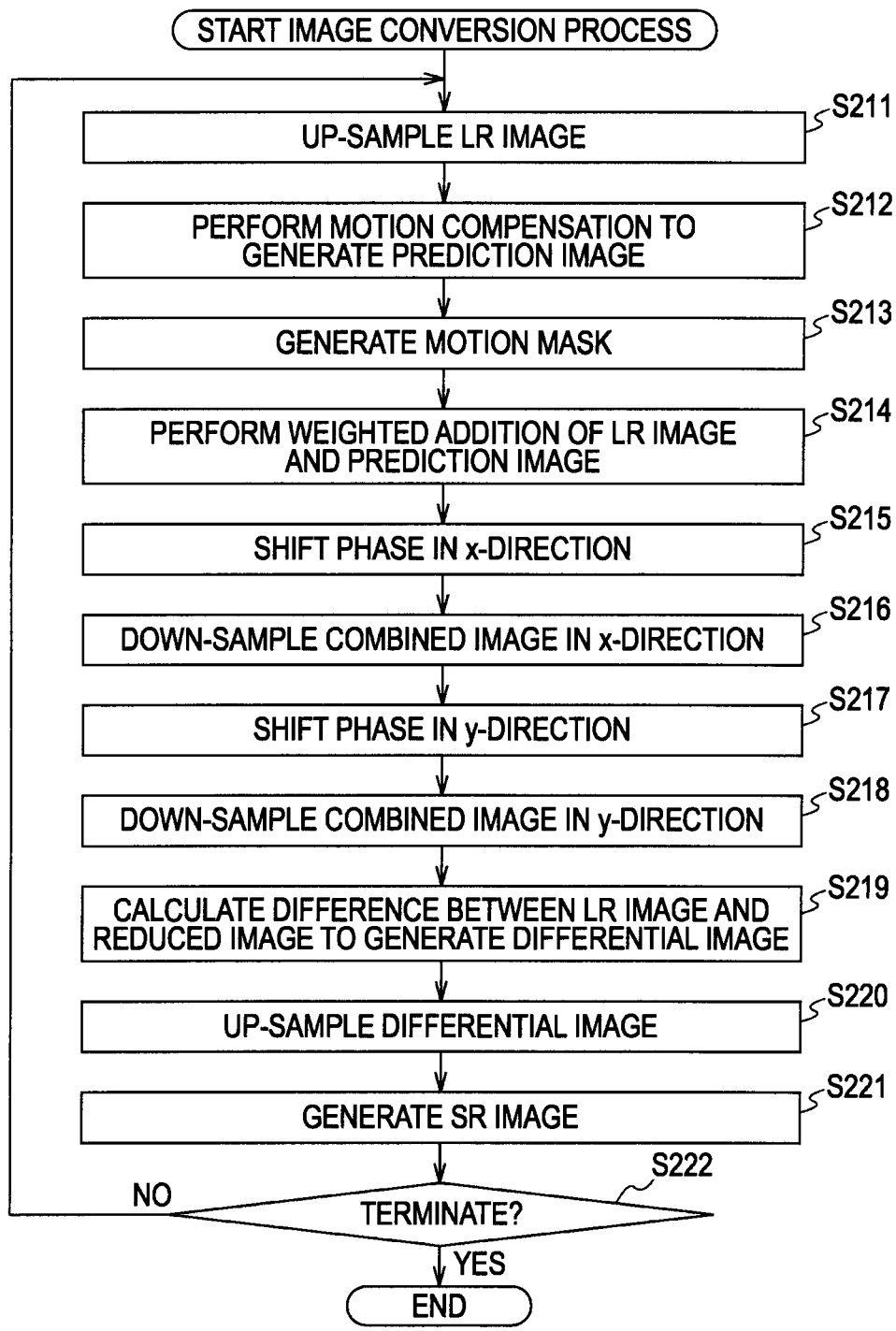
FIG. 30 is a flowchart illustrating an image conversion process.

Next, with reference to the flowchart of FIG. 30, the image conversion process by the image processor 291 will be described. In FIG. 30, the processes of steps S211 to S214 are the same as the processes of steps S11 to S14 in FIG. 11, and description thereof will be omitted.

At step S215, the phase controller 301 selects the phase of the combined image to be used for generating the reduced image in accordance with a predetermined pattern and shifts appropriately the phase of each pixel of the combined image supplied from the mixer 75 in the x-direction in accordance with the selected phase.

For example, when the selected phase is the same as the phase of the reference pixel, the phase controller 301 does not shift the phase of each pixel of the combined image but supplies the combined image to the down-sampler 302 as it is. For example, when the selected phase is different from the phase of the reference pixel, the phase controller 301 shifts the phase of each pixel by moving each pixel of the combined image in accordance with the selected phase and supplies the phase-shifted combined image to the down-sampler 302.

At step S216, the down-sampler 302 samples the pixels at the same position as the reference pixel before the phase shift, of the combined image supplied from the phase controller 301, to generate an image composed of such pixels, whereby the combined image is down-sampled in the x-direction. The down-sampler 302 supplies the image obtained by the down-sampling to the phase controller 303.

At step S217, the phase controller 303 selects the phase of the combined image to be used for generating the reduced image in accordance with a predetermined pattern and shifts appropriately the phase of each pixel of the combined image supplied from the down-sampler 302 in the y-direction in accordance with the selected phase.

For example, when the selected phase is the same as the phase of the reference pixel, the phase controller 303 does not shift the phase of each pixel of the combined image but supplies the combined image to the down-sampler 304 as it is. For example, when the selected phase is different from the phase of the reference pixel, the phase controller 303 shifts the phase of each pixel by moving each pixel of the combined image in accordance with the selected phase and supplies the phase-shifted combined image to the down-sampler 304.

At step S218, the down-sampler 304 samples the pixels at the same position as the reference pixel before the phase shift, of the combined image supplied from the phase controller 303, to generate an image composed of such pixels, whereby the combined image is down-sampled in the y-direction. The down-sampler 304 supplies the image obtained by the down-sampling to the subtractor 80.

Subsequently, the processes of steps S219 to S222 are performed, and the image conversion process ends. Since such processes are the same as the processes of steps S19 to S22 of FIG. 11, description thereof will be omitted.

In this way, the image processor 291 performs a super-resolution process on the input LR image and converts the LR image to the SR image. When generating the SR image, the image processor 291 changes the phases of the pixels to be used for generating the reduced image from frame to frame and shifts the phase of each pixel of the combined image in accordance with the phase, thus down-sampling the phase-shifted combined image and generating the reduced image.

As described above, by shifting the phase of each pixel of the combined image and then performing down-sampling to generate the reduced image, it is possible to obtain the reduced image more simply and quickly. In this case, since only one block is necessary for performing the down-sampling in each direction of performing the down-sampling, it is possible to decrease the size of the image processor 291.

Furthermore, since the phases of the pixels of the combined image to be used for generating the reduced image are changed from frame to frame, it is possible to prevent accumulation of errors (noise components) generated at the time of generating the combined image, whereby the image quality of the SR image can be improved.

Although it has been described that the down-samplers 302 and 304 generate the reduced image by sampling the pixels at a predetermined position of the image, the reduced image may be generated by a filtering process using the pixels at the predetermined position.

In such a case, the pixel values of the pixels at a predetermined position of the combined image having been subjected to the phase shift by the phase controller 301 are multiplied with predetermined coefficients, and the value of the sum of the pixel values multiplied with the coefficients is calculated. Then, the value of the calculated sum is used as the pixel value of the pixel at the selected phase, and an image composed of the pixels at the selected phase of the combined image is generated. The image generated thus is used as the combined image which is down-sampled in the x-direction.

The above-described series of processing may be executed by hardware or may be executed by software. When the series of processing is executed by the software, a program constituting the software is installed from a program recording medium in a computer integrated into an exclusive hardware or a general-personal computer which can execute various functions by installing various programs in the computer.

Figure 31:
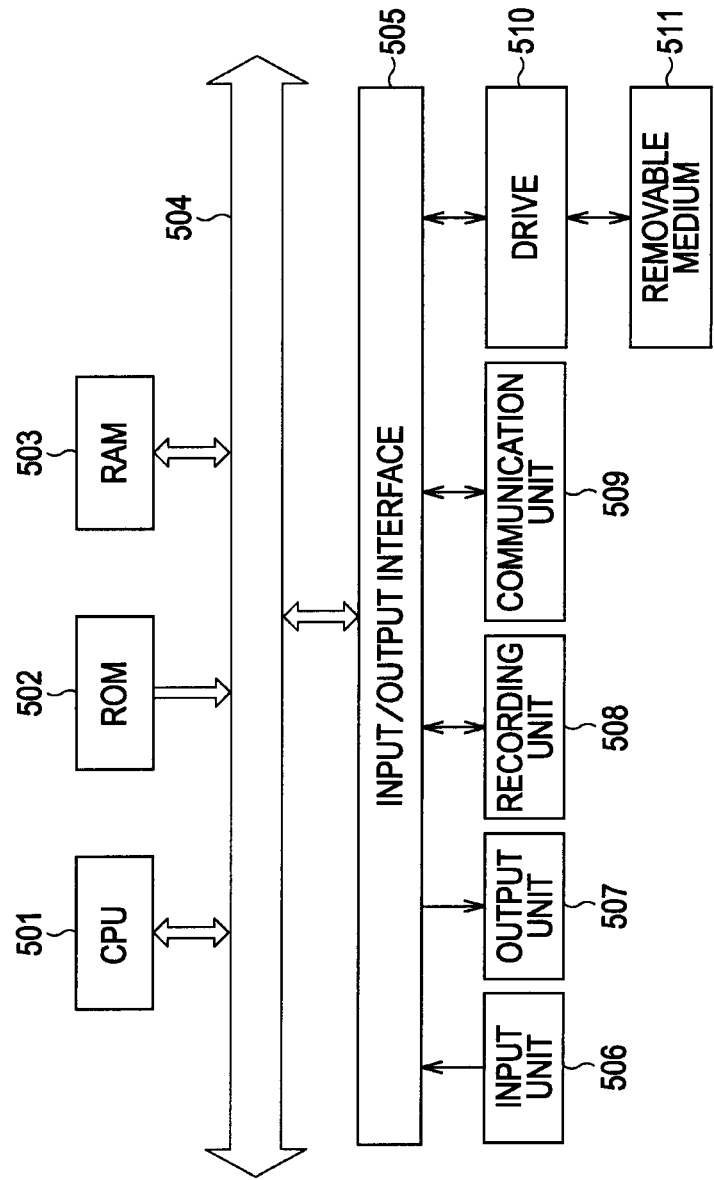
FIG. 31 is a diagram illustrating an exemplary configuration of a computer.

FIG. 31 is a block diagram illustrating an exemplary hardware configuration of a computer executing the above-described series of processing by a program.

In the computer, a CPU (central processing unit) 501, a ROM (read only memory) 502, and a RAM (random access memory) 503 are connected to each other via a bus 504.

The bus 504 is connected to an input/output interface 505. The input/output interface 505 is connected to an input unit 506 including a keyboard, a mouse, and a microphone; an output unit 507 including a display and a speaker, a recording unit 508 including a hard disk and a nonvolatile memory, a communication unit 509 including a network interface, and a drive 510 driving a removable medium 511 such as a magnetic disc, an optical disc, an opto-magnetic disc, or a semiconductor memory.

In the computer configured thus, the CPU 501 loads the program recorded in the recording unit 508 into the RAM 503 via the input/output interface 505 and the bus 504 and executes the program, whereby the above-described series of processing is executed.

The program executed by the computer (the CPU 501) may be provided by being recorded on the removable medium 511 which is a package medium including a magnetic disc (including a flexible disk), an optical disc (e.g., CD-ROM (compact disc-read only memory) and DVD (digital versatile disc)), an opto-magnetic disc, and a semiconductor memory. Alternatively, the program may be provided via wired or wireless transmission media such as local area network, the Internet, digital satellite broadcasting.

The program is installed in the recording unit 508 via the input/output interface 505 when the removable medium 511 is mounted on the drive 510. Furthermore, the program may be received by the communication unit 509 via wired or wireless transmission media and installed in the recording unit 508. In addition, the program may be installed in advance in the ROM 502 or the recording unit 508.

The program executed by the computer may be a program executing processing in a time-sequential manner in accordance with the procedures described in this specification and may be a program executing the processing in a parallel manner or at necessary times such as in response to calls.

The present application contains subject matter related to that disclosed in Japanese Priority Patent Application JP 2009-012350 filed in the Japan Patent Office on Jan. 22, 2009, the entire content of which is hereby incorporated by reference.

The embodiments of the present invention are not limited to the above-described embodiments, but various modifications can be made in a range not departing from the gist of the present invention.

What is claimed is:

1. An image processor apparatus performing a super-resolution process of converting an input image with a first resolution to an output image with a second resolution higher than the first resolution with respect to a plurality of input images which are consecutive in time, comprising:
   prediction means for predicting the output image with the second resolution of a time being processed using the input image of the time being processed and the output image obtained by performing the super-resolution process on an input image of a time earlier than the time being processed;
   generation means for generating a reduced image with the first resolution composed of pixels at different phases of the prediction image, the phases being different from time to time, using a prediction image obtained by the prediction of the prediction means;
   difference calculation means for calculating a difference between the input image of the time being processed and the reduced image; and
   addition means for adding the difference which is up-sampled to the second resolution to the prediction image, thus generating the output image with the second resolution of the time being processed.

2. The image processor apparatus according to claim 1, wherein the generation means changes a phase of each pixel of the prediction image to be used for generating the reduced image for each time in accordance with a predetermined pattern.

3. The image processor apparatus according to claim 1, wherein the generation means includes:
   selection means for selecting a phase of each pixel of the prediction image; and
   sampling means for generating the reduced image by sampling pixels at the phase selected by the selection means from the prediction image.

4. The image processor apparatus according to claim 1, wherein the generation means includes:
   selection means for selecting a phase of each pixel of the prediction image; and
   filtering means for generating pixels at the selected phase by a filtering process using several pixels around a pixel of the prediction image which is positioned at the phase selected by the selection means, thus generating the reduced image.

5. The image processor apparatus according to claim 1, wherein the generation means further comprising phase control means for generating the reduced image composed of pixels which are positioned at a phase separated by a predetermined distance in a predetermined direction from a predetermined reference phase of the prediction image, and shifting a phase of the difference up-sampled to the second resolution by the predetermined distance in the predetermined direction.

6. The image processor apparatus according to claim 1, wherein:
   the input image is an image of an interlaced format; and
   the generation means includes:
   switching means for changing an output destination of the prediction image depending on whether the input image of the time being processed is a top-field image or a bottom-field image;
   first selection means for selecting a phase of each pixel of the prediction image obtained from the input image of a top field which is output from the switching means;
   first sampling means for generating the reduced image by sampling a pixel at the phase selected by the first selection means from the prediction image;
   second selection means for selecting a phase of each pixel of the prediction image obtained from the input image of a bottom field which is output from the switching means; and
   second sampling means for generating the reduced image by sampling pixels at the phase selected by the second selection means from the prediction image.

7. The image processor apparatus according to claim 6, wherein the first and second selection means independently change the phase of each pixel of the prediction image used for generating the reduced image from field to field in accordance with a predetermined pattern.

8. The image processor apparatus according to claim 1, wherein:
   the generation means includes:
   phase control means for moving each pixel of the prediction image by a predetermined distance in a predetermined direction to shift a phase of each pixel of the prediction image; and
   reduced image generation means for generating the reduced image composed of pixels at a predetermined phase of the prediction image in which the phase is shifted by the phase control means, and
   the phase control means changes a direction of shifting the phase of each pixel of the prediction image in each time in accordance with a predetermined pattern.

9. An image processing method, stored on a non-transitory computer readable storage medium, for use in an image processor performing a super-resolution process of converting an input image with a first resolution to an output image with a second resolution higher than the first resolution with respect to a plurality of input images which are consecutive in time, the image processor comprising:
   prediction means for predicting the output image with the second resolution of a time being processed using the input image of the time to be processed and the output image obtained by performing the super-resolution process on an input image of a time earlier than the time being processed;
   generation means for generating a reduced image with the first resolution composed of pixels at different phases of the prediction image, the phases being different from time to time, using a prediction image obtained by the prediction of the prediction means;
   difference calculation means for calculating a difference between the input image of the time being processed and the reduced image; and
   addition means for adding the difference which is up-sampled to the second resolution to the prediction image, thus generating the output image with the second resolution of the time being processed, the method comprising the steps of:
   causing the prediction means to generate the prediction image;
   causing the generation means to generate the reduced image composed of pixels at a predetermined phase of the prediction image;

causing the difference calculation means to calculate the difference between the input image and the reduced image; and causing the addition means to add the difference to the prediction image to generate the output image of the time being processed.

10. An image processing program, stored on a non-transitory computer readable storage medium, for performing a super-resolution process of converting an input image with a first resolution to an output image with a second resolution higher than the first resolution with respect to a plurality of input images which are consecutive in time, the program causing a computer to execute processing comprising the steps of:

predicting the output image with the second resolution of a time being processed using the input image of the time being processed and the output image obtained by performing the super-resolution process on an input image of a time earlier than the time being processed;

generating a reduced image with the first resolution composed of pixels at different phases of the prediction image, the phases being different from time to time, using a prediction image obtained by the prediction in the prediction step;

calculating a difference between the input image of the time being processed and the reduced image; and adding the difference which is up-sampled to the second resolution to the prediction image, thus generating the output image with the second resolution of the time being processed.

11. An image processor apparatus performing a super-resolution process of converting an input image with a first resolution to an output image with a second resolution higher than the first resolution with respect to a plurality of input images which are consecutive in time, comprising:

a prediction unit configured to predict the output image with the second resolution of a time being processed using the input image of the time being processed and the output image obtained by performing the super-resolution process on an input image of a time earlier than the time being processed;

a generation unit configured to generate a reduced image with the first resolution composed of pixels at different phases of the prediction image, the phases being different from time to time, using a prediction image obtained by the prediction of the prediction unit;

a difference calculation unit configured to calculate a difference between the input image of the time being processed and the reduced image; and an addition unit configured to add the difference which is up-sampled to the second resolution to the prediction image, thus generating the output image with the second resolution of the time being processed.

* * * * *